(12) United States Patent
Lee et al.

(10) Patent No.: US 12,429,748 B2
(45) Date of Patent: Sep. 30, 2025

(54) CAMERA ACTUATOR AND CAMERA MODULE INCLUDING SAME

(71) Applicant: LG INNOTEK CO., LTD., Seoul (KR)

(72) Inventors: Sung Guk Lee, Seoul (KR); Seung Hyeon Jeong, Seoul (KR); Jeung Ook Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 137 days.

(21) Appl. No.: 18/033,041

(22) PCT Filed: Oct. 20, 2021

(86) PCT No.: PCT/KR2021/014678
§ 371 (c)(1),
(2) Date: Apr. 20, 2023

(87) PCT Pub. No.: WO2022/086158
PCT Pub. Date: Apr. 28, 2022

(65) Prior Publication Data
US 2023/0393448 A1 Dec. 7, 2023

(30) Foreign Application Priority Data

Oct. 21, 2020 (KR) .................. 10-2020-0136672
Oct. 27, 2020 (KR) .................. 10-2020-0140544

(51) Int. Cl.
G03B 5/00 (2021.01)
G03B 17/12 (2021.01)
H04N 23/55 (2023.01)
H04N 23/68 (2023.01)

(52) U.S. Cl.
CPC .............. *G03B 5/00* (2013.01); *G03B 17/12* (2013.01); *G03B 2205/0069* (2013.01); *H04N 23/55* (2023.01); *H04N 23/682* (2023.01)

(58) Field of Classification Search
CPC ........... G03B 17/12; G03B 2205/0069; G03B 2205/0046; H04N 23/682; H04N 23/55
See application file for complete search history.

(56) References Cited

U.S. PATENT DOCUMENTS 7,679,847 B2 3/2010 Koyama et al.
2007/0291380 A1 12/2007 Koyama et al.
2016/0165108 A1 6/2016 Jang et al.
(Continued)

FOREIGN PATENT DOCUMENTS

JP 2006-349737 A 12/2006
KR 10-0863798 B1 10/2008
(Continued)

*Primary Examiner* — Christopher E Mahoney
(74) *Attorney, Agent, or Firm* — Birch, Stewart, Kolasch & Birch, LLP

(57) ABSTRACT

A camera actuator according to an embodiment includes a base; a rail guide part coupled to the base; a first lens assembly coupled to the base and fixed; and second and third lens assemblies disposed in the base and moving along the rail guide part, wherein the base includes a coupling protrusion and a base recess adjacent to the coupling protrusion; and at least one of the rail guide part and the first lens assembly includes a coupling hole corresponding to the coupling protrusion of the base.

20 Claims, 36 Drawing Sheets

(56) References Cited

U.S. PATENT DOCUMENTS

| | | |
|---|---|---|
| 2018/0364450 A1 | 12/2018 | Lee et al. |
| 2018/0367714 A1 | 12/2018 | Im et al. |
| 2019/0011665 A1 | 1/2019 | Huang et al. |
| 2020/0110243 A1 | 4/2020 | Lee |
| 2021/0231904 A1 | 7/2021 | Son et al. |
| 2022/0171157 A1 | 6/2022 | Roh et al. |
| 2022/0210296 A1* | 6/2022 | Bang .................... G03B 13/36 |

FOREIGN PATENT DOCUMENTS

| | | |
|---|---|---|
| KR | 10-2016-0069714 A | 6/2016 |
| KR | 10-2017-0019095 A | 2/2017 |
| KR | 10-2018-0098463 A | 9/2018 |
| KR | 10-2018-0137277 A | 12/2018 |
| KR | 10-2020-0020147 A | 2/2020 |
| KR | 10-2072811 B1 | 3/2020 |
| KR | 10-2020-0119630 A | 10/2020 |
| WO | WO 2020/076112 A1 | 4/2020 |
| WO | WO 2020/209598 A1 | 10/2024 |

\* cited by examiner

[FIG. 1]
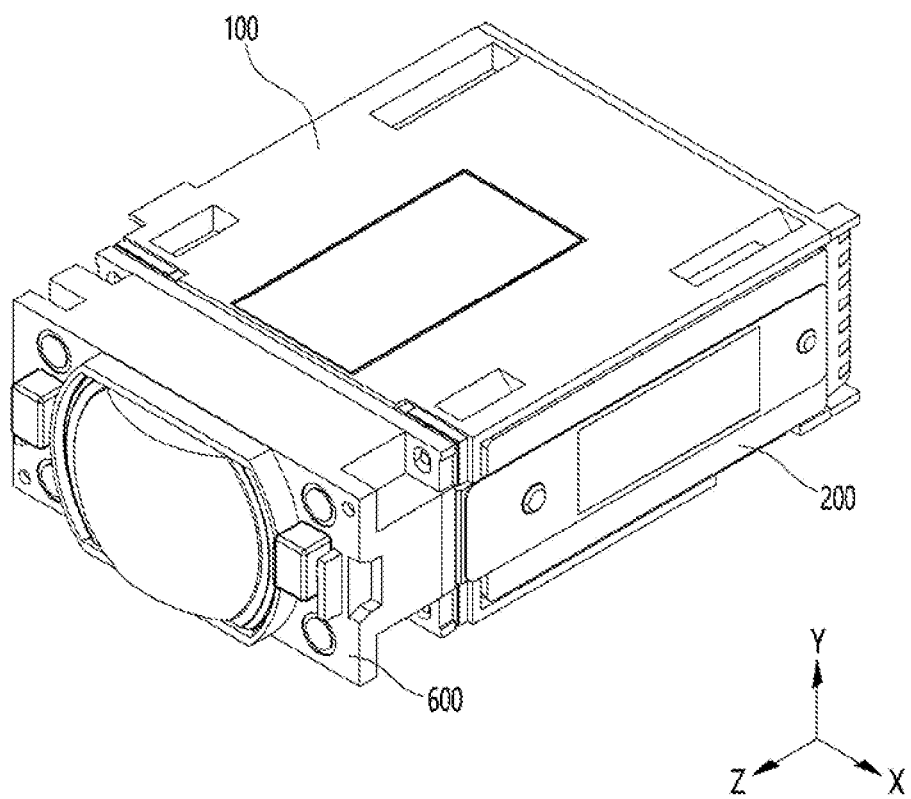

[FIG. 2]
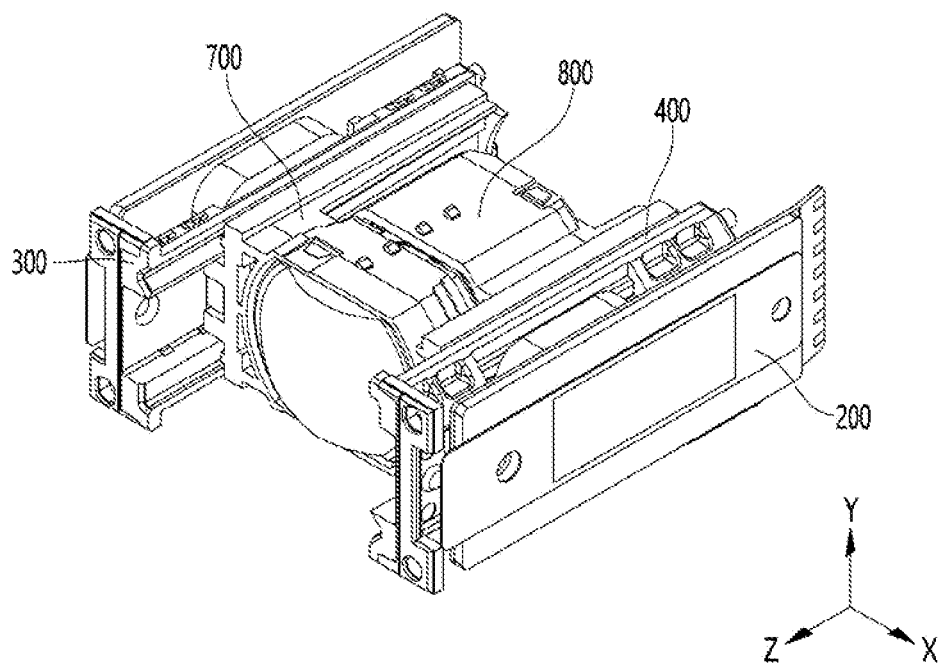
[FIG. 3]
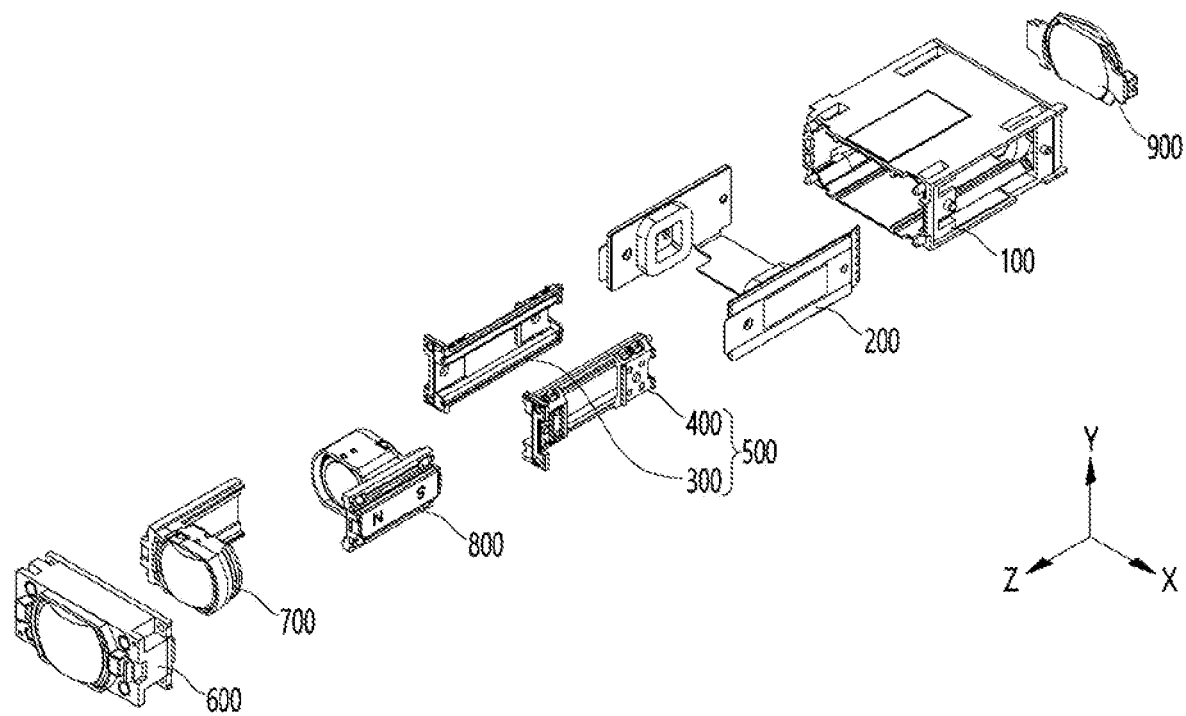

[FIG. 4]
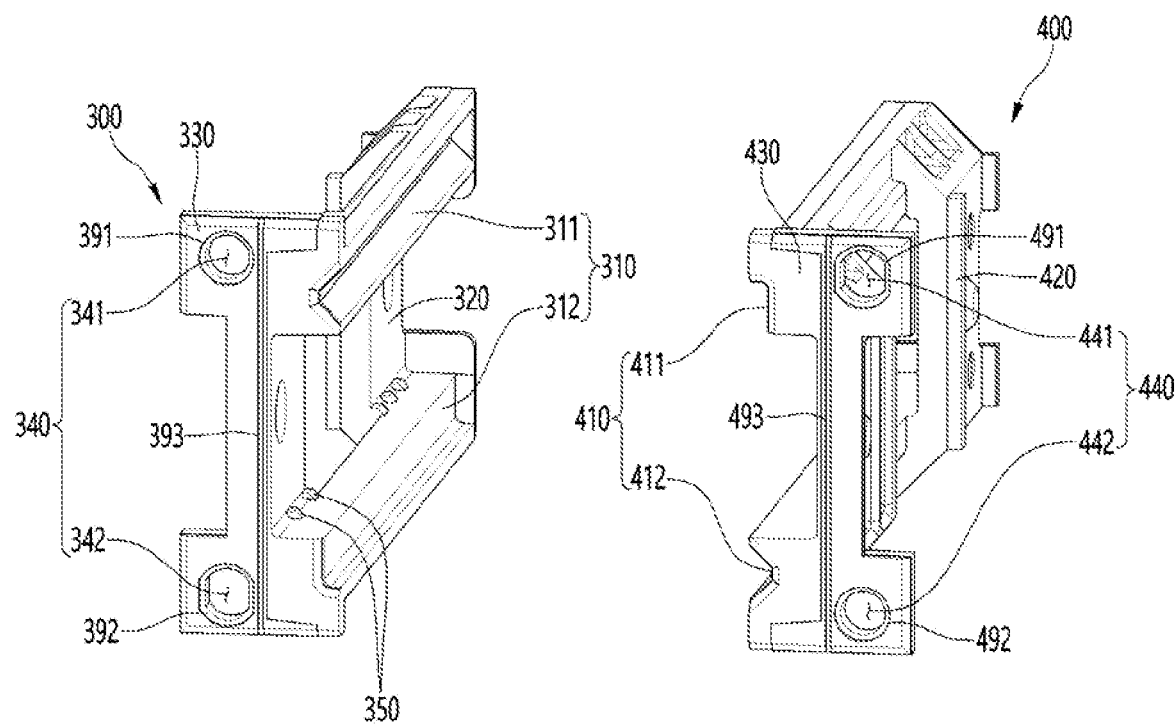

[FIG. 5]
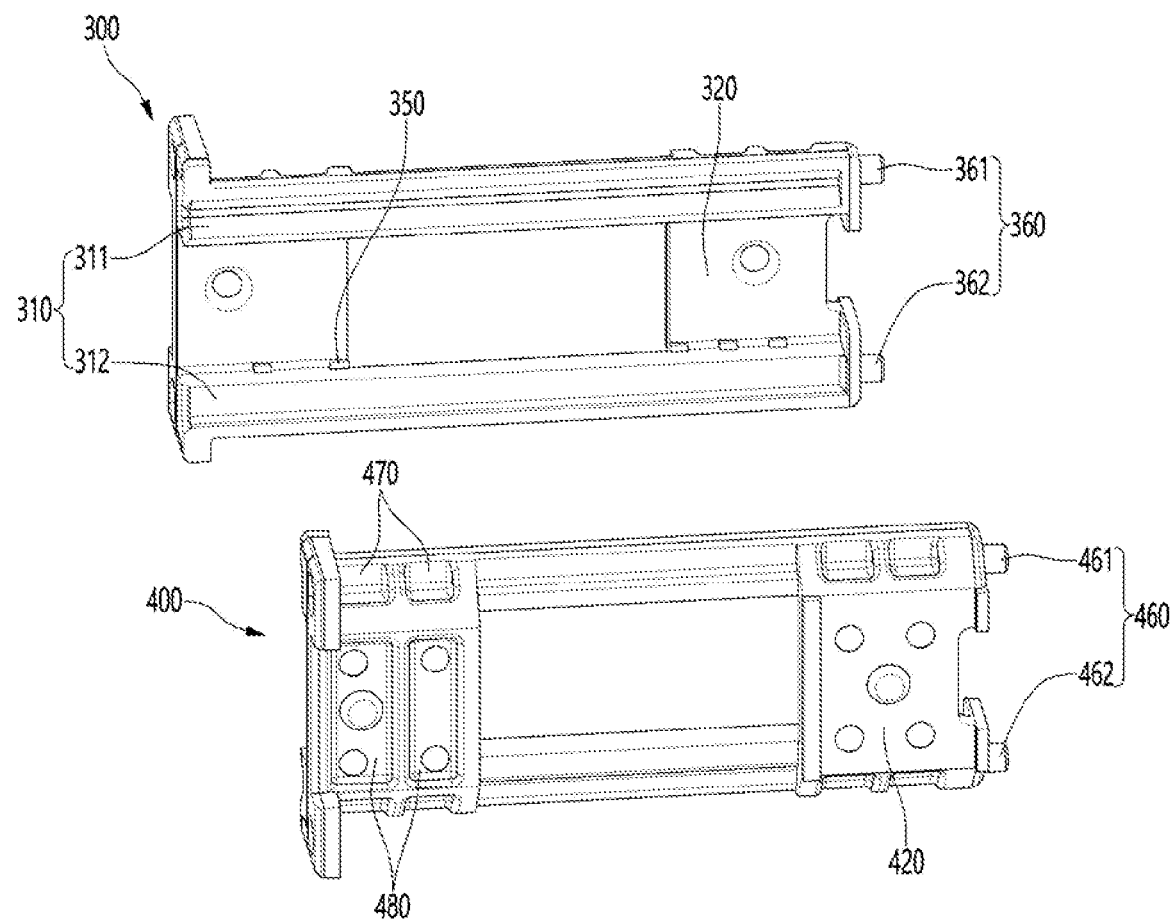

[FIG. 6]
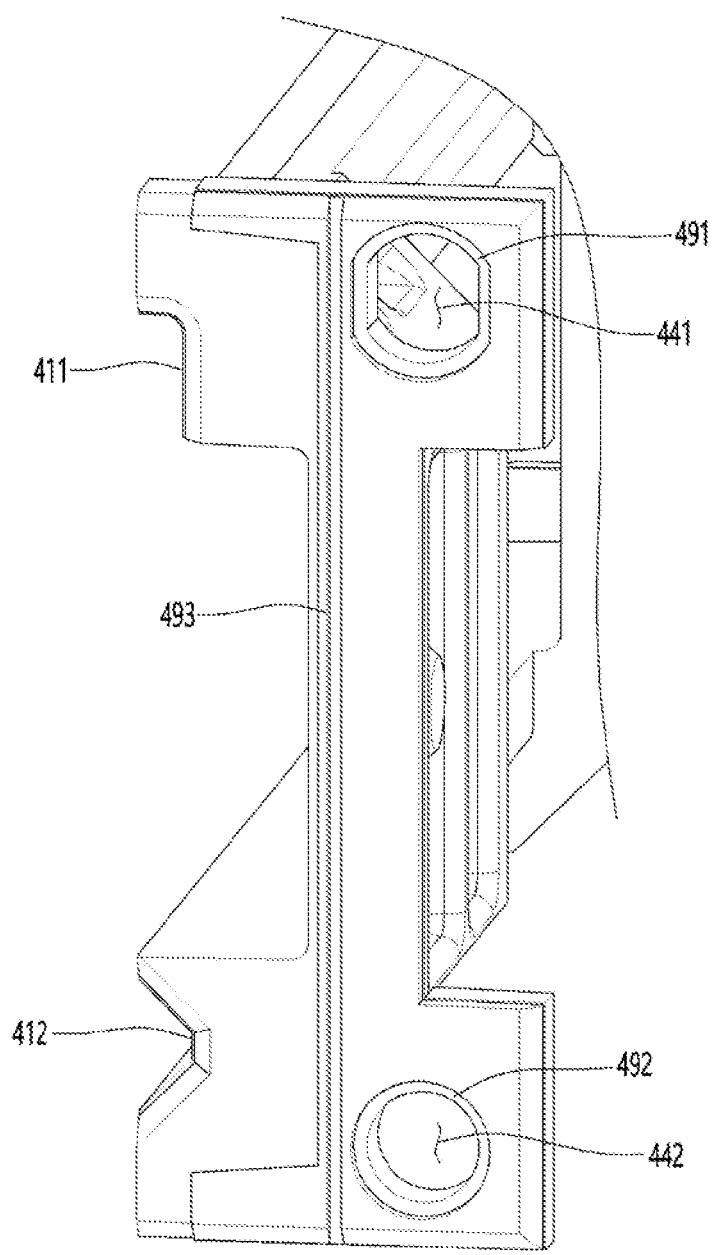

[FIG. 7]
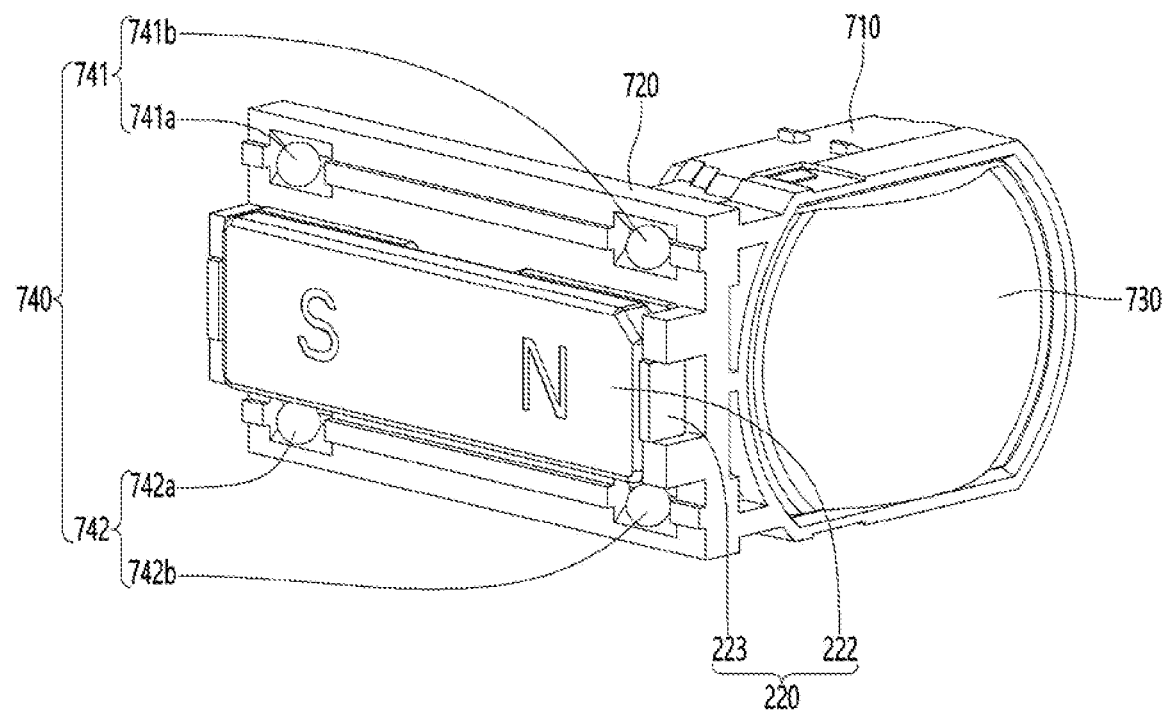
[FIG. 8]
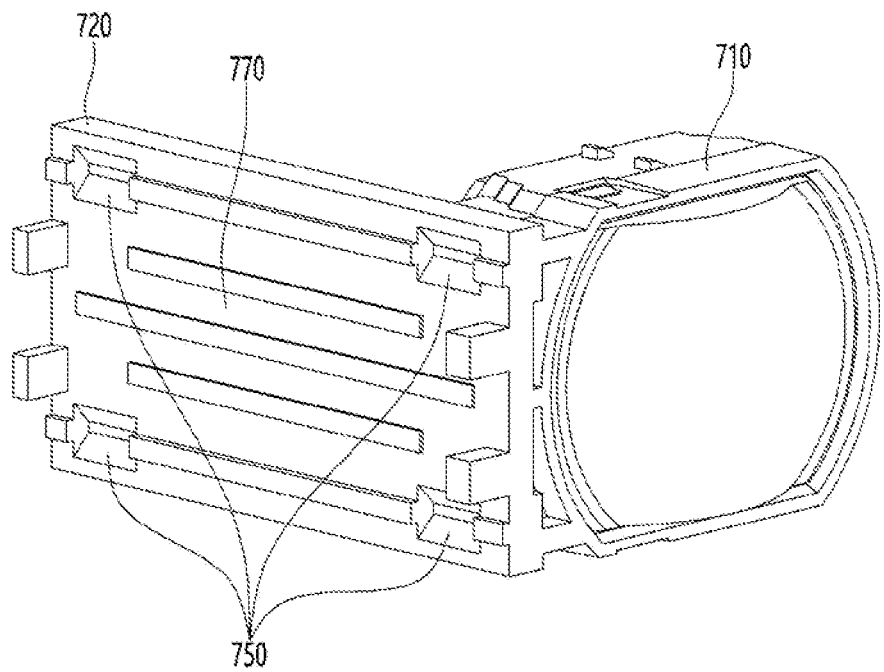

[FIG. 9]
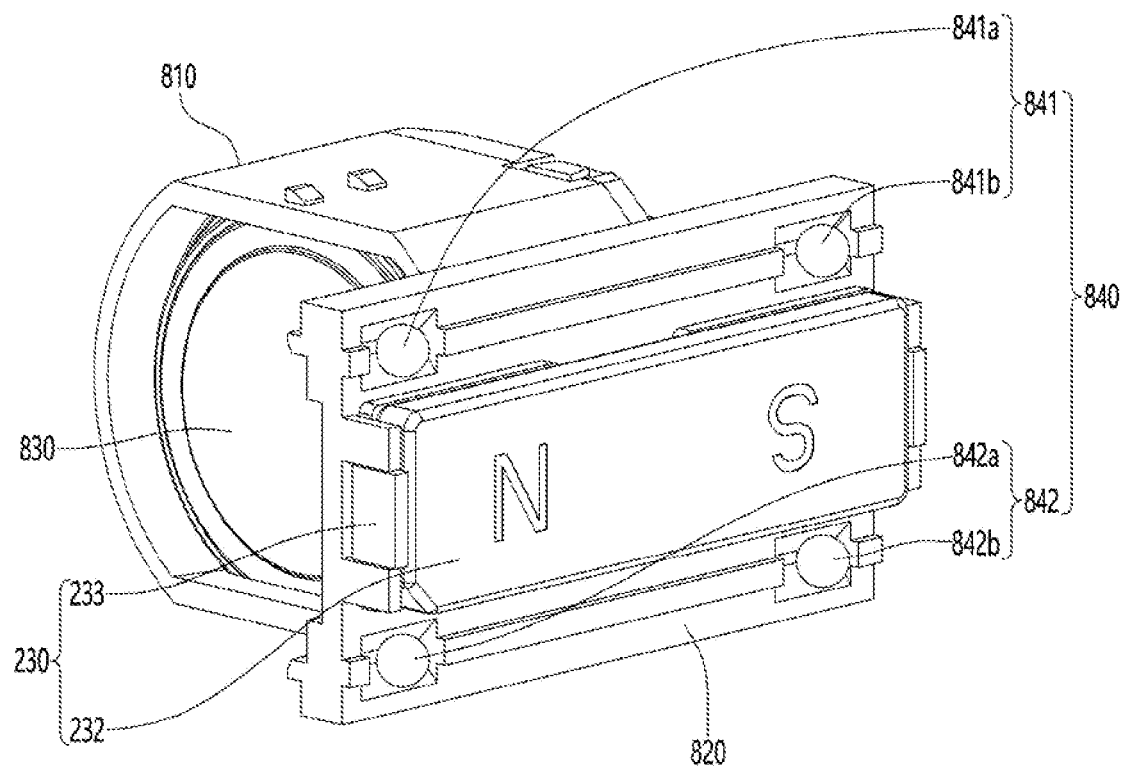

[FIG. 10]
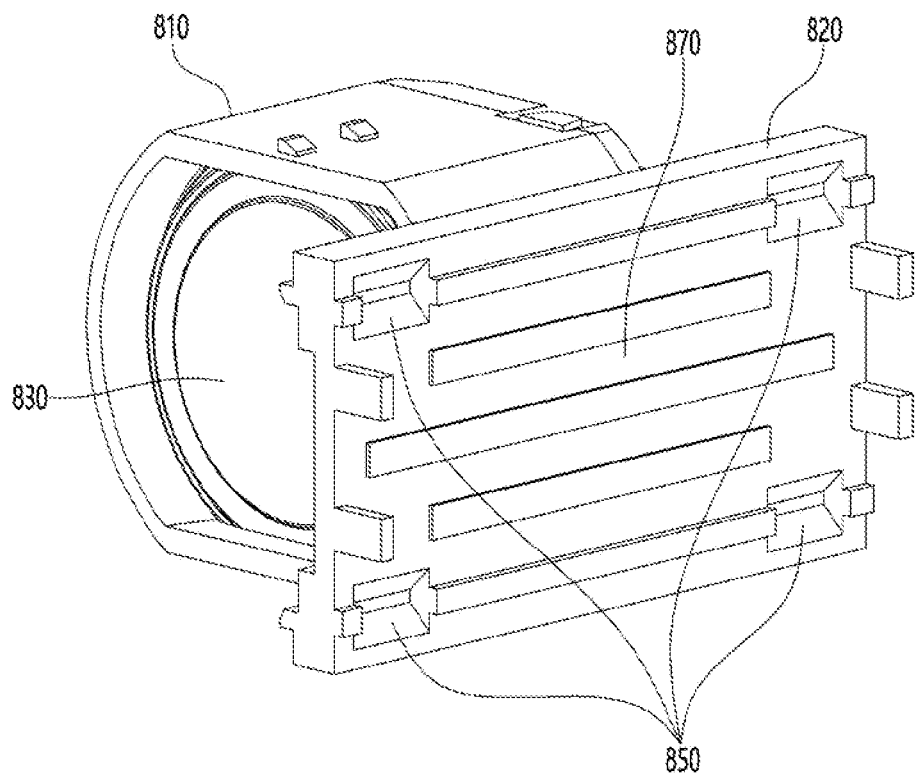
[FIG. 11]
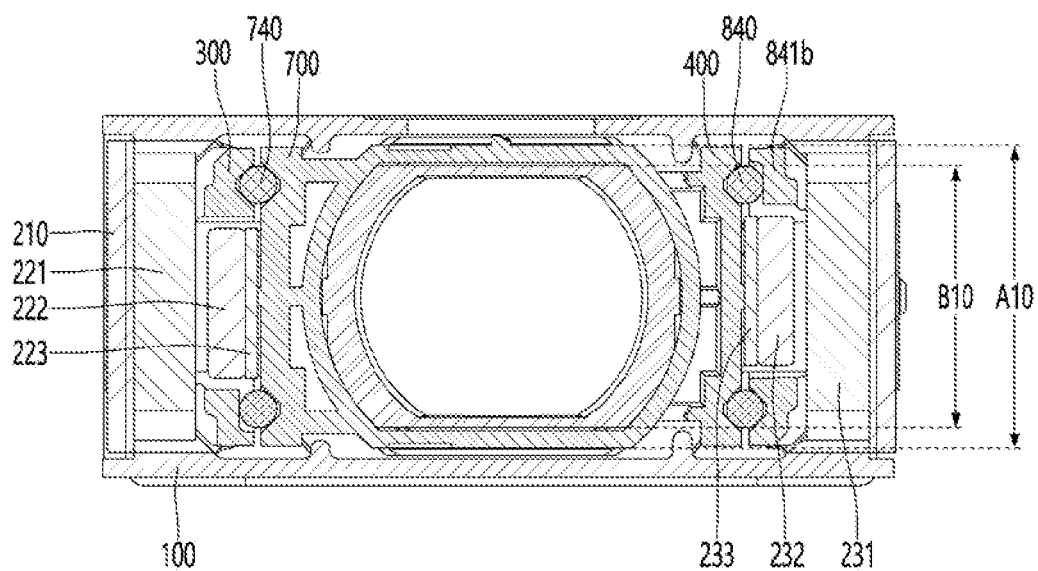

[FIG. 12]
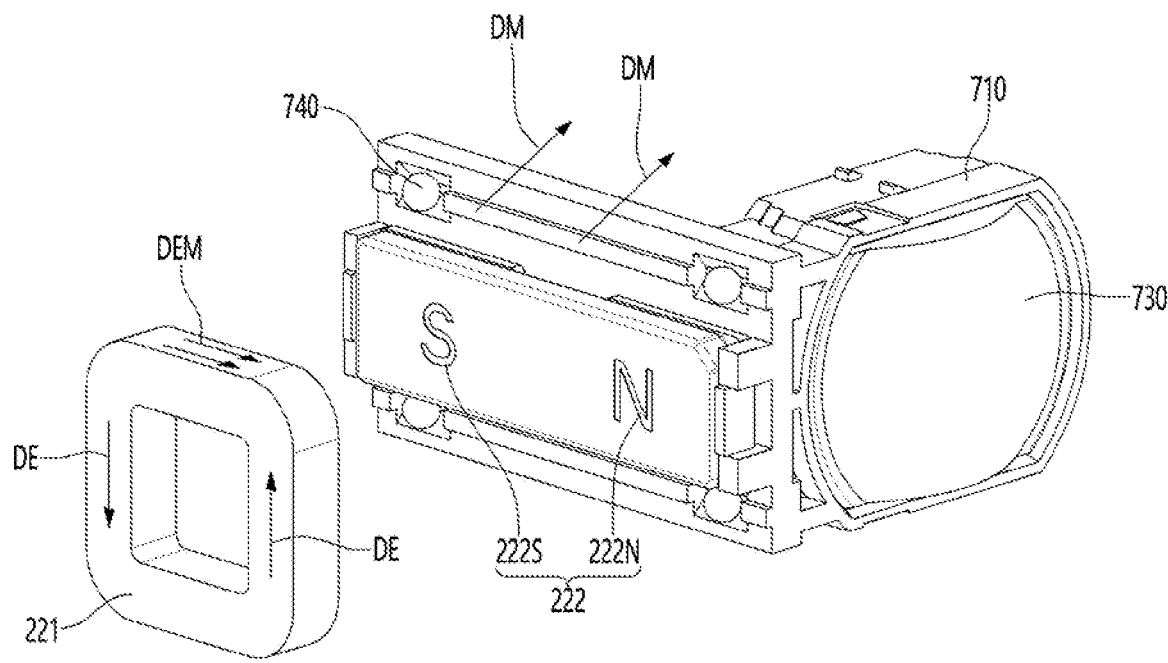
[FIG. 13]
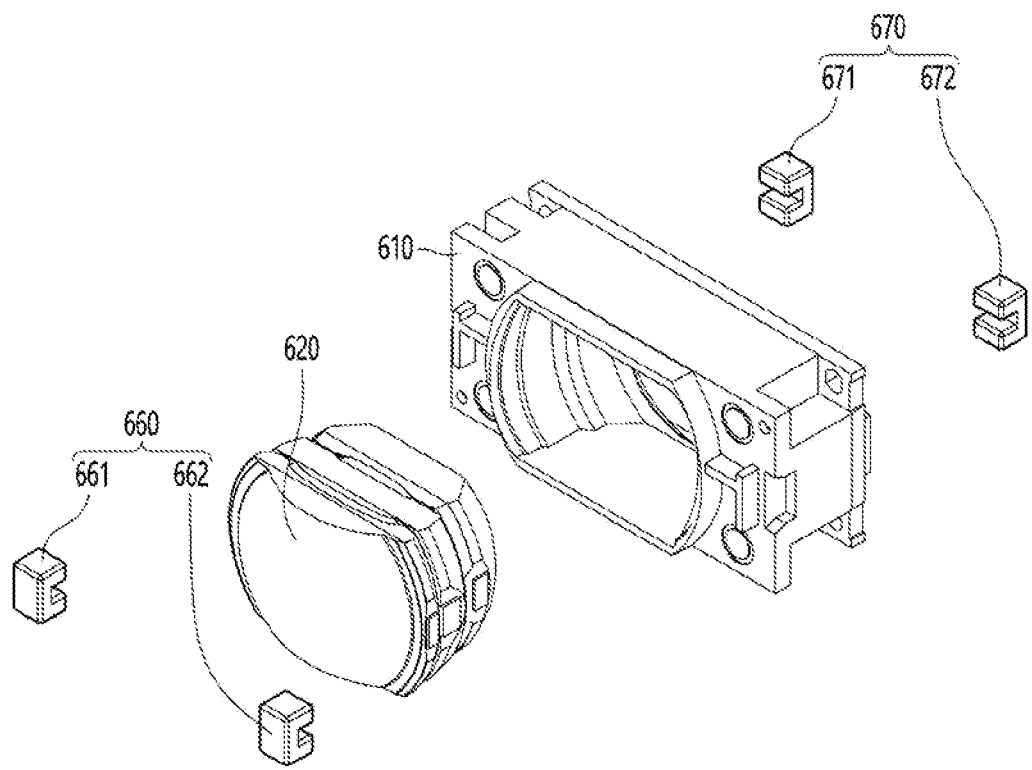

[FIG. 14a]
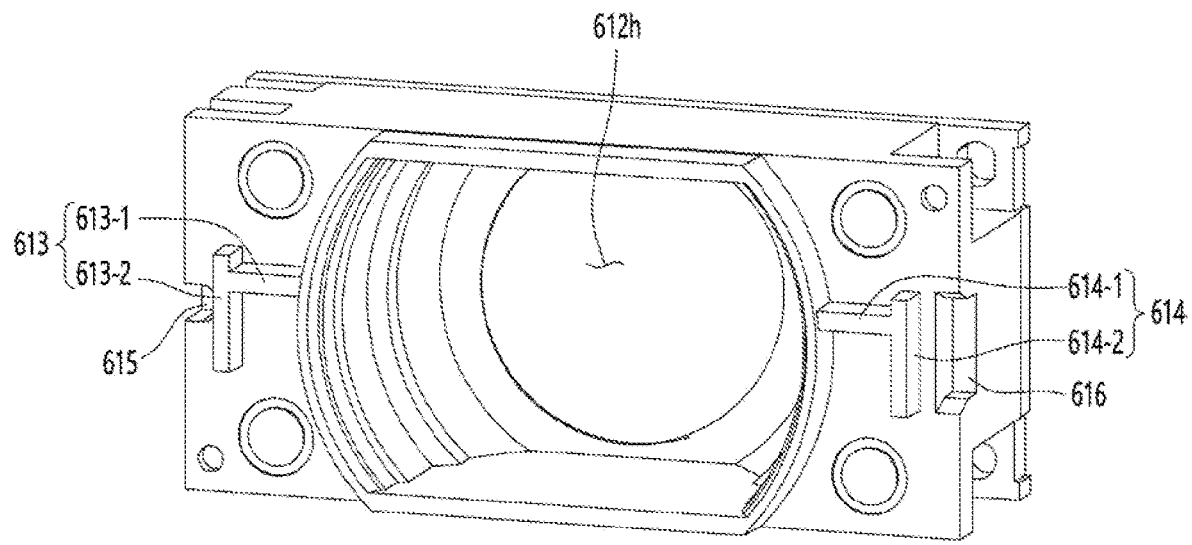
[FIG. 14b]
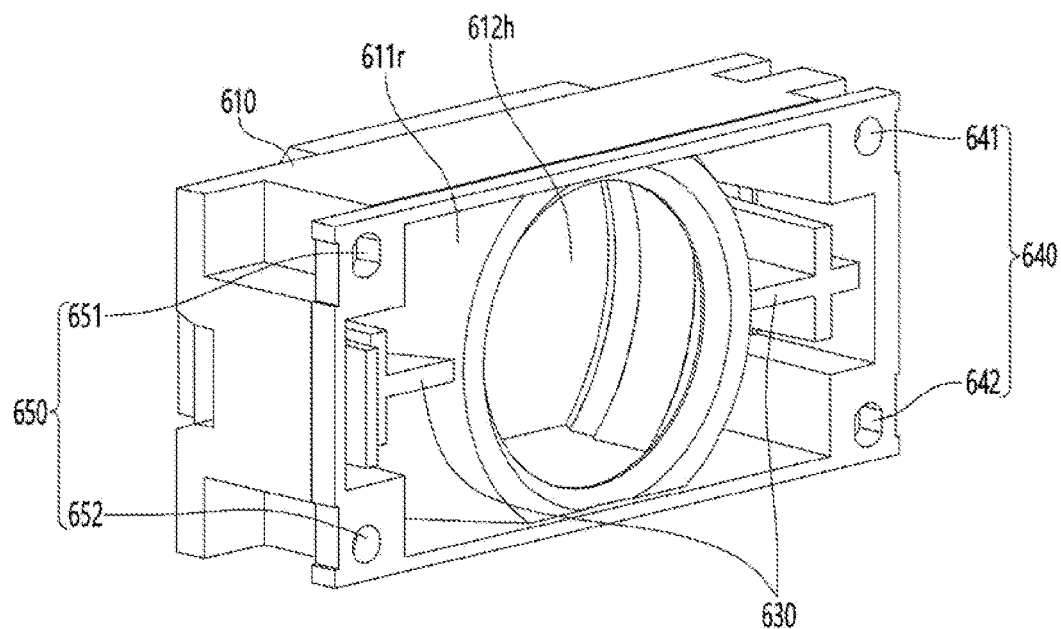

【FIG. 15】
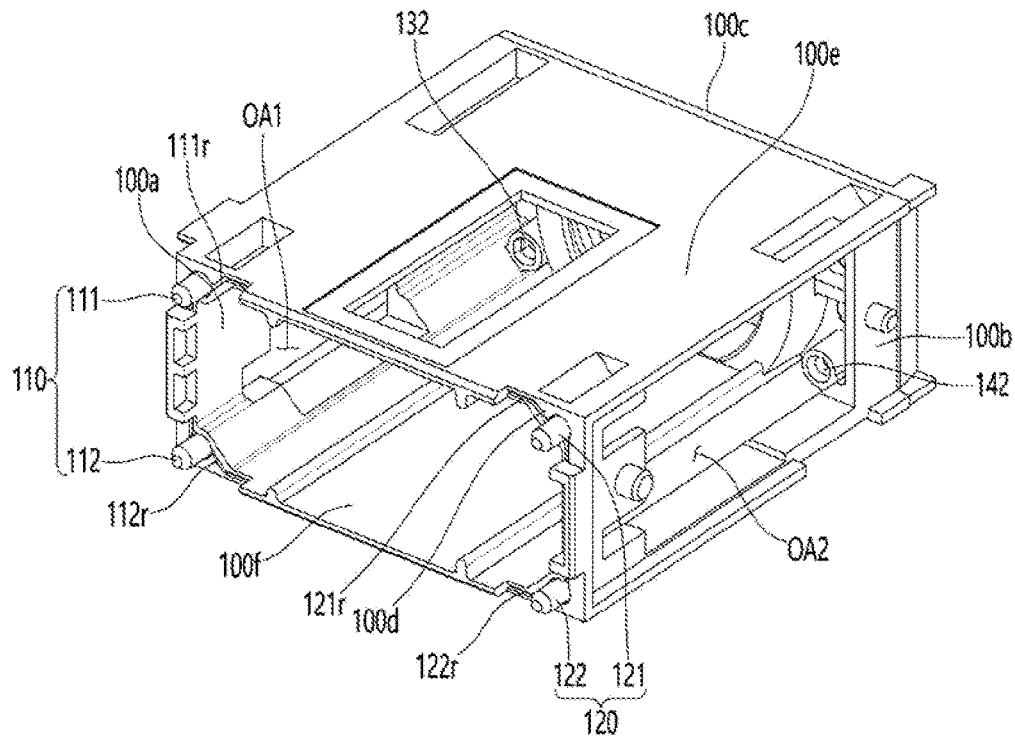
【FIG. 16】
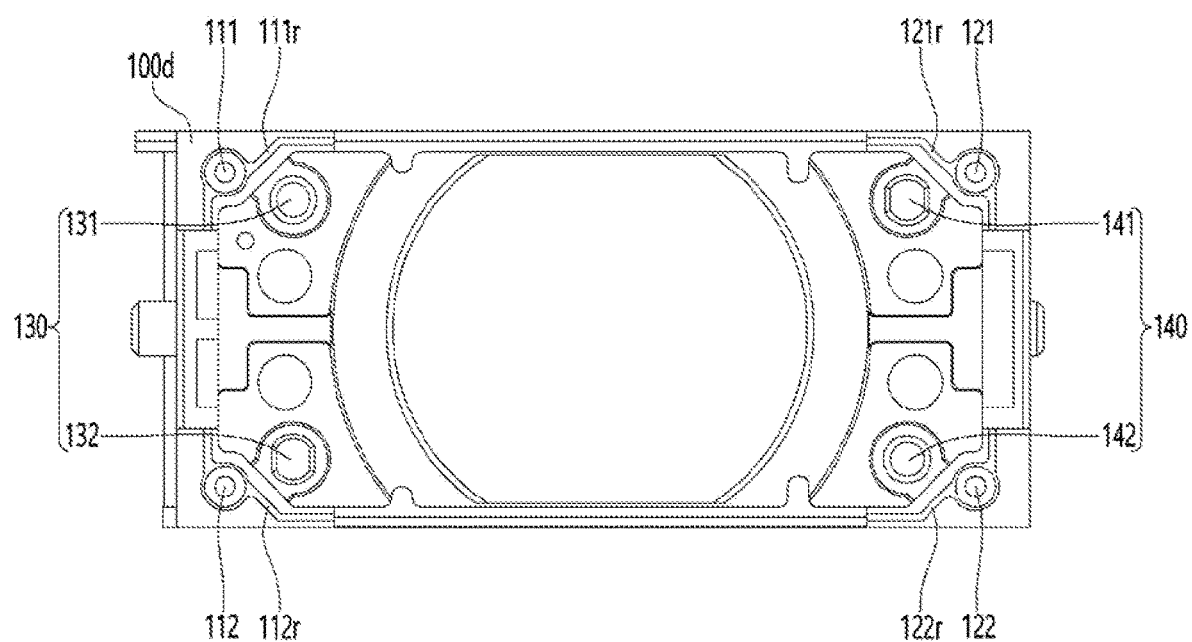

[FIG. 17]
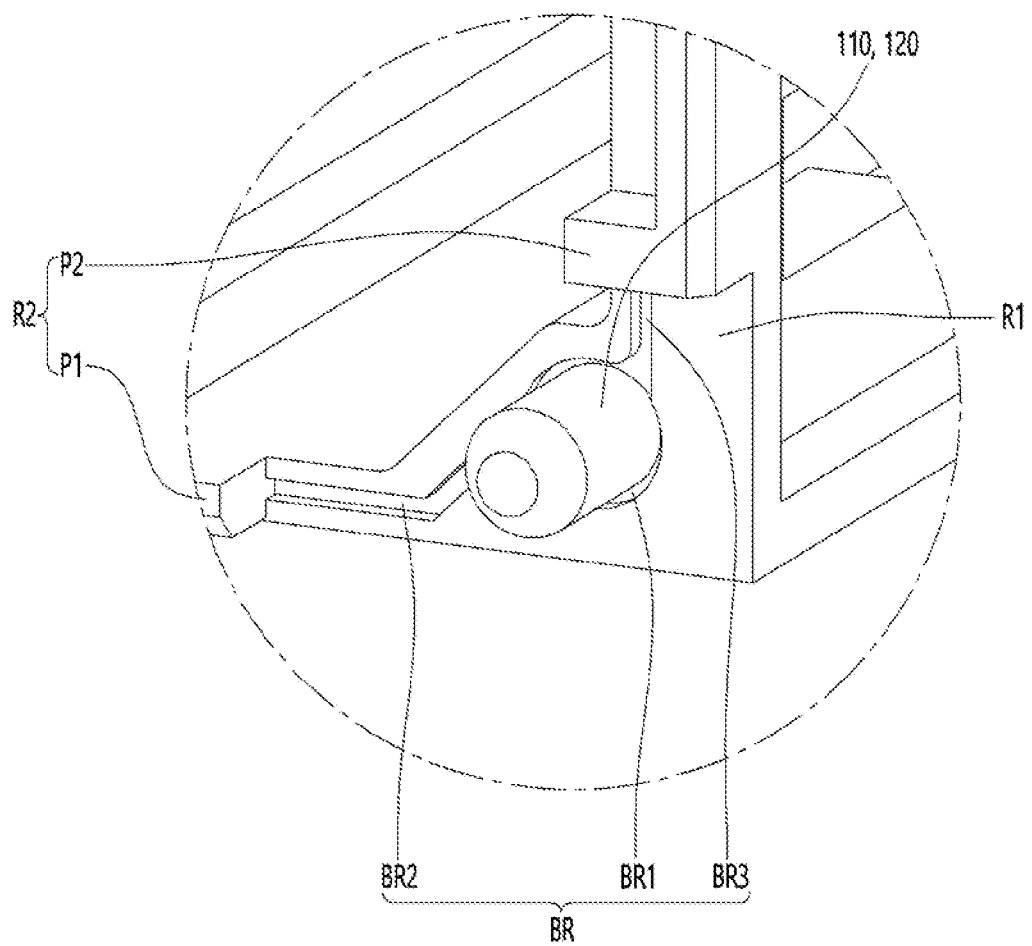

【FIG. 18】
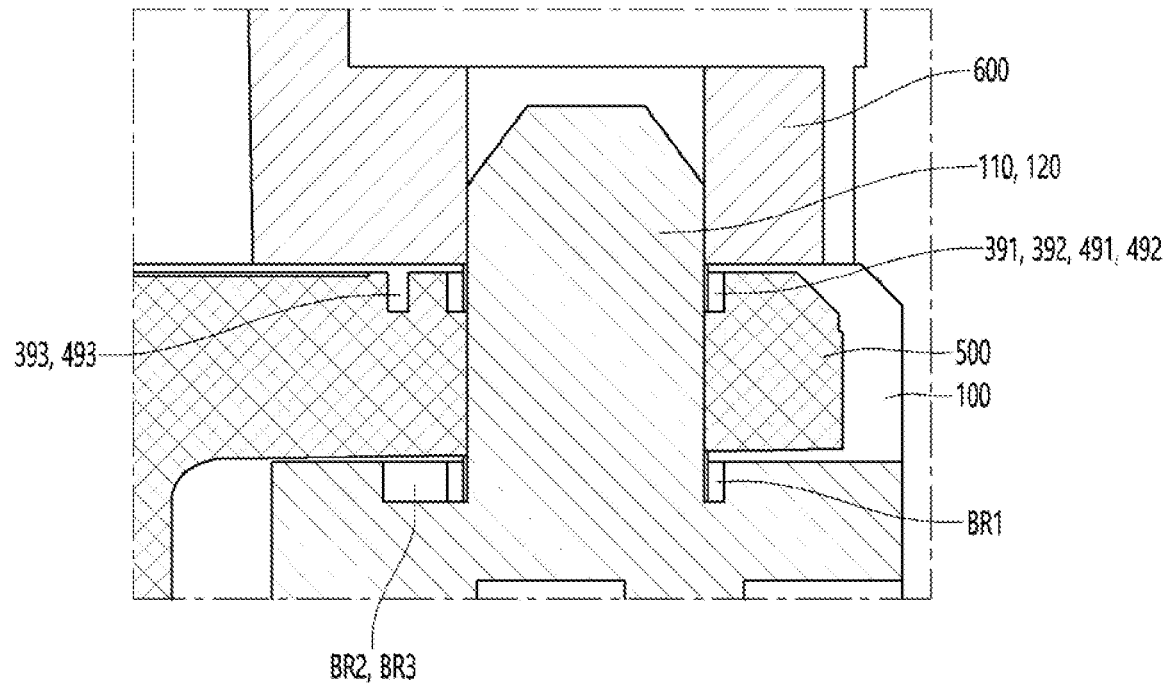
【FIG. 19】
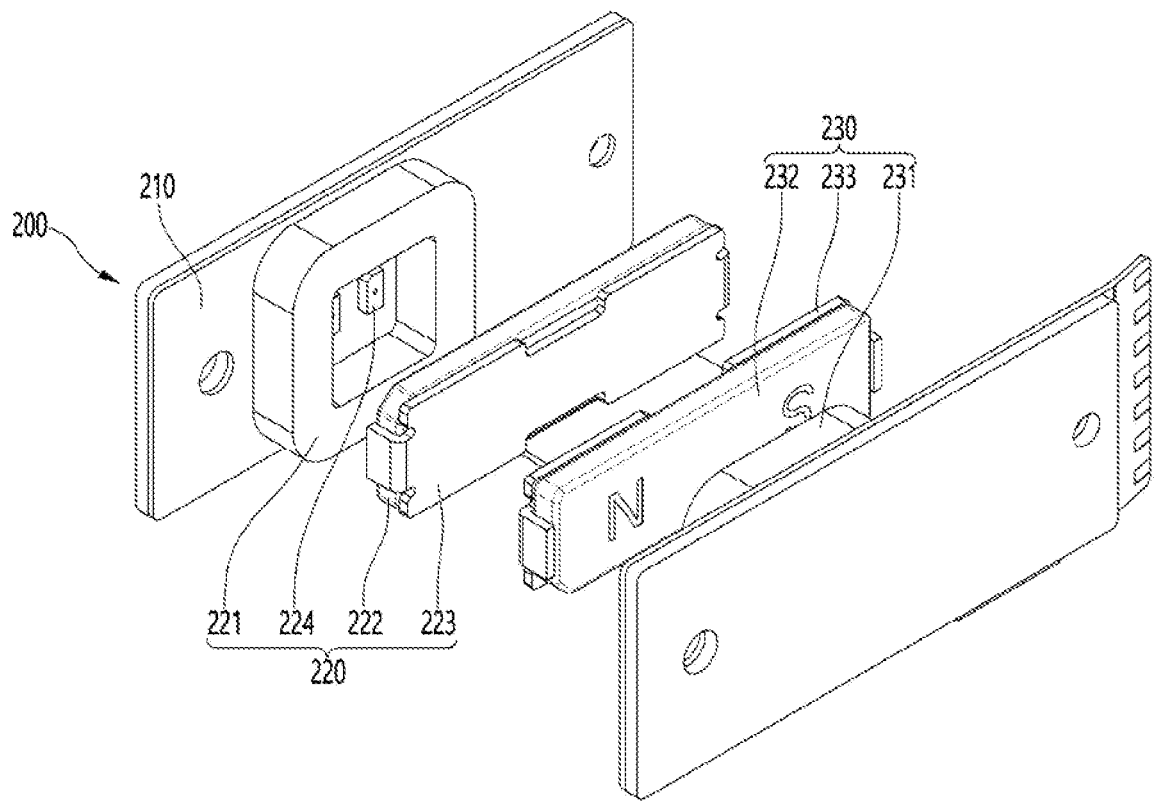

[FIG. 20]
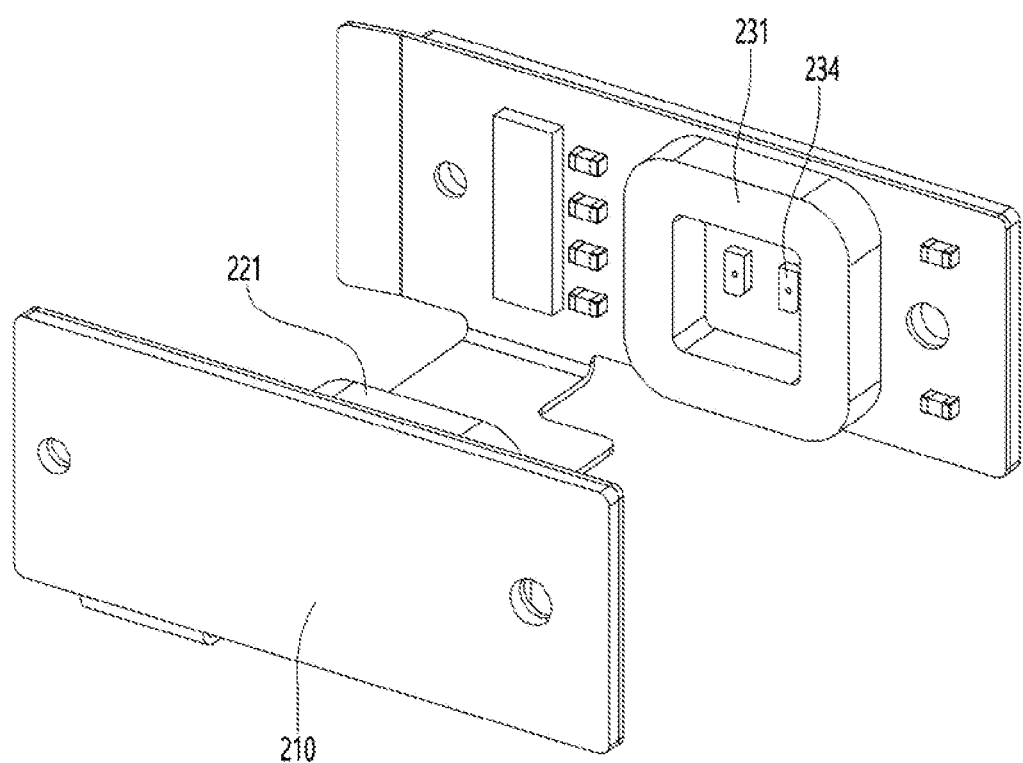

【FIG. 21a】
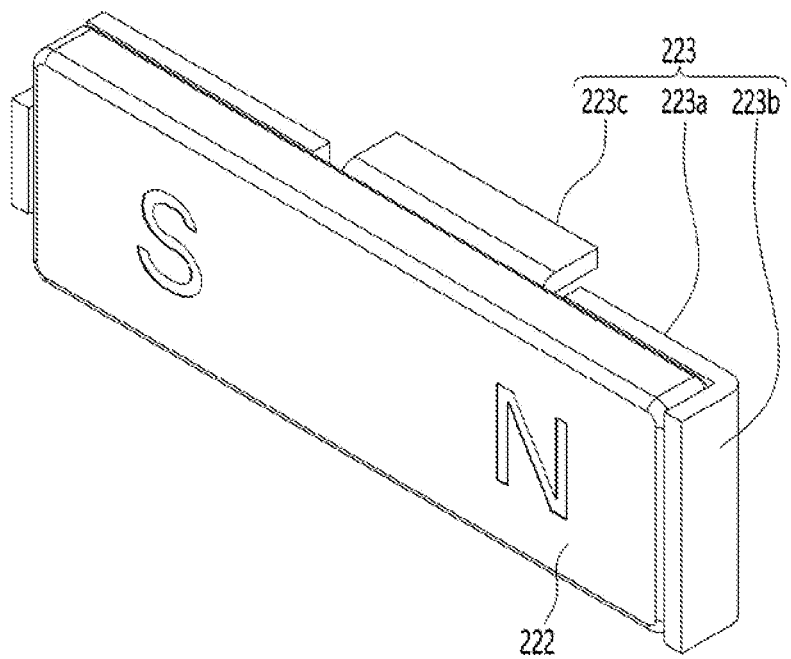
【FIG. 21b】
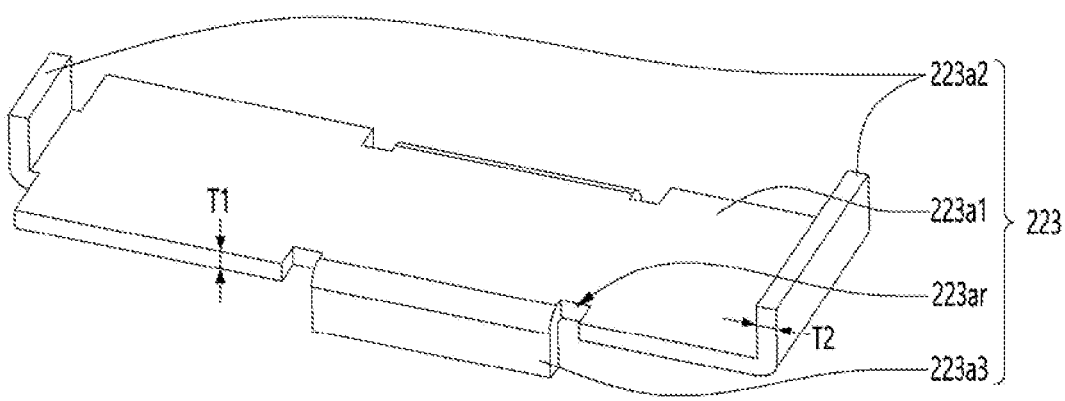

【FIG. 21c】
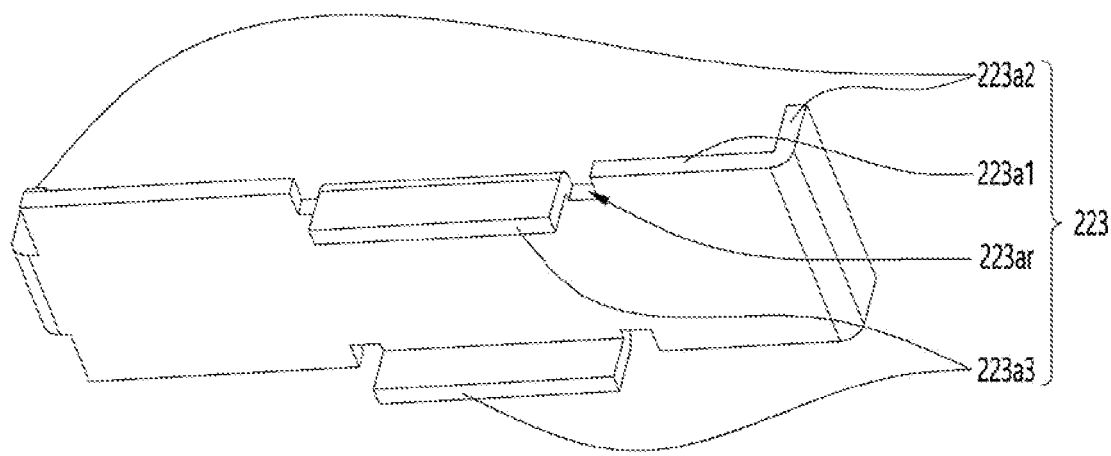
【FIG. 21d】
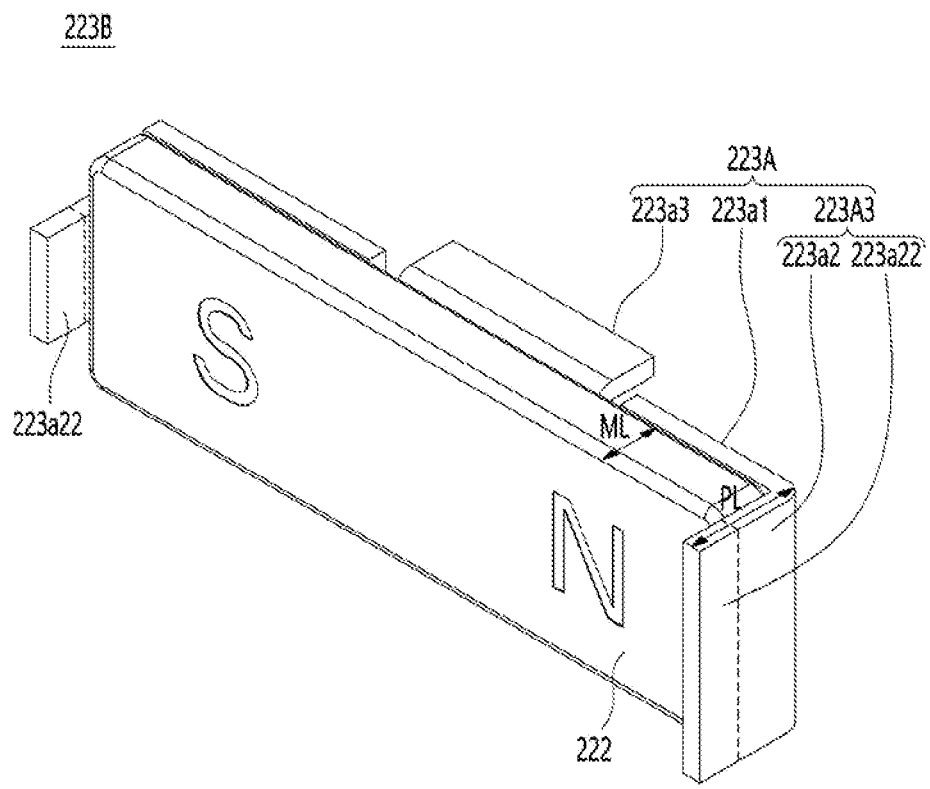

【FIG. 21e】
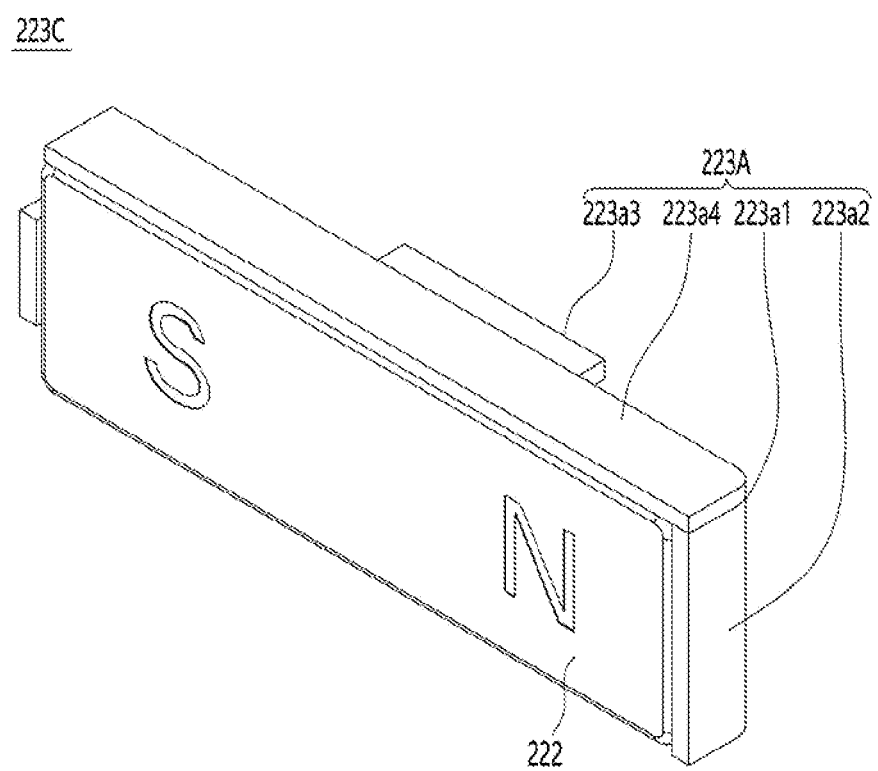

【FIG. 22】
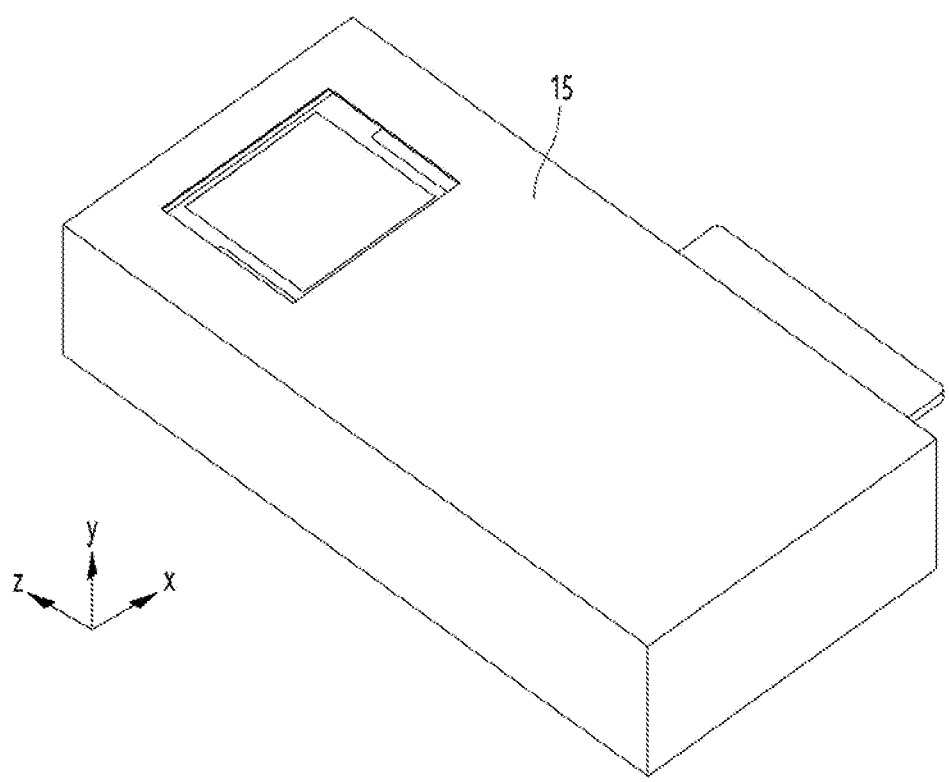

[FIG. 23]
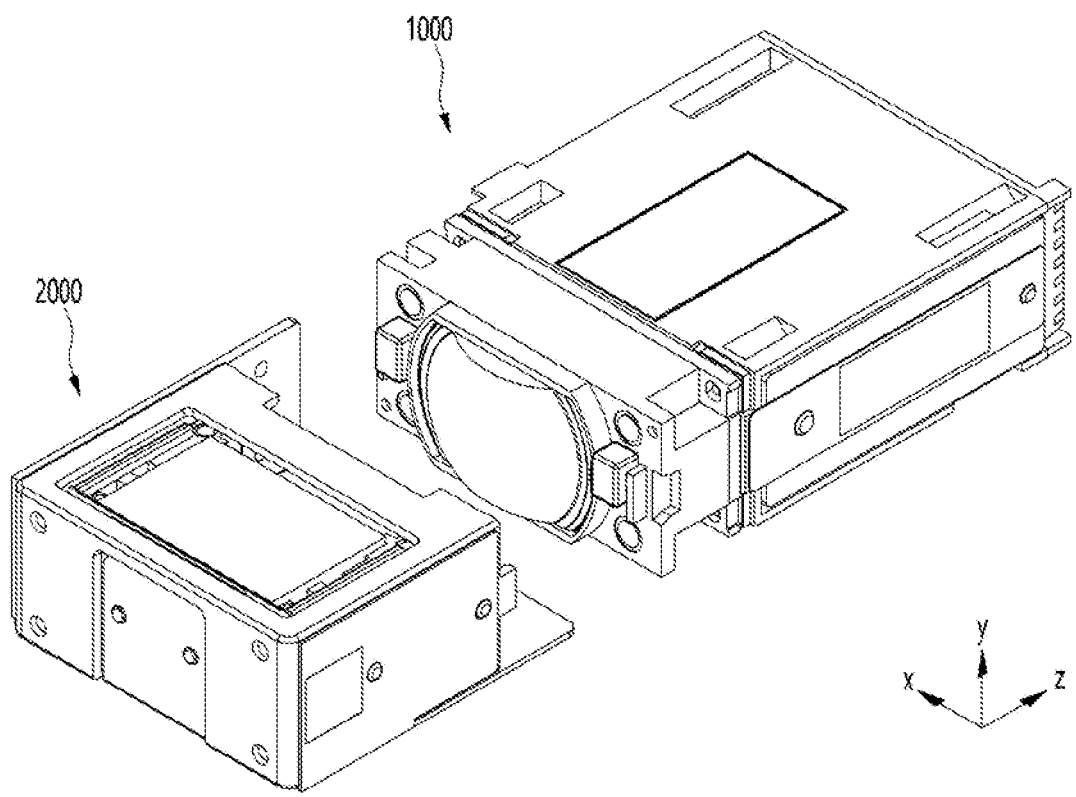

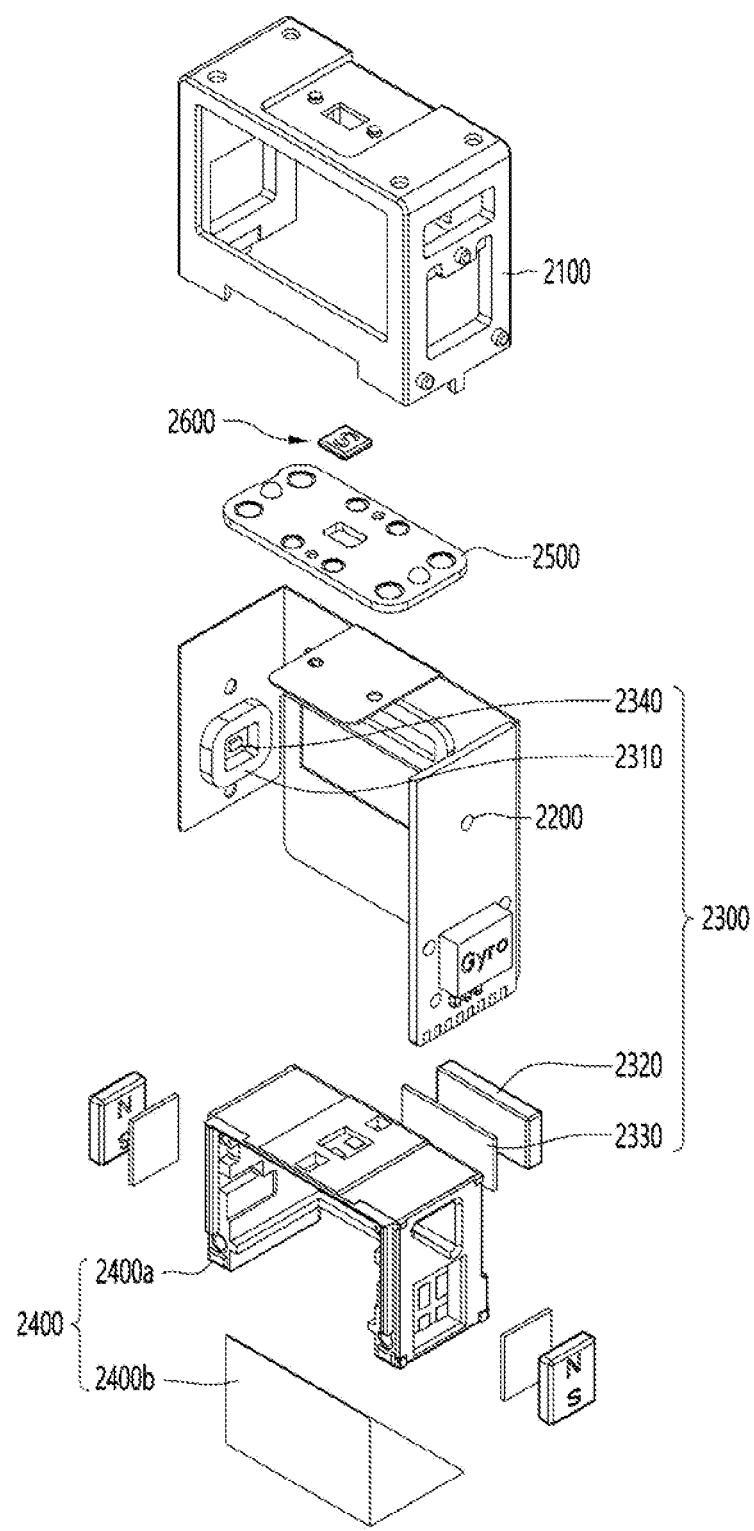
[FIG. 24]

[FIG. 25]
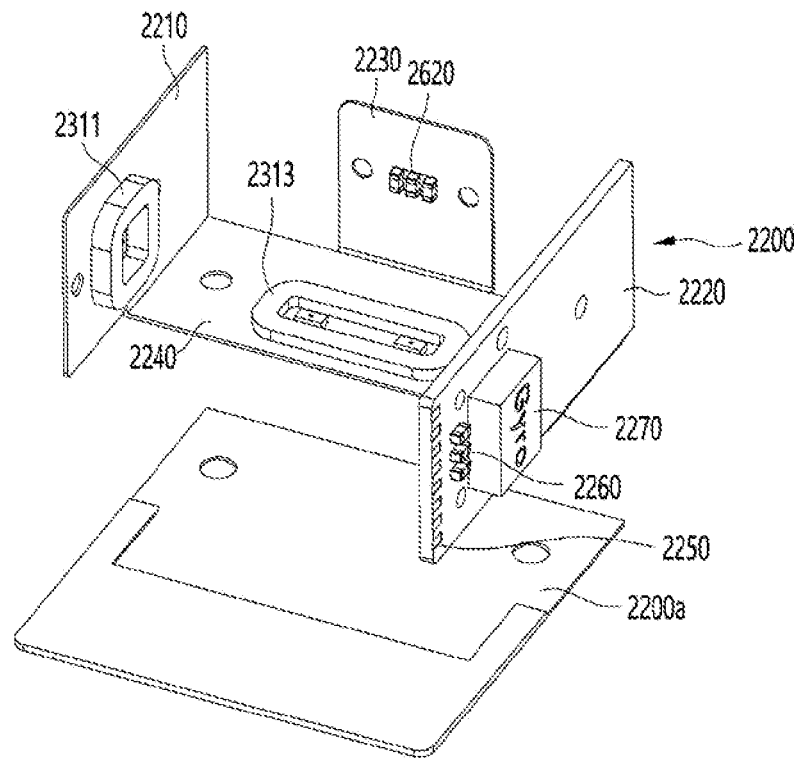
[FIG. 26]
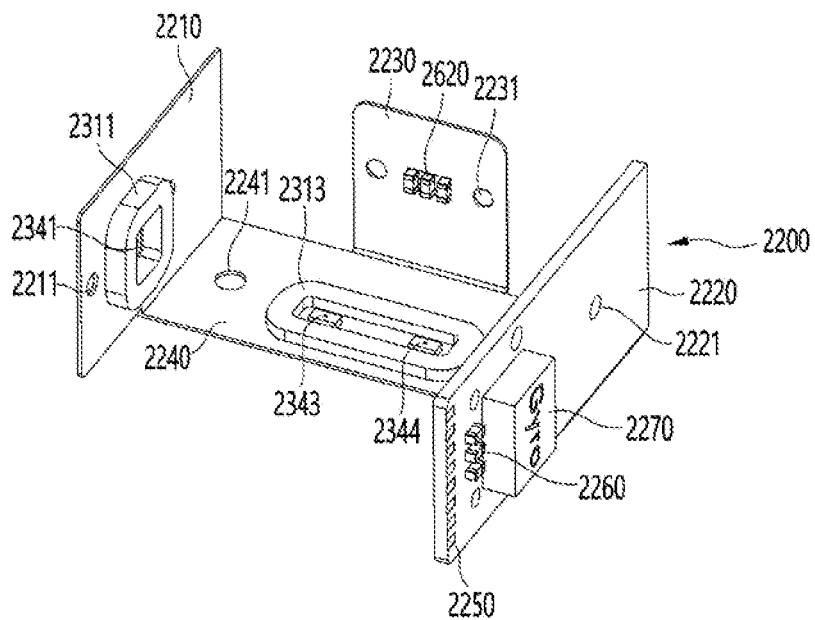

[FIG. 27]
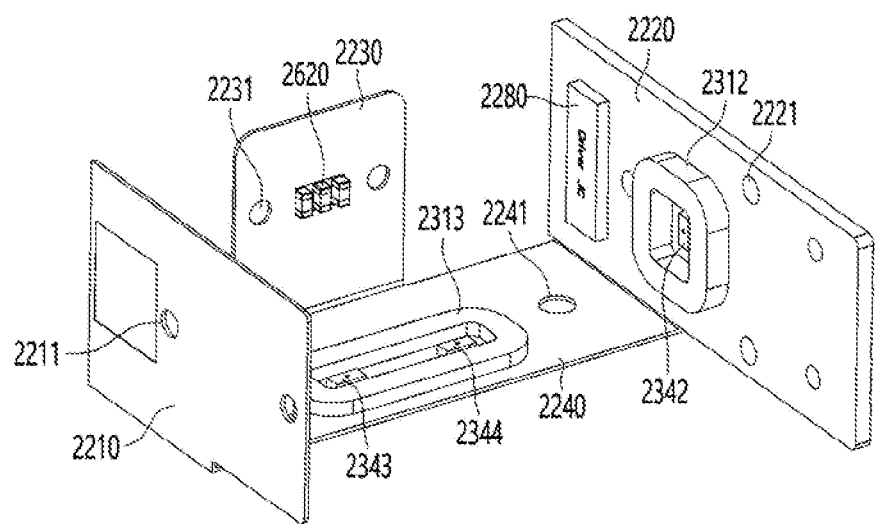
[FIG. 28]
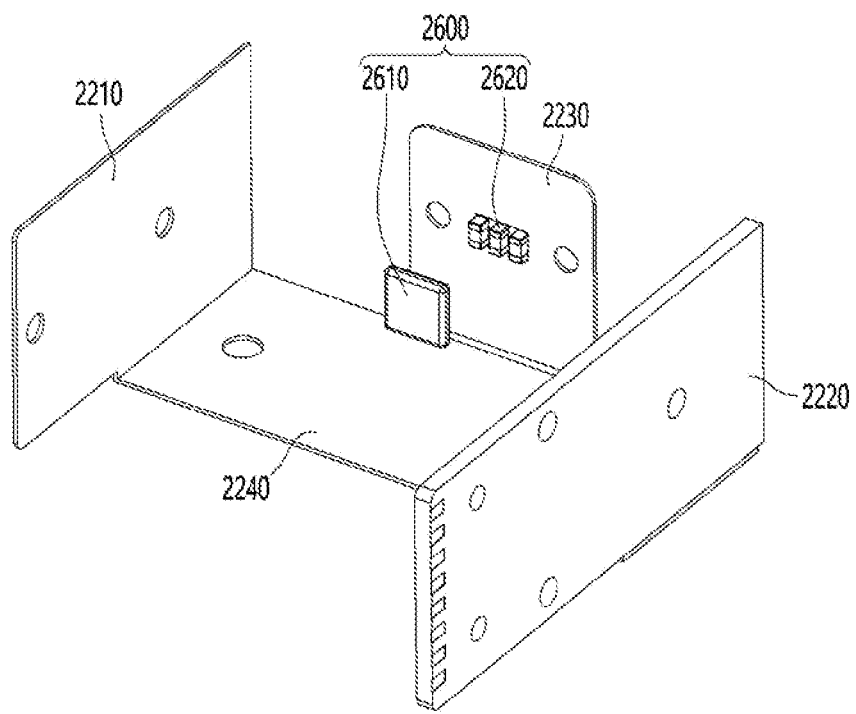

[FIG. 29]
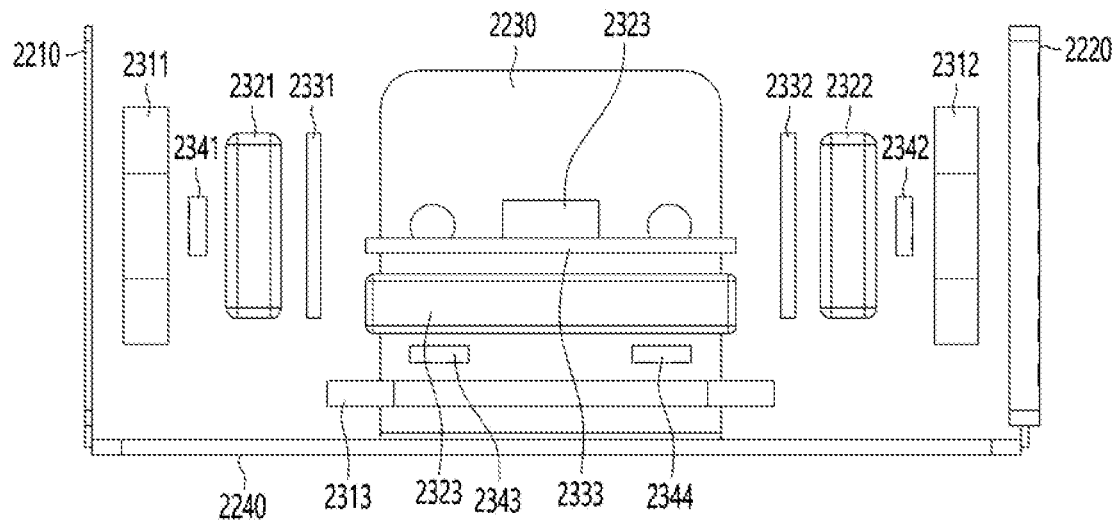
[FIG. 30]
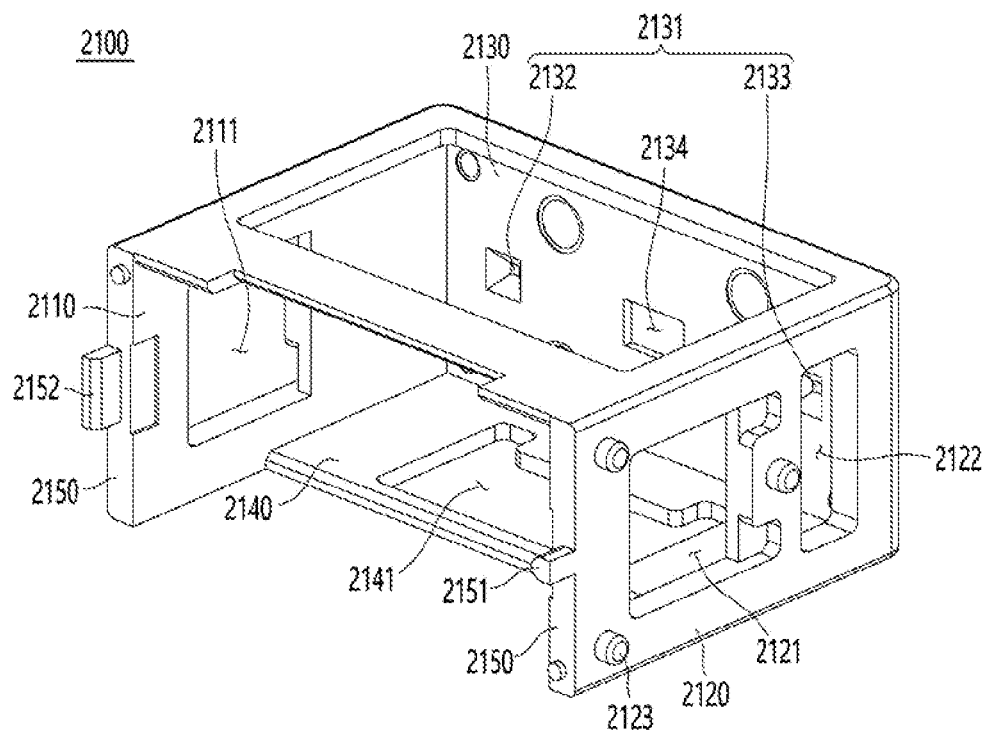

[FIG. 31]
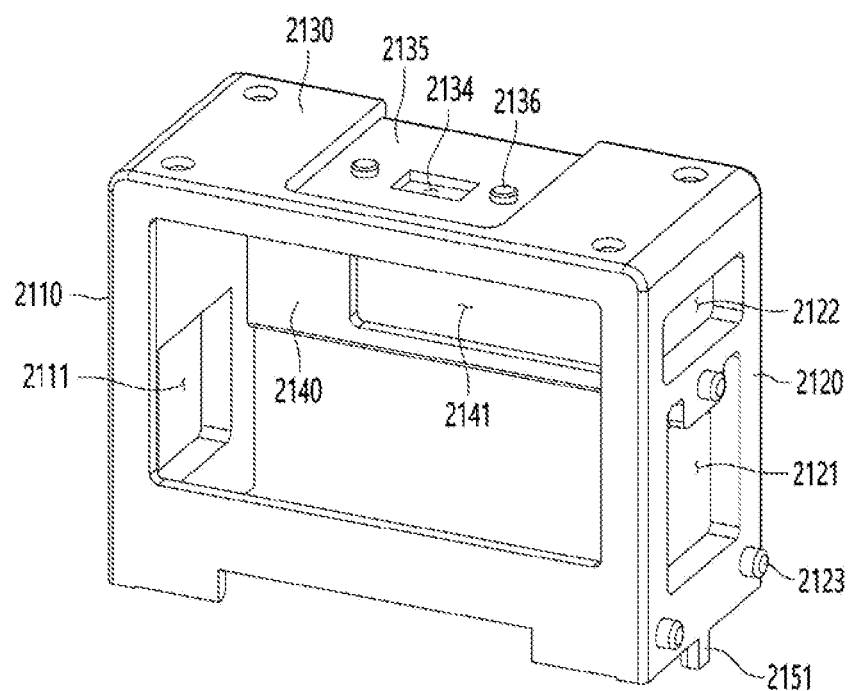

[FIG. 32]
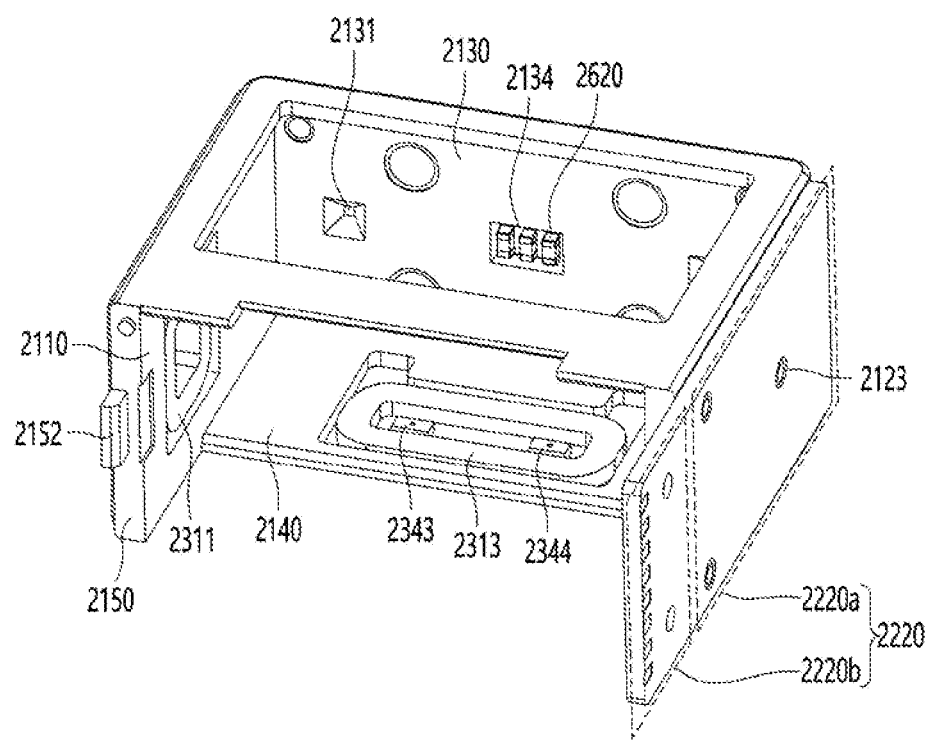

[FIG. 33]
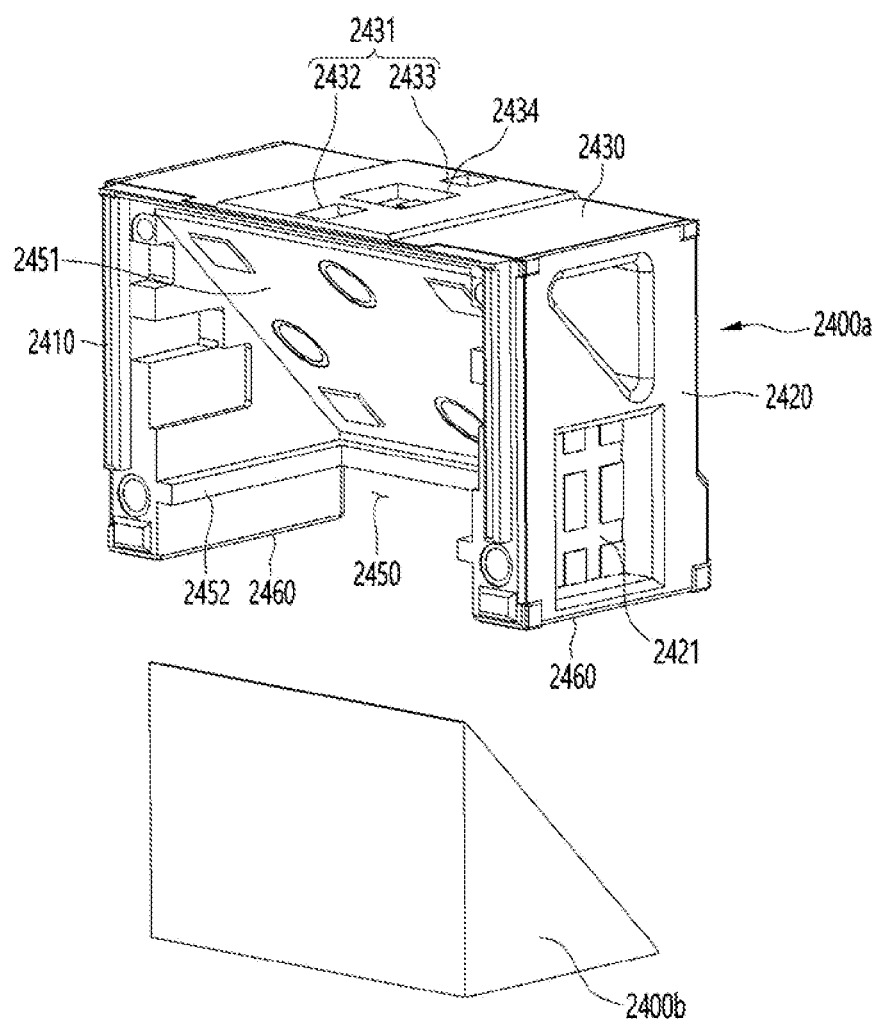

[FIG. 34]
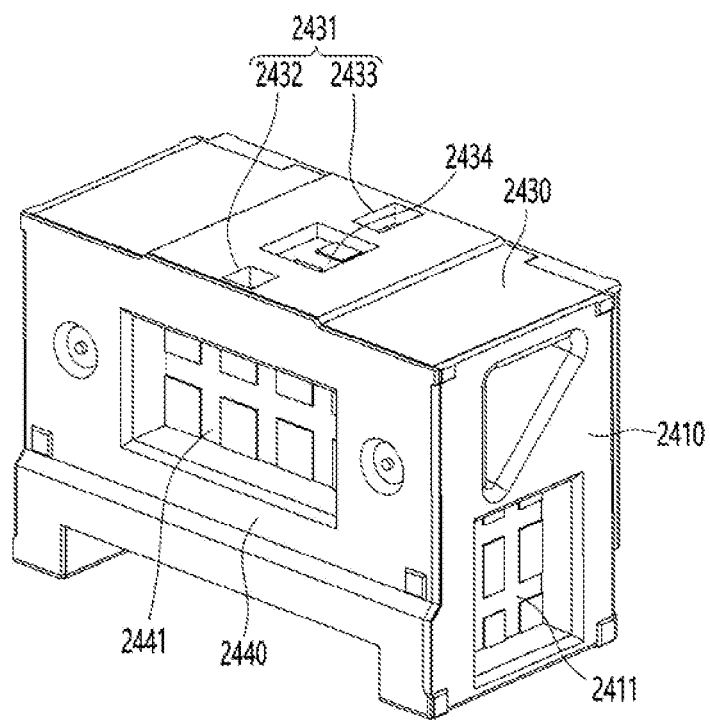

[FIG. 35]
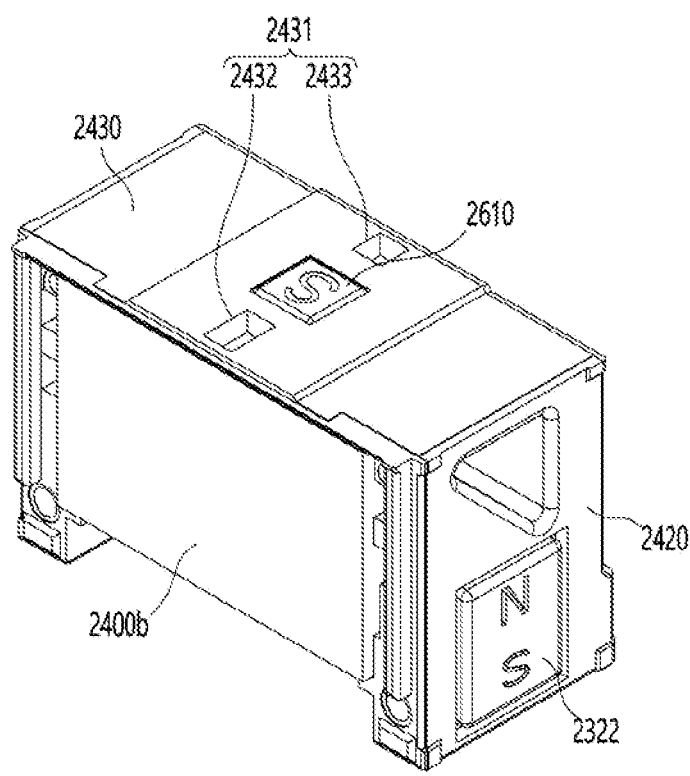

[FIG. 36]
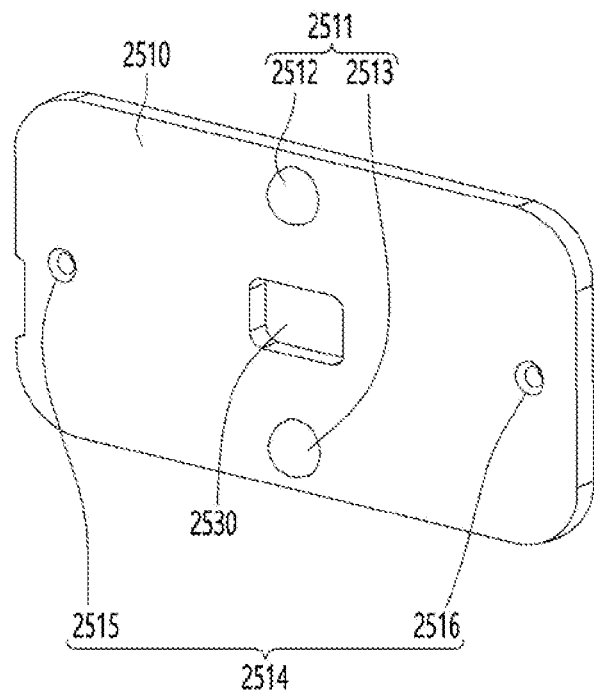
[FIG. 37]
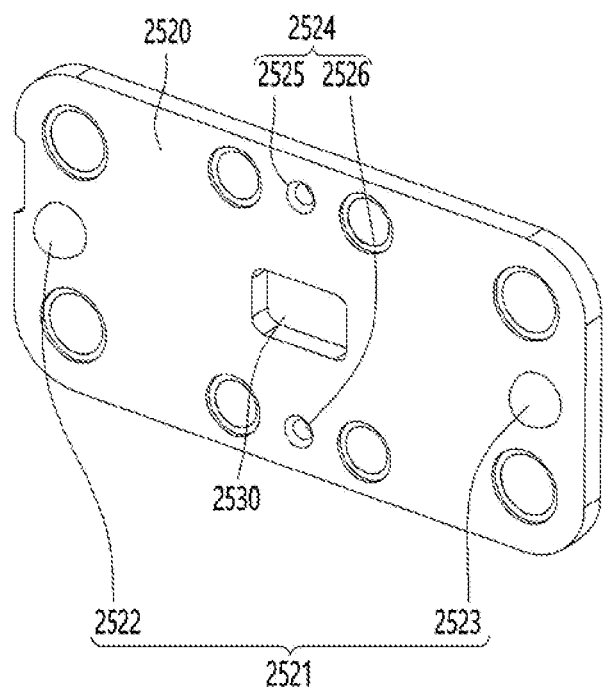

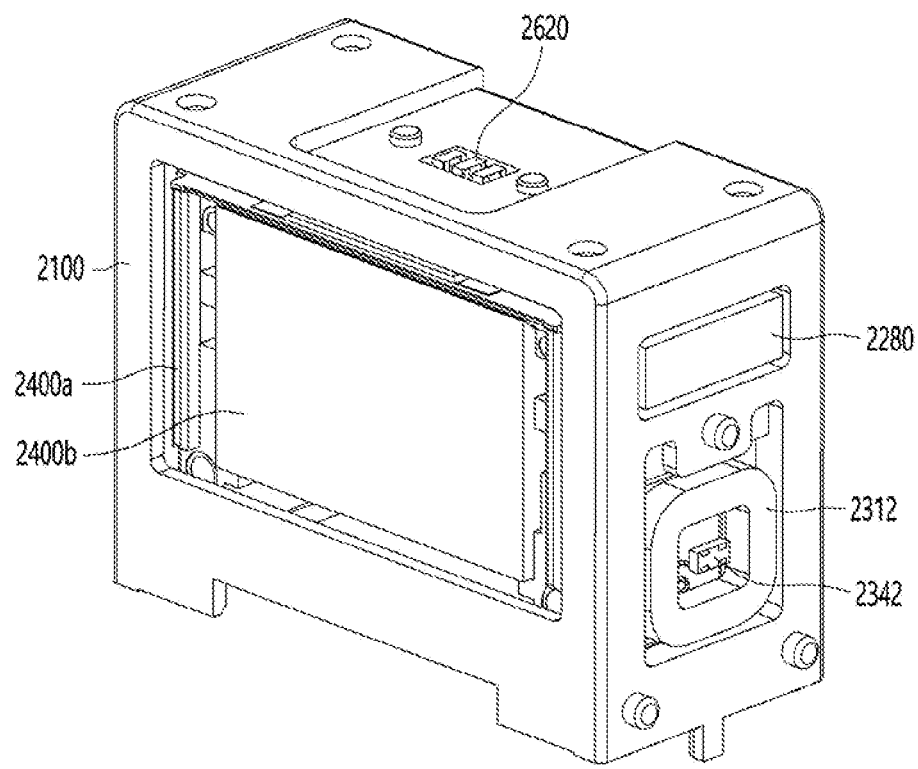
[FIG. 38]

[FIG. 39]
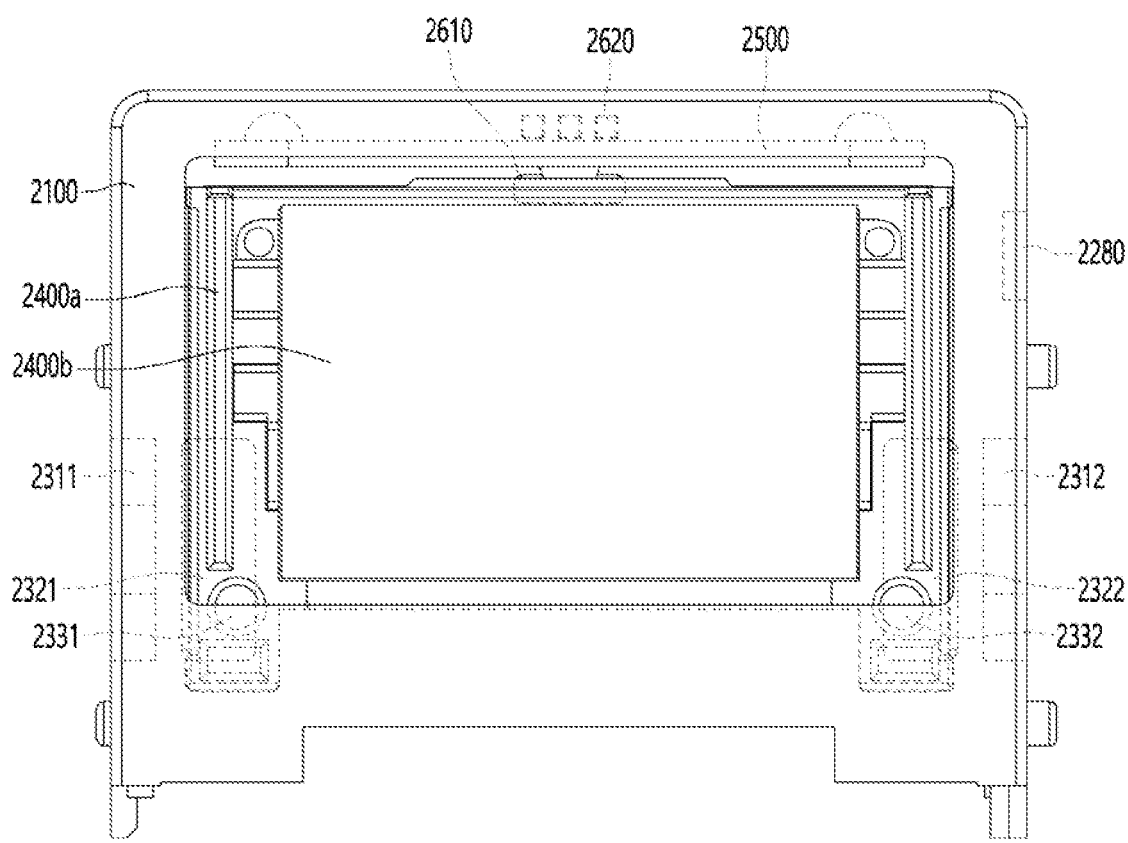

[FIG. 40]
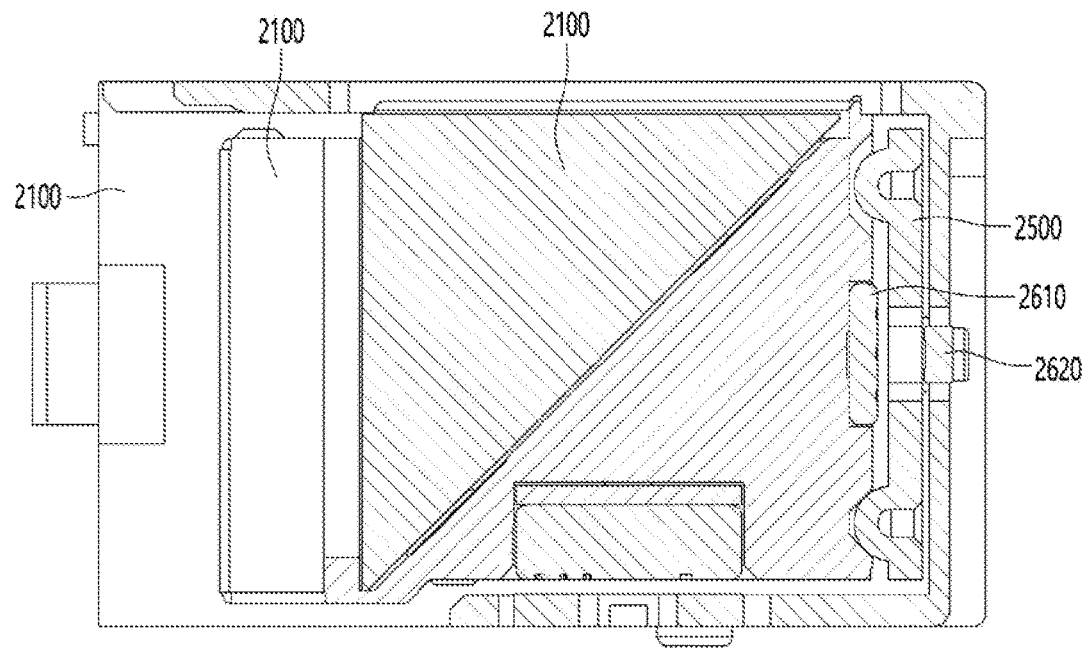
[FIG. 41]
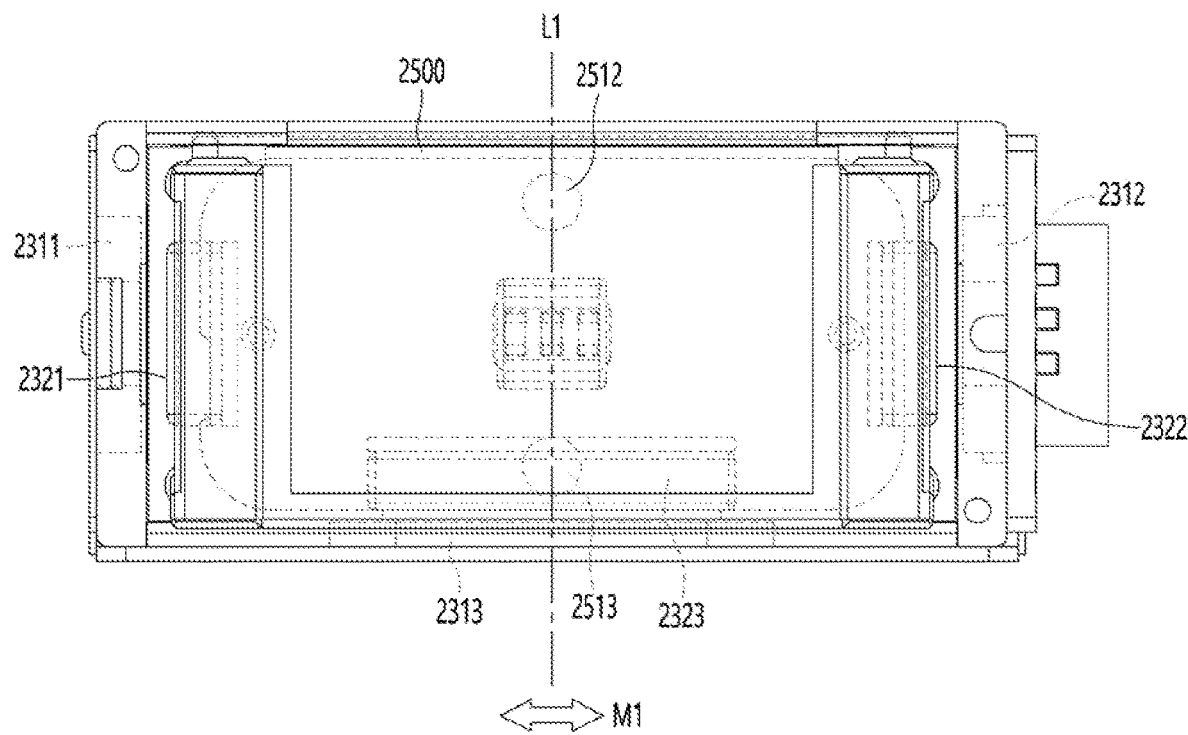

[FIG. 42]
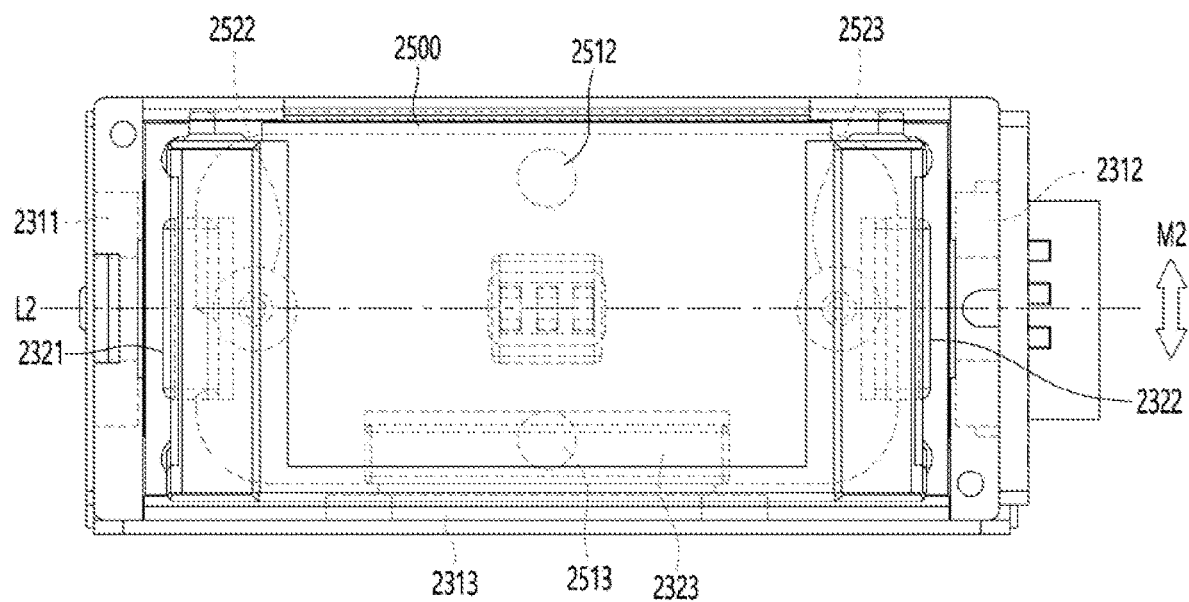

[FIG. 43]
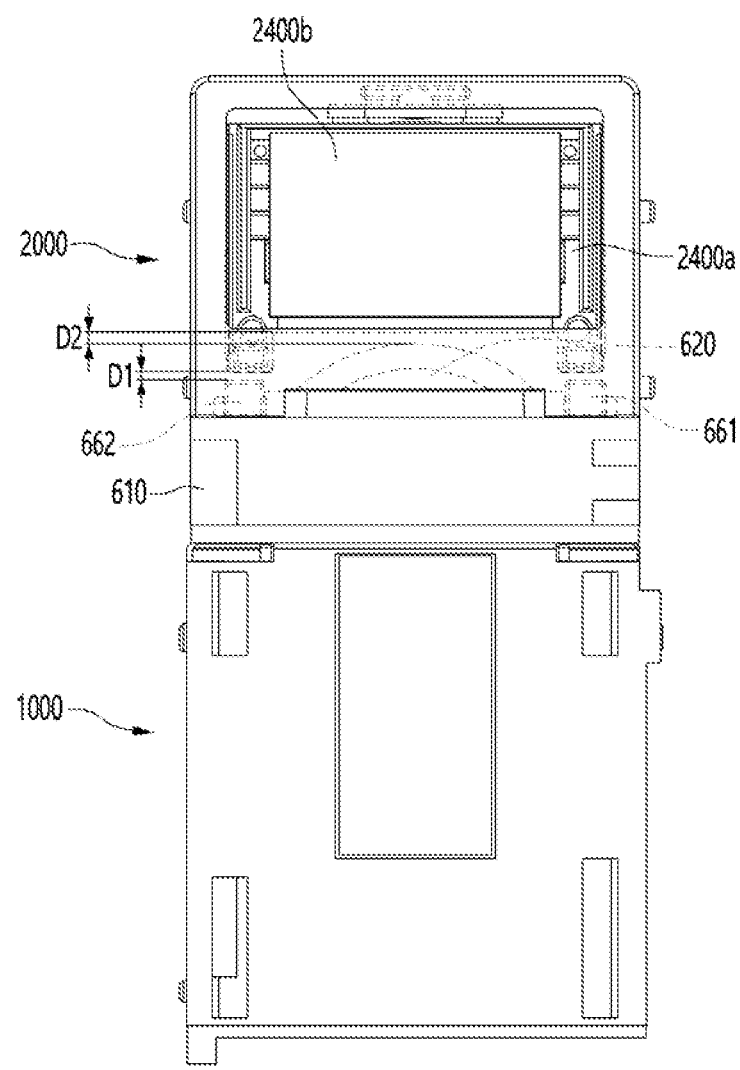

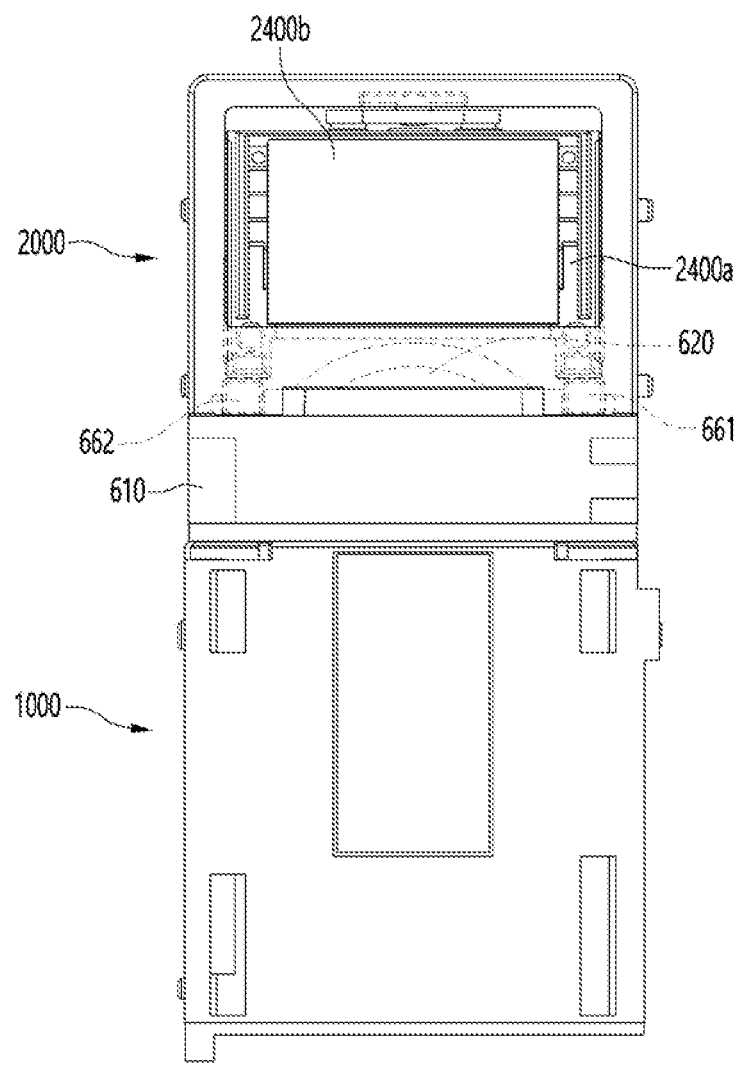
[FIG. 44]

[FIG. 45]
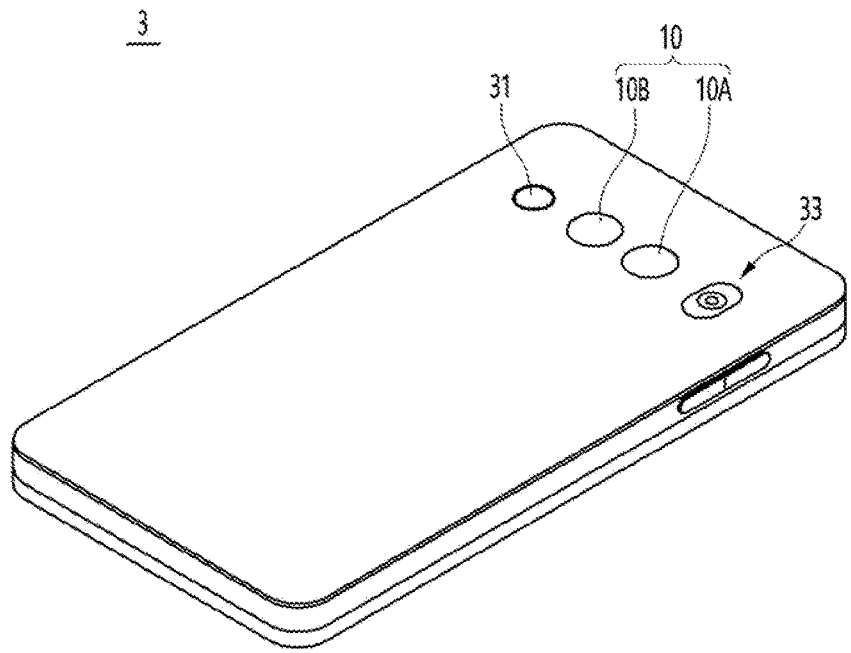
[FIG. 46]
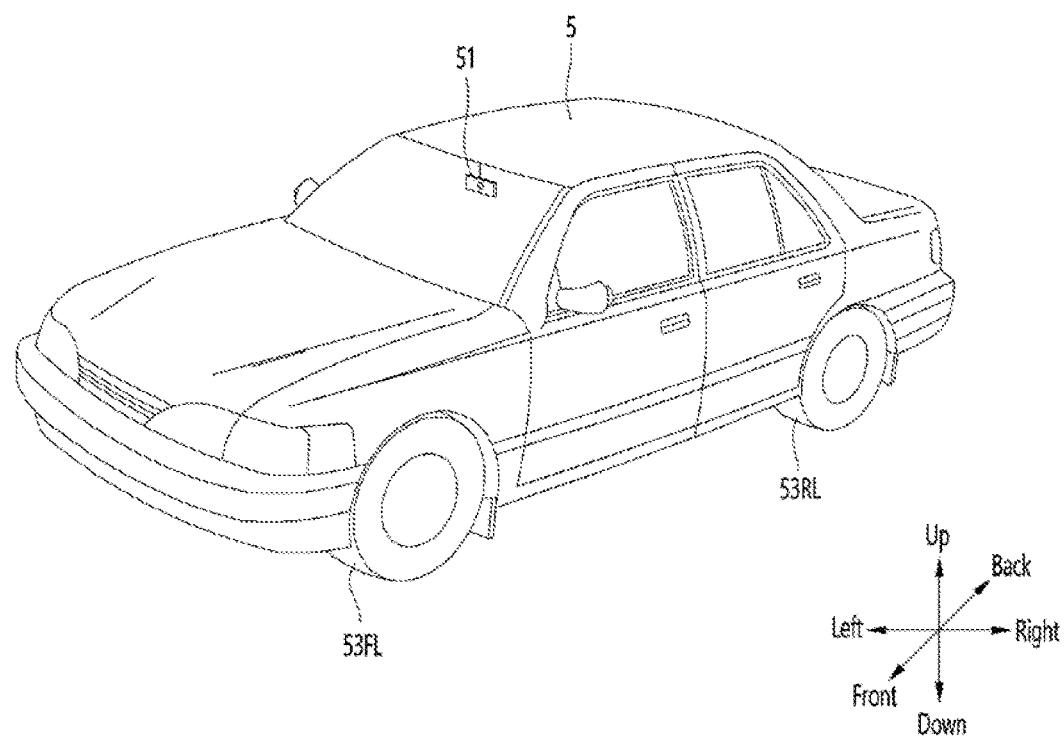

CAMERA ACTUATOR AND CAMERA MODULE INCLUDING SAME

CROSS REFERENCE TO RELATED APPLICATIONS

This application is the National Phase of PCT International Application No. PCT/KR2021/014678, filed on Oct. 20, 2021, which claims priority under 35 U.S.C. 119 (a) to Patent Application No. 10-2020-0136672, filed in the Republic of Korea on Oct. 21, 2020, and Patent Application No. 10-2020-0140544, filed in the Republic of Korea on Oct. 27, 2020, all of which are hereby expressly incorporated by reference into the present application.

TECHNICAL FIELD

An embodiment relates to a camera actuator and a camera module including the same.

BACKGROUND ART

A camera module performs a function of photographing a subject and storing it as an image or a moving image, and is mounted on a mobile terminal such as a mobile phone and various devices such as a laptop a drone, a vehicle, and the like.

In general, an ultra-small camera module is mounted on the device described above and the camera module may perform an autofocus (AF) function adjusting automatically a distance between an image sensor and a lens to adjust a focal length of the lens. In addition, the camera module may perform a zooming function of zooming up or zooming out photographing a subject by increasing or decreasing a magnification of a long-distance subject through a zoom lens.

Further, recently, a camera module adopts an image stabilization (IS) technology to correct or prevent image shake caused by camera movement due to an unstable fixing device or user movement.

Such an image stabilization (IS) technology includes an optical image stabilizer (OIS) technology and an image stabilization technology using an image sensor. Here, the OIS technology is a technology that corrects movement by changing a light path, and the image stabilization technology using the image sensor is a technology that corrects movement by mechanical and electronic methods, and recently the OIS technology is often used.

The camera module uses a zoom actuator for a zooming function. These zoom actuators move positions of a plurality of zoom lens groups for auto focusing and change of zoom magnification.

In addition, the camera module uses an OIS actuator to prevent image shaking. The OIS actuator may include a reflective member capable of changing a path of light, a mover on which the reflective member is disposed, and a driving part that changes a position of the reflective member by moving the mover. In detail, the camera module may change the path of light by controlling the position of the reflective member with a driving force applied from the driving part. As such the driving part, the position of the reflective member may be controlled by using a driving part of a voice coil motor (VCM) type including a coil, a magnet, and the like.

DISCLOSURE

Technical Problem

An embodiment provides a camera actuator capable of preventing damage to a lens group due to external impact and a camera module including the same.

In addition, the embodiment provides a camera actuator having improved optical characteristics and a camera module including the same.

In addition, the embodiment provides a camera actuator capable of auto focus and high magnification zoom, and a camera module including the same.

In addition, the embodiment provides a camera actuator that can improve assembly reliability of the camera module and a camera module including the same.

In addition, the embodiment provides a camera module with improved flowability of an adhesive member, and a camera device including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera actuator according to an embodiment comprises a base; a rail guide part coupled to the base; a first lens assembly coupled to the base and fixed; and second and third lens assemblies disposed in the base and moving along the rail guide part, wherein the base includes a coupling protrusion and a base recess adjacent to the coupling protrusion; and at least one of the rail guide part and the first lens assembly includes a coupling hole corresponding to the coupling protrusion of the base.

In addition, the base includes a first region in which the coupling protrusion is formed and a second region having a step difference with the first region.

In addition, the base recess includes a first portion formed in the first region and a second portion extending from the first portion and connected to the second region of the base.

In addition, the base includes a first sidewall and a second sidewall corresponding to the first sidewall, wherein the rail guide part includes: a first guide part disposed adjacent to the first sidewall of the base and including a first rail; and a second guide part disposed adjacent to the second sidewall of the base and including a second rail; wherein the second lens assembly moves along the first rail of the first guide part, and the third lens assembly moves along the second rail of the second guide part.

In addition, the coupling protrusion includes a first coupling protrusion corresponding to the first guide part and a second coupling protrusion corresponding to the second guide part, and the base recess includes first and second base recesses corresponding to the first and second coupling protrusions.

In addition, the first base recess is disposed to face the first guide part, and the second base recess is disposed to face the second guide part.

In addition, the first guide part includes a first coupling hole coupled to the first coupling protrusion; and a first recess formed around the first coupling hole.

In addition, the second guide part includes a second coupling hole coupled to the second coupling protrusion; and a second recess formed around the second coupling hole.

In addition, each of the first coupling protrusion and the second coupling protrusion is provided in plurality, wherein the first coupling hole is provided in plurality to correspond to the first coupling protrusion, and the second coupling hole is provided in plurality to correspond to the second coupling protrusion.

In addition, the first guide part includes a first extension recess spaced apart from the plurality of first coupling holes and extending in a direction in which the plurality of first coupling holes are separated, and the second guide part includes a second extension recess spaced apart from the plurality of second coupling holes and extending in a direction in which the plurality of second coupling holes are separated.

In addition, the plurality of first coupling holes have different sizes, and the plurality of second coupling holes have different sizes.

In addition, the first recess, the second recess, the first extension recess, and the second extension recess are formed to face the first lens assembly.

In addition, the first and second coupling holes positioned in an opposite direction among the plurality of first and second coupling holes have a same size.

In addition, the first lens assembly is disposed on one side of the base, and the camera actuator further comprises a fourth lens assembly disposed on the other side of the base opposite to the first lens assembly with the second and third lens assemblies interposed therebetween.

A camera actuator according to an embodiment comprises a base; a rail guide part coupled to the base; a first lens assembly coupled to the base and fixed; and second and third lens assemblies disposed in the base and moving along the rail guide part, wherein the first lens assembly includes a first lens barrel including an opening and including a first surface and a second surface opposite to the first surface and facing the second lens assembly; and a first lens group disposed within the opening of the first lens barrel; wherein the first lens barrel includes a first rib formed on the first surface; and a first stopper inserted in the first rib.

In addition, the first rib includes a first-first rib disposed on a first side of the opening of the first surface of the first lens barrel; a first-second rib disposed on a second side of the first surface of the first lens barrel opposite to the first side of the opening; wherein the first stopper includes a first-first stopper inserted in the first-first rib and a first-second stopper inserted in the first-second rib.

In addition, the first lens barrel includes a first coupling recess disposed adjacent to the first-first rib and a second coupling recess disposed adjacent to the first-second rib.

In addition, a shape or a size of the first coupling recess is different from that of the second coupling recess.

In addition, the first lens barrel includes a second rib formed on the second surface, and a second stopper inserted in the second rib and limiting movement of the second lens assembly.

A camera module according to the embodiment a first camera actuator; and a second camera actuator coupled to the first camera actuator; wherein the first camera actuator includes a first lens assembly and a first stopper disposed on the first lens assembly, and the second camera actuator includes a housing, a prism mover disposed in the housing, and a prism disposed on the prism mover, wherein the prism mover is spaced apart from the first stopper by a first distance, and the prism is spaced apart from the first lens assembly by a second distance, and the first distance is smaller than the second distance.

In addition, the first camera actuator comprises a base to which the first lens assembly is coupled; a rail guide part coupled to the base; and second and third lens assemblies disposed in the base and moving along the rail guide part, wherein the first lens assembly includes a first lens barrel including an opening, a first surface facing the prism mover and the prism, and a second surface facing the second lens assembly; and a first lens group disposed in the opening of the first lens barrel; wherein the first lens barrel includes a first rib formed on the first surface; and the stopper is inserted in the first rib.

In addition, the first camera actuator includes a first coupling recess and a second coupling recess formed on the first lens barrel, and wherein a shape or size of the first coupling recess is different from a shape or size of the second coupling recess.

In addition, the second camera actuator includes a first coupling protrusion formed on the housing and corresponding to the first coupling recess, and a second coupling protrusion corresponding to the second coupling recess.

In addition, the prism is disposed directly facing the first lens group, and the second distance is a distance between the prism and the first lens group.

Advantageous Effects

A camera actuator according to an embodiment and a camera module including the same may improve assembly reliability.

In detail, the camera actuator and camera module according to the embodiment includes a base recess formed around a coupling protrusion of a base and designating a flow path for an adhesive member. Accordingly, the embodiment can solve a problem that the adhesive member overflows to an inside of the base, thereby improving assembly reliability. In addition, the base recess of the embodiment includes an extension portion extending around the coupling protrusion of the base. Accordingly, the embodiment can further prevent the adhesive member from penetrating into the base, thereby improving product reliability.

In addition, the camera actuator according to the embodiment and the camera module including the same include a recess formed around a coupling hole of a rail guide part. Accordingly, the embodiment can prevent overflow of the adhesive member that may occur when the rail guide part and the lens assembly are coupled. In this case, the recess is spaced apart from the coupling hole and divides a region between a region where the coupling hole is formed and a rail of the rail guide part. Accordingly, the embodiment can prevent the adhesive member from penetrating into the rail of the rail guide part, thereby improving the movement accuracy of the lens assembly.

In addition, the camera module according to the embodiment may prevent damage to the first lens assembly constituting the first camera actuator. Specifically, the first camera actuator of the embodiment includes a stopper. The stopper is disposed between the first camera actuator and the second camera actuator. When the prism unit of the second camera actuator is detached from the housing, the stopper prevents contact between the lens of the first camera actuator and the prism unit. Accordingly, the embodiment can prevent damage to the first camera actuator that may occur when the prism unit of the second camera actuator is detached from the housing.

The camera actuator and camera module according to the embodiment can reduce the number of components and thereby reduce manufacturing cost. That is, the embodiment uses an electronic component disposed on a substrate as a component of a pressing part for pressing the prism unit to the housing. Specifically, the pulling member of the embodiment includes a magnetic electronic component disposed on a substrate. Specifically, the second pulling member of the pressing part of the embodiment may be a capacitor disposed on the substrate 200 and having magnetism. According to this embodiment, a separate magnet or yoke constituting the second pulling member can be omitted, and thus the manufacturing cost can be reduced.

In addition, the camera actuator and camera module according to the embodiment may improve reliability of OIS operation. For example, a comparative example includes a separate magnet constituting the pressing part. In the comparative example, an external force may be generated by an attractive force generated between a magnet constituting the pressing part and a capacitor, and this may cause a problem in OIS operation reliability. Alternatively, the embodiment can remove the external force by using the capacitor as a pulling member, thereby improving reliability of OIS operation.

DESCRIPTION OF DRAWINGS

FIG. 1 is a perspective view of a first camera actuator according to an embodiment.

FIG. 2 is a perspective view of the first camera actuator of FIG. 1 in which some components are omitted.

FIG. 3 is an exploded perspective view of the first camera actuator shown in FIG. 1.

FIG. 4 is an enlarged perspective view of one side of a rail guide part according to an embodiment.

FIG. 5 is an enlarged view of a specific region of the rail guide part of FIG. 4.

FIG. 6 is an enlarged perspective view of the other side of a rail guide part.

FIG. 7 is a perspective view of the second lens assembly shown in FIG. 3.

FIG. 8 is a perspective view of the second lens assembly shown in FIG. 7 in which some components are omitted.

FIG. 9 is a perspective view of the third lens assembly shown in FIG. 3.

FIG. 10 is a perspective view of the third lens assembly shown in FIG. 9 in which some components are omitted.

FIG. 11 is a cross-sectional view in a x-axis direction of the camera module according to the embodiment shown in FIG. 2.

FIG. 12 is an exemplary view of driving a second lens assembly according to an embodiment.

FIG. 13 is an exploded perspective view of a first lens assembly according to an embodiment.

FIG. 14A is a first perspective view of the first lens assembly of FIG. 13 in which a first lens group is omitted.

FIG. 14B is a second perspective view of the first lens assembly of FIG. 13 in which a first lens group is omitted.

FIG. 15 is a perspective view of a base in a first camera actuator according to an embodiment.

FIG. 16 is a front view of the base shown in FIG. 15.

FIG. 17 is an enlarged view of a region where coupling protrusion of a base is formed.

FIG. 18 is a cross-sectional view of a base, a rail guide part, and a first lens assembly in a coupled state according to an embodiment.

FIGS. 19 and 20 are perspective views illustrating a driving part according to an embodiment.

FIG. 21A is a perspective view of a part of a first driving part shown in FIG. 19.

FIG. 21B is a detailed perspective view of a first yoke of a first driving part according to an embodiment.

FIG. 21C is a bottom perspective view of a first yoke of the embodiment.

FIG. 21D is a perspective view of some components of a first driving part according to a first additional embodiment.

FIG. 21E is a perspective view of some components of a first driving part according to a second additional embodiment.

FIG. 22 is a perspective view of a camera module according to an embodiment.

FIG. 23 is a perspective view of a camera module according to the embodiment in which some components are omitted.

FIG. 24 is an exploded perspective view of a second camera actuator shown in FIG. 23.

FIG. 25 is a perspective view of a part of an image shaking control unit of a second camera actuator.

FIG. 26 is a perspective view of a substrate of a second camera actuator viewed from a first direction.

FIG. 27 is a perspective view of a substrate of a second camera actuator viewed from a second direction.

FIG. 28 is a view for explaining a pressing part disposed on a substrate of a second camera actuator.

FIG. 29 is an exploded perspective view of a substrate and a driving part of a second camera actuator.

FIGS. 30 to 32 are perspective views of a second housing of a second camera actuator according to an embodiment.

FIGS. 33 to 35 are views of a prism unit of a second camera actuator.

FIG. 36 is a front perspective view of a moving plate constituting a second camera actuator.

FIG. 37 is a rear perspective view of a moving plate constituting a second camera actuator.

FIGS. 38 to 40 are views of a coupling relationship among a housing, a prism unit, a pressing part, and a moving plate in a second camera actuator.

FIGS. 41 and 42 are exemplary views of operation of a second camera actuator according to an embodiment.

FIGS. 43 and 44 are coupling views of a first camera actuator and a second camera actuator according to an embodiment.

FIG. 45 is a perspective view of a mobile terminal to which a camera module according to an embodiment is applied.

FIG. 46 is a perspective view of a vehicle to which a camera module according to an embodiment is applied.

MODE FOR INVENTION

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

An optical axis direction used below is defined as an optical axis direction of a camera actuator and a lens coupled to a camera module, and a vertical direction may be defined as a direction perpendicular to the optical axis.

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor.

Meanwhile, "auto focus" may correspond to "AF (Auto Focus)". In addition, a closed-loop auto focus (CLAF) control may be defined as real-time feedback control of the lens position by sensing the distance between the image sensor and the lens to improve focus adjustment accuracy.

In addition, before a description of an embodiment of the present invention, a first direction may mean a x-axis direction shown in drawings, and a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, a configuration of the camera module according to a present embodiment will be described with reference to the drawings.

Embodiment

The camera module 10 according to the embodiment may include one or a plurality of actuators. For example, the camera module 10 may include a first camera actuator 1000 and a second camera actuator 2000.

The first camera actuator 1000 may be a zoom and/or auto focus actuator. The first camera actuator 1000 may include a plurality of lens groups. The first camera actuator 1000 may perform a zoom or auto focus function by moving at least one lens in an optical axis direction according to a control signal from a controller (not shown).

The second camera actuator 2000 may be an Optical Image Stabilizer (OIS) actuator. In this case, light incident on the camera module 10 from the outside may be firstly incident on the second camera actuator 2000. In addition, the path of the light incident on the second camera actuator 2000 may be changed to be incident on the first camera actuator 1000. Subsequently, the light passing through the first camera actuator 1000 may be incident to an image sensor (not shown).

Hereinafter, the first camera actuator 1000 according to an embodiment will be described.

<First Camera Actuator>

FIG. 1 is a perspective view of a first camera actuator according to an embodiment, FIG. 2 is a perspective view of the first camera actuator of FIG. 1 in which some components are omitted, and FIG. 3 is an exploded perspective view of the first camera actuator shown in FIG. 1.

Referring to FIG. 1, a first camera actuator 1000 according to an embodiment may include a base 100, a driving part 200 disposed on the base 100, and a first lens assembly 600.

FIG. 2 is a perspective view of the first camera actuator 1000 of FIG. 1 in which the base 100, the first lens assembly 600, and the fourth lens assembly 900 are omitted. Referring to FIG. 2, the first camera actuator 1000 may include a rail guide part 500, a second lens assembly 700 and a third lens assembly 800. The rail guide part 500 may guide the movement of the second lens assembly 700 and the third lens assembly 800 in the base 100. To this end, the rail guide part 500 may include a first guide part 300 for guiding the movement of the second lens assembly 700 and a second guide part 400 for guiding the movement of the third lens assembly 800. In addition, a part of the driving part 200 may be disposed outside (or outer region) the base 100 and the other part may be disposed inside (or inner region) the base 100. The driving part 200 may include a circuit board 210, a first driving part 220 and a second driving part 230. The first driving part 220 may include a first driving coil and a first driving magnet. In addition, the second driving part 230 may include a second driving coil and a second driving magnet. The first driving coil and the first driving magnet of the first driving part 220 may provide a first driving force for moving the second lens assembly 700 along a rail of the first guide part 300 in the optical axis direction. In addition, the second driving coil and the second driving magnet of the second driving part 230 may provide a second driving force for moving the third lens assembly 800 along the rail of the second guide part 400 in the optical axis direction. driving force can be provided. Furthermore, each of the first driving part 220 and the second driving part 230 may further include a yoke (to be described later). This will be described in more detail below.

In the direction of the x-y-z axis shown in FIG. 3, the z-axis means the optical axis direction or a direction parallel thereto, the xz plane means a ground, the x-axis means a direction perpendicular to the z-axis in the ground (xz plane), and the y-axis may mean a direction perpendicular to the ground.

Referring to FIG. 3, the first camera actuator 1000 according to the embodiment may include a base 100, a driving part 200, a rail guide part 500, a first lens assembly 600, a second lens assembly 700, the third lens assembly 800 and the fourth lens assembly 900.

The rail guide part 500 may include a first guide part 300 disposed on one side of the base 100 and a second guide part 400 disposed on the other side of the base 100. The first guide part 300 may correspond to the second lens assembly 700, and the second guide part 400 may correspond to the third lens assembly 800. In addition, a first rolling member (described later) may be disposed between the first guide part 300 and the second lens assembly 700. In addition, a second rolling member (described later) may be disposed between the second guide part 400 and the third lens assembly 800. The embodiment may include a plurality of lens assemblies. In the plurality of lens assemblies, the first lens assembly 600, the second lens assembly 700, the third lens assembly 800, and the fourth lens assembly 900 may be sequentially disposed from one side. The first lens assembly 600 may be disposed farthest from an image sensor (not shown) or closest to the second camera actuator 2000. In addition, the fourth lens assembly 900 may be disposed closest to the image sensor (not shown) or farthest from the second camera actuator 2000. In addition, the second lens assembly 700 and the third lens assembly 800 may be disposed in the base 100 between the first lens assembly 600 and the fourth lens assembly 900. In this case, the first lens assembly 600 and the fourth lens assembly 900 may be a fixed part having fixed positions. For example, an image sensor (not shown) may be disposed outside the fourth lens assembly 900. A second camera actuator 2000 may be disposed outside the first lens assembly 100. The second lens assembly 700 and the third lens assembly 800 may be a moving part whose positions are moved. In this case, although it is said that the first camera actuator 1000 in the embodiment includes four lens assemblies in the drawing, the embodiment is not limited thereto. For example, the first camera actuator may include 3 or fewer lens assemblies, and alternatively may include 5 or more lens assemblies.

Hereinafter, each configuration of the first camera actuator 1000 according to the embodiment will be described in detail with reference to the drawings.

<Rail Guide Part>

The embodiment may include a rail guide part 500 for moving the second lens assembly 700 and the third lens assembly 800 in the optical axis direction. The rail guide part 500 includes a first guide part 300 disposed adjacent to a first sidewall 100*a* of the base 100 and a second guide part 400 disposed adjacent to the second sidewall 100*b* of the base 100.

The first guide part 300 may be disposed between the second lens assembly 700 and the first sidewall 100*a* of the base 100.

The second guide part 400 may be disposed between the third lens assembly 800 and the second sidewall 100*b* of the base 100. In this case, the first sidewall 100*a* and the second sidewall 100*b* of the base 100 may face each other. Accordingly, the first guide part 300 and the second guide part 400 may be disposed facing each other in the base 100.

According to the embodiment, the second lens assembly 700 and the third lens assembly 800 may move (or drive) in a state where the first guide part 300 and the second guide part 400 precisely numerically controlled are coupled in the base 100. Accordingly, the embodiment can reduce the frictional torque and thus reduce the frictional resistance. Accordingly, the embodiment may achieve technical effects such as improvement of driving force during zooming, reduction of power consumption, and improvement of control characteristics.

That is, according to the embodiment, when zooming, it is possible to prevent the occurrence of decentering or tilting of the plurality of lens assemblies and distortion of the central axis of a lens group and an image sensor while minimizing the frictional torque, and accordingly, this may improve image quality or resolution.

For example, when a rail guide part in the comparative example is formed on the base (clearly, a rail is formed on the base), a gradient occurs along an injection direction, which makes it difficult to manage dimensions, and there was a technical problem in that the driving force decreased due to an increase in frictional torque depending on an injection state.

On the other hand, the embodiment allows the base 100 and the rail guide part 500 to be separately employed, and accordingly, it is possible to prevent a gradient from occurring.

For example, the base 100 may be injected in the Z-axis direction. As in the comparative example, when the base and the rail guide part are integrally formed, there is a problem that a straight line of the rail is distorted due to the occurrence of a gradient as the rail is ejected in the Z-axis direction.

According to the embodiment, it is possible to prevent the occurrence of a gradient compared to the comparative example as the first guide part 300 and the second guide part 400 are injected separately from the base 100, thereby allowing precise injection.

In addition, in the embodiment, the first guide part 300 and the second guide part 400 are injected in the X-axis, and an injection length may be shorter than that of the base 100. Accordingly, the embodiment can prevent the problem of twisting of the rails respectively formed on the first guide part 300 and the second guide part 400.

FIG. 4 is an enlarged perspective view of one side of a rail guide part according to an embodiment, FIG. 5 is an enlarged view of a specific region of the rail guide part of FIG. 4, and FIG. 6 is an enlarged perspective view of the other side of a rail guide part.

Referring to FIGS. 4 and 5, the rail guide part 500 includes a first guide part 300 and a second guide part 400.

The first guide part 300 may include a single or a plurality of first rails 310. In addition, the second guide part 400 may include a single or a plurality of second rails 410.

For example, the first rail 310 of the first guide part 300 may include a first-first rail 311 and a first-second rail 312. The first guide part 300 may include a first supporting part 320 between the first-first rail 311 and the first-second rail 312.

In addition, the second rail 410 of the second guide part 400 may include a second-first rail 411 and a second-second rail 412. The second guide part 400 may include a second supporting part 420 between the second-first rail 411 and the second-second rail 412.

According to the embodiment, each of the first guide part 300 and the second guide part 400 includes a plurality of rails. Accordingly, each of the second lens assembly 700 and the third lens assembly 800 according to the embodiment may move along the plurality of rails in the optical axis direction.

According to this embodiment, since each guide part is provided with two rails, it is possible to secure the movement accuracy of the lens assembly with the other guide part even when distortion of one rail occurs.

In addition, according to the embodiment, each guide part has two rails, so that even if an issue of frictional force of a rolling member (to be described later) occurs on one rail, the rolling drive proceeds smoothly on the other rail. Accordingly, the driving force can be secured.

The first rail 310 may be connected from one surface (or one side) of the first guide part 300 to the other surface (or other side). Preferably, the first rail 310 may be formed to extend in the optical axis direction from the first guide part 300.

The second rail 410 may be connected from one surface (or one side) of the second guide part 400 to the other surface (or other side). Preferably, the second rail 410 may be formed to extend in the optical axis direction from the second guide part 400.

Accordingly, the camera actuator according to the embodiment and the camera module including the same may maintain an alignment state and distance between a plurality of lens groups by solving the problem of lens decentering or tilting during zooming, and it can solve reliability problems such as angle of view change or out of focus.

Specifically, according to the embodiment, the first guide part 300 includes a first-first rail 311 and a first-second rail 312, and accordingly alignment accuracy can be improved by guiding the movement of the second lens assembly 700 by the first-first rail 311 and the first-second rail 312. In addition, according to the embodiment, the second guide part 400 includes a second-first rail 411 and a second-second rail 412, and accordingly alignment accuracy can be improved by guiding the movement of the third lens assembly 800 by the second-first rail 411 and the second-second rail 412.

In addition, according to the embodiment, since each guide part has two rails, it is possible to maximize a distance of the rolling member to be described later. Accordingly, the embodiment can prevent magnetic field interference while improving the driving force for the movement of the second lens assembly 700 and the third lens assembly 800, thereby preventing the tilt of the lens assembly in a stationary or moving state.

The first guide part 300 may include a first guide protrusion 330 extending in a lateral direction perpendicular to an extending direction of the first rail 310. For example, the first rail 310 may extend in the z-axis direction, and the first guide protrusion 330 may extend in the x-axis direction from one side of the first rail 310.

A first coupling hole 340 may be formed on the first guide protrusion 300. A plurality of first coupling holes 340 may be formed on the first guide protrusion 300. For example, the first coupling hole 340 may include a first-first coupling hole 341 and a first-second coupling hole 342 spaced apart in the y-axis direction on the first guide protrusion 300. The first-first coupling hole 341 and the first-second coupling hole 342 may have different shapes. For example, the first-first coupling hole 341 may be formed in a circular shape, and the first-second coupling hole 342 may be formed in an elliptical shape.

The second guide part 400 may include a second guide protrusion 430 extending in a lateral direction perpendicular to an extending direction of the second rail 410. For example, the second rail 410 may extend in the z-axis direction, and the second guide protrusion 430 may extend in the x-axis direction from one side of the second rail 510.

A second coupling hole 440 may be formed on the second guide protrusion 400. A plurality of second coupling holes 440 may be formed on the second guide protrusion 400. For example, the second coupling hole 440 may include a second-first coupling hole 441 and a second-second coupling hole 442 spaced apart in the y-axis direction on the second guide protrusion 400. The second-first coupling hole 441 and the second-second coupling hole 442 may have different shapes. For example, the second-first coupling hole 441 may be formed in an elliptical shape, and the second-second coupling hole 442 may be formed in a circular shape.

In this case, coupling holes adjacent to each other in the first coupling hole 340 and the second coupling hole 440 may have different shapes. For example, the first-first coupling hole 341 of the first coupling hole 340 may have a circular shape, and the second-first coupling hole 441 of the second coupling hole 440 adjacent thereto may have an elliptical shape. For example, the first-second coupling hole 342 of the first coupling hole 340 may have an elliptical shape, and the second-second coupling hole 442 of the second coupling hole 440 adjacent thereto may have a circular shape.

In addition, coupling holes positioned in a diagonal direction from each other in the first coupling hole 340 and the second coupling hole 440 may have the same shape as each other. For example, the first-first coupling hole 341 of the first coupling hole 340 may be circular, and the second-second coupling hole 442 of the second coupling hole 440 located in a diagonal direction of the first-first coupling hole may be circular. For example, the first-second coupling hole 342 of the first coupling hole 340 may have an elliptical shape, and the second-first coupling hole 441 of the second coupling hole 440 positioned in a diagonal direction of first-second coupling hole may have an elliptical shape. Here, a coupling hole having a circular shape may be referred to as a regular-hole, and a coupling hole having an elliptical shape may be referred to as a long-hole.

When the first guide part 300/second guide part 400 and the base 100 are coupled, the first-first coupling hole 341 and the second-second coupling hole 442, the first-first coupling hole 341 and the second-second coupling hole 442, which are a regular hole with a circular shape, can firmly couple the first guide part 300 to the base 100. In addition, when the first guide part 300/second guide part 400 and the base 100 are coupled, the first-second coupling hole 342 and the second-first coupling hole 441, which are a lone hole with an elliptical shape, can prevent rotation in the x-axis direction while covering fine assembly tolerances occurring in the y-axis direction. Accordingly, the first-second coupling hole 342 and the second-first coupling hole 441, which are a lone hole with an elliptical shape, may have a shape extending along the y-axis compared to the first-first coupling hole 341 and the second-second coupling hole 442.

For example, diameters of the first-second coupling hole 342 and the second-first coupling hole 441 in the x-axis direction may be the same as diameters of the first-first coupling hole 341 and the second-second coupling hole 442 in the x-axis direction. In addition, diameters of the first-second coupling hole 342 and the second-first coupling hole 441 in the y-axis direction may be greater than diameters of the first-first coupling hole 341 and the second-second coupling hole 442 in the y-axis direction.

Meanwhile, the first guide part 300 according to the embodiment may include a plurality of recesses for designating a flow path of an adhesive member (not shown). Correspondingly, the second guide part 400 may include a plurality of recesses for designating a flow path of an adhesive member (not shown). The adhesive member may be a bonding member applied when the first guide part 300/second guide part 400 and the base 100 are coupled. For example, each of the first guide part 300 and the second guide part 400 may include a guide recess.

For example, according to the embodiment, the first guide part 300 may include a first-first recess 391 formed around the first-first coupling hole 341. The first-first recess 391 may have a shape corresponding to the first-first coupling hole 341. A size of the first-first recess 391 may be greater than a size of the first-first coupling hole 341. For example, a width of the first-first recess 391 in the x-axis direction may be greater than a width of the first-first coupling hole 341 in the x-axis direction. For example, a width of the first-first recess 391 in the y-direction may be greater than a width of the first-first coupling hole 341 in the y-direction. For example, the first-first coupling hole 341 may be formed in the first-first recess 391.

When the first lens assembly 600 and the first guide part 300 are coupled, the first-first recess 391 may designate a flow path of an adhesive member (not shown) applied around the first-first coupling hole 341. For example, the first-first recess 391 may function as a dam to prevent overflow of an adhesive member (not shown) applied around the first-first coupling hole 341. For example, when the first-first recess 391 is not formed, an overflow of the adhesive member (not shown) may occur in a process of coupling the first lens assembly 600 on the first guide part 300, and accordingly, the adhesive member (not shown) may move toward the first rail 310 of the first guide part 300. In addition, the adhesive member (not shown) that has moved toward the first rail 310 may interfere with the movement of the second lens assembly 700, and as a result, a problem may occur in the operation reliability of the first camera actuator 1000. Therefore, a first-first recess 391 in the embodiment is formed around the first-first coupling hole 341 to prevent the adhesive member (not shown) from overflowing.

In addition, the first guide part 300 of the embodiment may include a first-second recess 392 formed around the first-second coupling hole 342. The first-second recess 392 may have a shape corresponding to the first-second coupling hole 342. A size of the first-second recess 392 may be greater than a size of the first-second coupling hole 342. For example, a width of the first-second recess 392 in the x-axis direction may be greater than a width of the first-second coupling hole 342 in the x-axis direction. For example, a width of the first-second recess 392 in the y-direction may be greater than a width of the first-second coupling hole 342 in the y-direction. For example, the first-second coupling hole 342 may be formed in the first-second recess 392.

When the first lens assembly 600 and the first guide part 300 are coupled, the first-second recess 392 may designate a flow path of an adhesive member (not shown) applied around the first-second coupling hole 342. For example, the first-second recess 392 may function as a dam to prevent overflow of an adhesive member (not shown) applied around the first-second coupling hole 342.

In addition, the first guide part 300 of the embodiment may include a first-third recess 393. The first-third recess 393 may be referred to as a first extension recess.

The first-third recess 393 may have a shape extending in the y-axis direction from the first guide part 300. The first-third recess 393 may be formed between the first coupling hole 340 and the first rail 310. For example, the first-third recess 393 may be formed to elongate in the y-axis direction between the first coupling hole 340 and the first rail 310. The first-third recess 393 may additionally block overflow of an adhesive member (not shown) from the first-first recess 391 or the first-second recess 392. For example, the inner side (specifically, the first rail) of the first guide part 300 may be a part that plays the most important role in operation reliability of the first camera actuator 1000. In this case, overflow of the adhesive member (not shown) may occur even in a state where the first-first recess 391 and the first-second recess 392 are formed. Accordingly, the embodiment may further block the flow of the adhesive member (not shown) to the inside of the first guide part 300, specifically to the first rail 310.

The first guide part 300 of the embodiment forms a recess around the first coupling hole 340 to primarily block the overflow of an adhesive member (not shown), and forms a recess between the first coupling hole 340 and the first rail 310 to secondarily block the overflow of an adhesive member (not shown). Accordingly, the embodiment can fundamentally block the flow of the adhesive member (not shown) toward the inside of the first guide part 300 (or toward the first rail), thereby improving operation reliability.

In addition, according to the embodiment, the second guide part 400 may include a second-first recess 491 formed around the second-first coupling hole 441. The second-first recess 491 may have a shape corresponding to the second-first coupling hole 441. A size of the second-first recess 491 may be greater than a size of the second-first coupling hole 441. For example, a width of the second-first recess 491 in the x-axis direction may be greater than a width of the second-first coupling hole 441 in the x-axis direction. For example, a width of the second-first recess 491 in the y-direction may be greater than a width of the second-first coupling hole 441 in the y-direction. For example, the second-first coupling hole 441 may be formed in the second-first recess 491.

When the first lens assembly 600 and the second guide part 400 are coupled, the second-first recess 491 may designate a flow path of an adhesive member (not shown) applied around the second-first coupling hole 441. For example, the second-first recess 491 may function as a dam to prevent overflow of an adhesive member (not shown) applied around the second-first coupling hole 441. For example, when the second-first recess 491 is not formed, an overflow of the adhesive member (not shown) may occur in a process of coupling the first lens assembly 600 on the second guide part 400, and accordingly, the adhesive member (not shown) may move toward the second rail 410 of the second guide part 400. In addition, the adhesive member (not shown) that has moved toward the second rail 410 may interfere with the movement of the third lens assembly 800, and as a result, a problem may occur in the operation reliability of the first camera actuator 1000. Therefore, a second-first recess 491 in the embodiment is formed around the second-first coupling hole 441 to prevent the adhesive member (not shown) from overflowing.

In addition, the second guide part 400 of the embodiment may include a second-second recess 492 formed around the second-second coupling hole 442. The second-second recess 492 may have a shape corresponding to the second-second coupling hole 442. A size of the second-second recess 492 may be greater than a size of the second-second coupling hole 442. For example, a width of the second-second recess 492 in the x-axis direction may be greater than a width of the second-second coupling hole 442 in the x-axis direction. For example, a width of the second-second recess 492 in the y-direction may be greater than a width of the second-second coupling hole 442 in the y-direction. For example, the second-second coupling hole 442 may be formed in the second-second recess 492.

When the first lens assembly 600 and the second guide part 400 are coupled, the second-second recess 492 may designate a flow path of an adhesive member (not shown) applied around the second-second coupling hole 442. For example, the second-second recess 492 may function as a dam to prevent overflow of an adhesive member (not shown) applied around the second-second coupling hole 442.

In addition, the second guide part 400 of the embodiment may include a second-third recess 493. The second-third recess 493 may be referred to as a second extension recess.

The second-third recess 493 may have a shape extending in the y-axis direction from the second guide part 400. The second-third recess 493 may be formed between the second coupling hole 440 and the second rail 410. For example, the second-third recess 493 may be formed to elongate in the y-axis direction between the second coupling hole 440 and the second rail 410. The second-third recess 493 may additionally block overflow of an adhesive member (not shown) from the second-first recess 491 or the second-second recess 492. For example, the inner side (specifically, the second rail) of the second guide part 400 may be a part that plays the most important role in operation reliability of the first camera actuator 1000. In this case, overflow of the adhesive member (not shown) may occur even in a state where the second-first recess 491 and the second-second recess 492 are formed. Accordingly, the embodiment may further block the flow of the adhesive member (not shown) to the inside of the second guide part 400, specifically to the second rail 410.

The second guide part 400 of the embodiment forms a recess around the second coupling hole 440 to primarily block the overflow of an adhesive member (not shown), and forms a recess between the second coupling hole 440 and the second rail 410 to secondarily block the overflow of an adhesive member (not shown). Accordingly, the embodiment can fundamentally block the flow of the adhesive member (not shown) toward the inside of the second guide part 400 (or toward the second rail), thereby improving operation reliability.

Meanwhile, the first rail 310 of the first guide part 300 may include a plurality of rails having different shapes. That is, as described above, the first rail 310 may include a first-first rail 311 and a first-second rail 312.

Also, the first-first rail 311 may have a first shape. Also, the first-second rail 312 may have a second shape different from the first shape.

In addition, the second rail 410 of the second guide part 400 may include a plurality of rails having different shapes. That is, as described above, the second rail 410 may include a second-first rail 411 and a second-second rail 412.

Also, the second-first rail 411 may have a second shape. Also, the second-second rail 412 may have a first shape different from the second shape.

Here, the first shape of the first-first rail 311 may be a 'V' shape. In addition, the first shape of the second-second rail 412 may be a 'V' shape. Also, the second shape of the first-second rail 312 and the second shape of the second-second rail 412 may be 'L' shapes. However, the embodiment is not limited thereto, and the first shape and the second shape may have different shapes other than the 'V' and 'L' shapes.

In this case, the rails having the same shape as each other in the first rail 310 and the second rail 410 may be positioned in a diagonal direction. For example, the first-first rail 311 of the first rail 310 having the first shape and the second-second rail 412 of the second rail 410 may be positioned in a diagonal direction. For example, the first-second rail 312 of the first rail 310 having the second shape and the second-first rail 411 of the second rail 410 may be positioned in a diagonal direction.

Meanwhile, a single or a plurality of first ribs 350 may be formed inside the first supporting part 320 of the first guide part 300. For example, a first rib 350 may be formed between the first-first rail 311 and the second rail 312 of the first guide part 300. The first rib 350 may improve the accuracy of dimensional management of the first-first rail 311 and the second rail 312.

In the comparative example, shrinkage occurs as the amount of injection molding increases or the thickness of injection molding increases, which makes it difficult to manage dimensions, and when the amount of injection molding is reduced, there is a problem in that the strength is weakened.

In contrast, in the embodiment, the first rib 350 is provided inside the first supporting part 320, and it is possible to secure strength while reducing the amount of injection molding and increasing the accuracy of dimension management. In addition, a single or a plurality of second ribs (not shown) may be formed inside the second supporting part 420 of the second guide part 400.

In addition, the second guide part 400 may include a rail part recess 470 and a supporting part recess 480. For example, a second rail 410 is formed inside the second guide part 400. Also, a rail part recess 470 may be formed on an outer side opposite to the second rail 410 of the second guide part 400. In addition, a supporting part recess 480 may be formed outside the second supporting part 420 of the second guide part 400. The rail part recess 470 and the supporting part recess 480 prevents shrinkage by reducing the injection amount of the second guide part 400, and it is possible to secure strength while increasing the accuracy of dimension management.

Also, a rail part recess (not shown) and a supporting part recess (not shown) of the first guide part may also be formed outside the first guide part 300 corresponding to the second guide part 400.

Meanwhile, the first guide part 300 may include a first guide protrusion 360 formed in a region opposite to the first coupling hole 340. Specifically, the first guide part 300 may include a first-first guide protrusion 361 formed in a region opposite to the first-first coupling hole 341 and a first-second guide protrusion 362 formed in a region opposite to the first-second coupling hole 342. The first guide protrusion 361 and the second guide protrusion 362 may be fitted into a coupling recess of a third sidewall 100c of the base 100 to be described later.

In addition, the second guide part 400 may include a second guide protrusion 460 formed in a region opposite to the second coupling hole 440. Specifically, the second guide part 400 may include a second-first guide protrusion 461 formed in a region opposite to the second-first coupling hole 441 and a second-second guide protrusion 462 formed in a region opposite to the second-second coupling hole 442. The second-first guide protrusion 461 and the second-second guide protrusion 462 may be fitted into a coupling recess of the third sidewall 100c of the base 100 to be described later.

Meanwhile, the camera module of the embodiment may include at least one of at least one component of the camera module described later, while including the rail guide part. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Second Lens Assembly, Third Lens Assembly, First Rolling Member and Second Rolling Member>

Hereinafter, the second lens assembly 700, the third lens assembly 800, the first rolling member, and the second rolling member will be described in detail.

FIG. 7 is a perspective view of the second lens assembly shown in FIG. 3, FIG. 8 is a perspective view of the second lens assembly shown in FIG. 7 in which some components are omitted, FIG. 9 is a perspective view of the third lens assembly shown in FIG. 3, and FIG. 10 is a perspective view of the third lens assembly shown in FIG. 9 in which some components are omitted.

For a moment, referring to FIG. 3, the embodiment may include a second lens assembly 700 moving along the first guide part 300 and a third lens assembly 800 moving along the second guide part 400.

Referring to FIGS. 7 and 8, the second lens assembly 700 may include a second lens barrel 710 on which a second lens group 730 is disposed, and a first driving part housing 720 in which a part of the driving part 200 (specifically, the first magnet and the first yoke of the first driving part) is disposed. In this case, the second lens barrel 710 and the first driving part housing 720 may be a first housing. Also, the first housing may have a barrel or barrel shape. The first driving part housing 720 may be a first magnet/yoke disposition part in which a first magnet 222 and a first yoke 223 of the first driving part 220 constituting the driving part 200 are disposed. However, it is not limited thereto, and may be a disposition part of the first coil 221 according to an embodiment. For example, the arrangement positions of the first magnet 222 and the first coil 221 of the embodiment may be changed.

Referring to FIGS. 8 and 9, the third lens assembly 800 includes a third lens barrel 810 on which a third lens group 830 is disposed, and a second driving part housing 820 in which a part of the driving part 200 (specifically, the second magnet and the second yoke of the second driving part) is disposed. In this case, the third lens barrel 810 and the second driving part housing 820 may be the second housing. And, the second housing may have a barrel or barrel shape. The second driving part housing 820 may be a second magnet/yoke disposition part in which the second magnet 232 and the second yoke 233 of the second driving part 230 constituting the driving part 200 are disposed. However, it is not limited thereto, and may be a disposition part of the second coil 231 of the second driving part 230 according to an embodiment. For example, the arrangement positions of the second magnet 232 and the second coil 231 of the embodiment may be changed.

The second lens assembly 700 corresponds to the two first rails 310 of the first guide part 300, and the third lens assembly 800 corresponds to the two second rails 410 of the second guide part 400.

An embodiment may include a first rolling member 740 and a second rolling member 840. The first rolling member 740 may include a single ball or a plurality of balls. The second rolling member 840 may include a single ball or a plurality of balls.

The embodiment may include a first rolling member 740 disposed between the second lens assembly 700 and the first guide part 300. Also, the embodiment may include a second rolling member 840 disposed between the third lens assembly 800 and the second guide part 400.

The first rolling member 740 may includes a single or a plurality of first balls 741 disposed on an upper side of the first driving part housing 720 and a single or a plurality of second balls 742 disposed on a lower side of the first driving part housing 720. The first ball 741 may move along a first-first rail 311, which is one of the first rails 310 of the first guide part 300. In addition, the second ball 742 may move along the first-second rail 312, which is another one of the first rails 310 of the first guide part 300. The first ball 741 corresponds to the first-first rail 311 and may include a first-first ball 741a and a first-second ball 741b spaced apart from each other by a predetermined distance. In addition, the second ball 742 corresponds to the first-second rail 312 and may include a second-first ball 742a and a second-second ball 742b spaced apart from each other by a predetermined distance.

The second rolling member 840 may includes a single or a plurality of third balls 841 disposed on an upper side of the second driving part housing 820 and a single or plurality of fourth balls 842 disposed on a lower side of the second driving part housing 820. The third ball 841 may move along a second-first rail 411, which is one of the second rails 410 of the second guide part 400. In addition, the fourth ball 842 may move along the second-second rail 412, which is another one of the second rails 410 of the second guide part 400. The third ball 841 corresponds to the second-first rail 411 and may include a third-first ball 841a and a third-second ball 841b spaced apart from each other by a predetermined distance. In addition, the fourth ball 842 may include a fourth-first ball 842a and a fourth-second ball 842b that correspond to the second-second rail 412 and are spaced apart from each other by a predetermined distance.

The camera actuator according to the embodiment and the camera module including the same may maintain an alignment state and distance between a plurality of lens groups by solving the problem of lens decentering or tilting during zooming, and it is possible to improve image quality by solving problems such as change in angle of view or out of focus.

For example, in the embodiment, the first guide part 300 includes a first-first rail and a first-second rail, and the first-first rail and the first-second rail guide the movement of the second lens assembly 700. Accordingly, when the second lens assembly 700 moves, it can improve the accuracy of optical axis alignment with the third lens assembly 800.

Meanwhile, the second lens assembly 700 may include a first ball recess 750 in which a first rolling member 740 is disposed. Also, the third lens assembly 800 may include a second ball recess 850 in which the second rolling member 840 is disposed.

The number of the first ball recess 750 and the second ball recess 850 may be plural. For example, the number of first ball recesses 750 may correspond to the number of balls constituting the first rolling member 740. Also, the number of second ball recesses 850 may correspond to the number of balls constituting the second rolling member 840. For example, the first ball recess 750 may include four recesses spaced apart from each other to correspond to the first rolling member 740. For example, the second ball recess 850 may include four recesses spaced apart from each other to correspond to the second rolling member 840.

In this case, a distance between two recesses among four recesses constituting the first ball recess 750 may be greater than the thickness of the second lens barrel 710 based on the optical axis direction.

Also, a distance between two recesses among four recesses constituting the second ball recess 850 may be greater than a thickness of the third lens barrel 810 based on the optical axis direction.

In an embodiment, the first ball recess 750 of the second lens assembly 700 may have a V shape. Also, the second ball recess 850 of the third lens assembly 800 may have a V shape. However, it is not limited thereto, and the first ball recess 750 and the second ball recess 850 may have a U-shape or a shape in contact with the ball at two or three points.

Also, a first driving part disposition recess 770 may be formed in a region between the first ball recess 750 in the second lens assembly 700. Also, a second driving part disposition recess 870 may be formed in a region between the second ball recesses 850 in the third lens assembly 800.

FIG. 11 is a cross-sectional view in a x-axis direction of the camera module according to the embodiment shown in FIG. 2.

Referring to FIG. 11, a first guide part 300 and a second guide part 400 may be respectively inserted and disposed in the base 100, and the second lens assembly 700 may be disposed to correspond to the first guide part 300, and the third lens assembly 800 may be disposed to correspond to the second guide part 400.

In addition, a first rolling member 740 may be inserted between the first rail 310 of the first guide part 300 and the second lens assembly 700. In addition, a second rolling member 840 may be inserted between the second rail 410 of the second guide part 400 and the third lens assembly 800.

The second lens assembly 700 may move along the first rail 310 of the first guide part 300 in the optical axis direction through the first rolling member 740. In addition, the third lens assembly 800 may move along the second rail 410 of the second guide part 400 in the optical axis direction through the second rolling member 840.

Meanwhile, the embodiment has an effect of preventing the second lens assembly 700 and the second lens assembly 700 from being reversely inserted into the base 100. For example, the embodiment may solve a problem of mis-insertion in which the third lens assembly 800 is disposed where the second lens assembly 700 is to be disposed and a problem of mis-insertion in which the second lens assembly 700 is disposed where the third lens assembly 800 is to be disposed.

For example, upper and lower widths of the second lens assembly 700 may have a first width A10. In addition, upper and lower widths of the third lens assembly 800 may have a second width B10 different from the first width A10. Accordingly, the embodiment may allow the third lens assembly 800 not to be inserted in a region where the second lens assembly 700 is to be disposed by the dimension design of the second lens assembly 700 and the third lens assembly 800 as described above, thereby improving reliability.

FIG. 12 is an exemplary view of driving a second lens assembly according to an embodiment.

Referring to FIG. 12, an interaction in which an electromagnetic force DEM is generated between a first magnet 116 and a first coil part 141b of a first driving part 220 in the camera module according to the embodiment will be described.

As shown in FIG. 12, a magnetization method of the first magnet 222 of the first camera actuator 1000 according to an embodiment may be a perpendicular magnetization method. For example, in the embodiment, both the N pole 222N and the S pole 222S of the first magnet 222 may be magnetized to face the first coil 221.

Accordingly, the N pole 222N and the S pole 222S of the first magnet 222 may be respectively disposed to correspond to a region in which a current flows in a y-axis direction perpendicular to the ground in the first coil 221.

Then, a magnetic force DM is applied in an opposite direction to the x-axis from the N pole 222N of the first magnet 222 (a direction of the magnetic force may be a positive or negative direction of the illustrated direction), when a current DE flows in the y-axis direction in a region of the first coil 221 corresponding to the N pole 222N, the electromagnetic force DEM acts in the z-axis direction according to Fleming's left-hand rule.

In addition, in the embodiment, a magnetic force DM is applied in the x-axis direction from the S pole 222S of the first magnet 222, when a current DE flows in the opposite direction of the y-axis perpendicular to the ground in the first coil 221 corresponding to the S pole 222S, the electromagnetic force DEM acts in the z-axis direction according to Fleming's left-hand rule (The direction of the electromagnetic force may be positive or negative of the illustrated direction).

In this case, the first coil 221 of the first driving part 220 is in a fixed state, and accordingly, the second lens assembly 700, which is a mover in which the first magnet 222 of the first driving part 220 is disposed, may move back and forth along the first rail 310 of the first guide part 300 in a direction parallel to the z-axis direction by the electromagnetic force (DEM) according to a current direction. In this case, the electromagnetic force DEM may be controlled in proportion to the current DE applied to the first coil 221.

Likewise, an electromagnetic force (DEM) is generated between the second coil 231 and the second magnet 232 of the second driving part 230 in the camera module according to the embodiment, so that the third lens assembly 800 on which the second magnet 232 is disposed may move along the second rail 410 of the second guide part 400 in a direction parallel to the optical axis.

On the other hand, the camera module of the embodiment includes the features of the rail guide part described previously and other components of the camera module described later, while including at least one feature of the second lens assembly, the third lens assembly, the first rolling member, and the second rolling member. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<First Lens Assembly>

FIG. 13 is an exploded perspective view of a first lens assembly according to an embodiment, FIG. 14A is a first perspective view of the first lens assembly of FIG. 13 in which a first lens group is omitted, and FIG. 14B is a second perspective view of the first lens assembly of FIG. 13 in which a first lens group is omitted.

Referring to FIG. 13, a first lens assembly 600 may include a first lens barrel 610 and a first lens group 620. In addition, the first lens assembly 600 may include a first stopper 660 and a second stopper 670.

Before explaining FIGS. 13, 14A and 14B, the embodiments of each configuration of the camera module may be cross-implemented. For example, the camera module of the embodiment may include only the recess for controlling the flowability of the adhesive member (not shown) described above, or may alternatively include only the stoppers described below, or may alternatively include all of them. Specifically, the features of each configuration of the camera module described below may be implemented alone, or may be implemented in combination with at least one of them.

In an embodiment, the third lens assembly 800 may have a barrel part recess 611r formed on the first lens barrel 610. The barrel part recess 611r can uniformly adjust a thickness of the first lens barrel 610 of the first lens assembly 600 and increase the accuracy of numerical control by reducing the amount of the injected material. The first stopper 660 may be disposed on a first surface of the first lens barrel 610. In addition, the second stopper 670 may be disposed on a second surface of the first lens barrel 610 opposite to the first surface. The second surface may be a surface facing the second lens assembly. Also, the first surface may be a surface facing a second camera actuator to be described later. The first stopper 660 limits the movement of the second camera actuator 2000. Also, the second stopper 670 limits the movement of the second lens assembly 700.

Specifically, the first stopper 660 blocks contact between the second camera actuator 2000 and the first lens group 620. For example, the first stopper 660 prevents damage to the first lens group 620 caused by contact between the second camera actuator 2000 and the first lens group 620. For example, components constituting the second camera actuator 2000 may be separated from each other by various factors, and this may cause a reliability problem in that one of the separated components contacts the first lens group 620. Therefore, the first stopper 660 is disposed between the first lens assembly 600 and the second camera actuator 2000 and prevents contact between the second camera actuator 2000 and the first lens assembly 600 (specifically, the first lens group 620), and accordingly, this prevents damage to the first lens group 620. The first stopper 660 includes a first-first stopper 661 and a first-second stopper 662 disposed on the first surface of the first lens barrel 610 on both sides of the opening 612h of the first lens barrel 610, respectively.

The second stopper 670 is disposed between the first lens barrel 610 and the second lens assembly 700 and limits movement of the second lens assembly 700 in the optical axis direction. For example, the second lens assembly 700 moves along the first rail 310 of the first guide part 300. For example, the lens assembly 700 moves in a first optical axis direction toward the first lens assembly 600 and a second optical axis direction toward the third lens assembly 800. Also, the second stopper 670 may limit movement of the second lens assembly 700 in the first optical axis direction. The second stopper 670 includes a second-first stopper 671 and a second-second stopper 672 disposed on the second surface of the first lens barrel 610 on both sides of the opening 612h of the first lens barrel 610, respectively.

That is, the first lens barrel 610 may include a first surface and a second surface. The first surface may be a surface facing a second camera actuator 2000 to be described later among both surfaces of the first lens barrel 610. Also, the second surface may be a surface facing the second lens assembly 700 among both surfaces of the first lens barrel 610. For example, the first surface may be an outer surface of the first lens barrel 610 and the second surface may be an inner surface of the first lens barrel 610.

The first lens barrel 610 includes an opening 612h passing through the first and second surfaces in the optical axis direction. The opening 612h may be a first lens group disposition part or mounting part into which the first lens group 620 is inserted.

A first rib may be formed on a first surface of the first lens barrel 610. For example, the first surface of the first lens barrel 610 may include a first-first rib 613 and a first-second rib 614. The first-first rib 613 may be disposed on a first side of the opening 612h on a first surface of the first lens barrel 610. Also, the first-second rib 614 may be disposed on a second side of the opening 612h on the first surface of the first lens barrel 610.

The first-first rib 613 may include a first-first portion 613-1 disposed in a horizontal direction and in which the first-first stopper 661 is disposed and a first-second portion 613-2 extending in a vertical direction from one end of the first-first portion 613-1. For example, a stepped portion (not shown) may provide on the first surface of the first lens barrel 610 to surround the opening 612h and protect the first lens group 620 disposed in the opening 612h. In addition, the first-first portion 613-1 may connect between the stepped portion and the first-second portion 613-2. Accordingly, the first-first stopper 661 can be mounted in an accurate position as a mounting position is guided by the stepped portion and the first-second portion 613-2 in a state inserted in the first-first portion 613-1.

The first-first portion 613-1 may be a portion of a protrusion into which the first-first stopper 661 is fitted. The first-second portion 613-2 may limit movement of the first-first stopper 661 fitted to the first-first portion 613-1 in a horizontal direction. For example, the first-second portion 613-2 may guide the mounting position of the first-first stopper 661. For example, the first-second portion 613-2 may guide the first-first stopper 661 to be mounted in an accurate position.

The first-second rib 614 may include a second-first portion 614-1 disposed in a horizontal direction and in which the first-second stopper 662 is disposed and a second-second portion 614-2 extending in a vertical direction from one end of the second-first portion 614-1. For example, a stepped portion (not shown) may provide on the first surface of the first lens barrel 610 to surround the opening 612h and protect the first lens group 620 disposed in the opening 612h. In addition, the second-first portion 614-1 may connect between the stepped portion and the second-second portion 614-2. Accordingly, the first-second stopper 662 can be mounted in an accurate position as a mounting position is guided by the stepped portion and the second-second portion 614-2 in a state inserted in the second-first portion 6143-1.

The second-first portion 614-1 may be a portion of a protrusion into which the first-second stopper 662 is fitted. The second-second portion 614-2 may limit movement of the first-second stopper 662 fitted to the second-first portion 614-1 in a horizontal direction. For example, the second-second portion 614-2 may guide the mounting position of the first-second stopper 662. For example, the second-second portion 614-2 may guide the first-second stopper 662 to be mounted in an accurate position.

In addition, a plurality of coupling recesses 615 and 616 are formed on the first surface of the first lens barrel 610. The coupling recesses 615 and 616 may be a coupling part between the first camera actuator 1000 and the second camera actuator 2000. For example, a coupling protrusion (to be described later) corresponding to the coupling recesses 615 and 616 may be formed in the second camera actuator 2000. In addition, the first camera actuator 1000 and the second camera actuator 2000 may be coupled as the coupling protrusion is fitted into the coupling recesses 615 and 616. Specifically, the second housing 2100 may include coupling protrusions 2151 and 2152 corresponding to the coupling recesses 615 and 616 as shown in FIG. 30. And, the first camera actuator 1000 and the second camera actuator 2000 may be coupled to each other by the coupling protrusions 2151 and 2152 of the second housing 2100 and the coupling recesses 615 and 616 of the first lens barrel 610.

Specifically, the first lens barrel 610 may include a first coupling recess 615 and a second coupling recess 616.

The first coupling recess 615 may be disposed on a first side of the first surface of the first lens barrel 610, and the second coupling recess 616 may be disposed on a second side of the first surface of the first lens barrel 610.

For example, the first coupling recess 615 may be disposed adjacent to the first-first rib 613. Also, the second coupling recess 616 may be disposed adjacent to the first-second rib 614.

The first coupling recess 615 and the second coupling recess 616 may have different shapes. Alternatively, the first coupling recess 615 and the second coupling recess 616 may have different sizes. For example, the first coupling recess 615 may have a semicircular shape, and the second coupling recess 616 may have a square shape, but is not limited thereto.

In the embodiment, the first coupling recess 615 and the second coupling recess 616 have different shapes, thereby solving the problem that the second camera actuator 2000 is reversely coupled. That is, a coupling between the coupling protrusions 2151 and 2152 of the second housing 2100 and the coupling recesses 615 and 616 may not be possible in a state where the second camera actuator 2000 is reversed, because the first coupling recess 615 and the second coupling recess 616 have different shapes.

Meanwhile, a second rib 630 may be included on the second surface of the first lens barrel 610. The second rib 630 may have a shape corresponding to the first ribs 613 and 614. The second stopper 670 is fitted to the second rib 630, and movement of the second lens assembly 700 may be limited by the second stopper 670.

Meanwhile, the first lens assembly 600 may include a plurality of coupling holes.

The first lens assembly 600 may include a third coupling hole 640 and a fourth coupling hole 650.

The third coupling hole 640 may correspond to the first coupling hole 340 of the first guide part 300. The third coupling hole 640 may include a third-first coupling hole 641 and a third-second coupling hole 642 spaced apart in the y-axis direction on one side of the first lens barrel 610 of the first lens assembly 600. The third-first coupling hole 641 and the third-second coupling hole 642 may have different shapes. For example, the third-first coupling hole 641 may be formed in a circular shape, and the third-second coupling hole 642 may be formed in an elliptical shape. The third coupling hole 640 may be aligned with the first coupling hole 340 in an optical axis direction. For example, a center of the third coupling hole 640 may be aligned with a center of the first coupling hole 340 in the optical axis direction. A protrusion of the base 100 described later may be inserted into the third coupling hole 640.

The fourth coupling hole 650 may correspond to the second coupling hole 440 of the second guide part 400. The fourth coupling hole 6500 includes a fourth-first coupling hole 651 and a fourth-second coupling hole 652 spaced apart in the y-axis direction on the other side of the first lens barrel 610 of the first lens assembly 600. The fourth-first coupling hole 651 and the fourth-second coupling hole 652 may have different shapes. For example, the fourth-first coupling hole 651 may be formed in an elliptical shape, and the fourth-second coupling hole 652 may be formed in a circular shape.

In this case, coupling holes adjacent to each other in the x-axis direction in the third coupling hole 640 and the fourth coupling hole 650 may have different shapes. For example, the third-first coupling hole 641 of the third coupling hole 640 has a circular shape, and the fourth-first coupling hole 651 of the fourth coupling hole 650 adjacent to third-first coupling hole in the x-axis direction has an elliptical shape. For example, the third-second coupling hole 642 of the third coupling hole 640 has an elliptical shape, and the fourth-second coupling hole 652 of the fourth coupling holes 650 adjacent to the third-second coupling hole in the x-axis direction may have a circular shape.

In addition, coupling holes positioned in a diagonal direction in the third coupling hole 640 and the fourth coupling hole 650 may have the same shape. For example, the third-first coupling hole 641 of the third coupling hole 640 may have a circular shape, and the fourth-second coupling hole 652 of the fourth coupling hole 650 positioned in a diagonal direction with the third-first coupling hole may have a circular shape. For example, the third-second coupling hole 642 of the third coupling hole 640 may have an elliptical shape, and the fourth-first coupling hole 651 of the fourth coupling hole 650 located in a diagonal direction with the third-second coupling hole may have an elliptical shape. Here, a coupling hole having a circular shape may be referred to as a regular hole, and a coupling hole having an elliptical shape may be referred to as a long hole.

When the first lens assembly 600 and the base 100 are coupled, the third-first coupling hole 641 and the fourth-second coupling hole 652, which are a regular hole with a circular shape, may firmly couple the first lens assembly 600 to the base 100. When the first lens assembly 600 and the base 100 are coupled, the third-second coupling hole 642 and the fourth-first coupling hole 651, which are a lone hole with an elliptical shape, can prevent rotation in the x-axis direction while covering fine assembly tolerances occurring in the y-axis direction. Accordingly, the third-second coupling hole 642 and the fourth-first coupling hole 651, which are a lone hole with an elliptical shape, may have a shape extending along the y-axis compared to the third-first coupling hole 641 and the fourth-second coupling hole 652.

For example, diameters of the third-second coupling hole 642 and the fourth-first coupling hole 651 in the x-axis direction may be a same as diameters of the third-first coupling hole 641 and the fourth-second coupling hole 652 in the x-axis direction. In addition, diameters of the third-second coupling hole 642 and the fourth-first coupling hole 651 in the y-axis direction may be greater than diameters of the third-first coupling hole 641 and the fourth-second coupling hole 652 in the y-axis direction.

Meanwhile, the camera module of the embodiment may include at least one of the previously described components and the later described components, while including the features of the first lens assembly. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Base>

FIG. 15 is a perspective view of a base in a first camera actuator according to an embodiment, FIG. 16 is a front view of the base shown in FIG. 15, FIG. 17 is an enlarged view of a region where coupling protrusion of a base is formed, and FIG. 18 is a cross-sectional view of a base, a rail guide part, and a first lens assembly in a coupled state according to an embodiment.

Referring to FIG. 3, a first guide part 300, a second guide part 400, a second lens assembly 700 and a third lens assembly 800 may be accommodated in the base 100. Also, the first lens assembly 600 may be disposed spaced apart from the second lens assembly 700 on one side surface of the base 100. Also, the fourth lens assembly 900 may be disposed spaced apart from the third lens assembly 800 on the other side surface of the base 100.

Referring to FIGS. 15 to 18, the base 100 may include a plurality of side walls.

For example, the base 100 may include a first sidewall 100a, a second sidewall 100b, a third sidewall 100c, and a fourth sidewall 100d. In addition, the base 100 may include an upper part 100e and a lower part 100f together with the plurality of side wall.

The base 100 may include a first sidewall 100a and a second sidewall 100b corresponding to the first sidewall 100a. For example, the second sidewall 100b may be disposed in a direction facing the first sidewall 100*a*. The first sidewall 100*a* and the second sidewall 100*b* may include a first opening OA1 and a second opening OA2, respectively. The first opening OA1 may be an insertion space into which a part of the driving part 200 disposed outside the first sidewall 100*a* of the base 100 is inserted. For example, the circuit board 210 of the driving part 200 is disposed outside the first sidewall 100*a*. Also, the first coil 221 of the first driving part 220 may be disposed on the circuit board 210. In this case, the first coil 221 of the first driving part 220 may be disposed inside the base 100 through the first opening OA1 formed in the first sidewall 100*a* in a state where the circuit board 210 is disposed outside the first sidewall 100*a* of the base 100. Also, the second opening OA2 may be an insertion space into which a part of the second driving part 230 disposed outside the second sidewall 100*b* of the base 100 is inserted. For example, the circuit board 210 of the driving part 200 is disposed outside the second sidewall 100*b*. In this case, the second coil 231 of the second driving part 230 may be disposed inside the base 100 through the second opening OA2 formed in the second sidewall 100*b* in a state where the circuit board 210 is disposed outside the second sidewall 100*b* of the base 100.

The base 100 may include a third sidewall 100*c* disposed between the first sidewall 100*a* and the second sidewall 100*b* and connecting the first sidewall 100*a* and the second sidewall 100*b*. The third sidewall 100*c* may be disposed in a direction perpendicular to the first sidewall 100*a* and the second sidewall 100*b*. The first sidewall 100*a*, the second sidewall 100*b*, and the third sidewall 100*c* may be integrally injected or separately injected.

A coupling protrusion may be formed on the fourth sidewall 100*d* of the base 100.

Specifically, a first coupling protrusion 110 and a second coupling protrusion 120 may be formed on the fourth sidewall 100*d* of the base 100.

The first coupling protrusion 110 may be a protrusion to which the first guide part 300 is coupled. For example, the first coupling protrusion 110 may correspond to the first coupling hole 340 of the first guide part 300. Accordingly, the first coupling protrusion 110 may include a first-first coupling protrusion 111 corresponding to the first-first coupling hole 341 of the first guide part 300 and a first-second coupling protrusion 112 corresponding to the first-second coupling hole 342 of the first guide part 300. The first coupling protrusion 110 may be a protrusion to which the first lens assembly 600 is coupled. For example, the first coupling protrusion 110 may correspond to the third coupling hole 640 of the first lens assembly 600.

The second coupling protrusion 120 may be a protrusion to which the second guide part 400 is coupled. For example, the second coupling protrusion 120 may correspond to the second coupling hole 440 of the second guide part 400. Accordingly, the second coupling protrusion 120 may include a second-first coupling protrusion 121 corresponding to the second-first coupling hole 441 of the second guide part 400 and a second-second coupling protrusion 122 corresponding to the second-second coupling hole 442 of the second guide part 400. Also, the second coupling protrusion 120 may be a protrusion to which the first lens assembly 600 is coupled. For example, the second coupling protrusion 120 may correspond to the fourth coupling hole 650 of the first lens assembly 600.

Meanwhile, the base 100 may include a base recess BR formed around the first coupling protrusion 110 and the second coupling protrusion 120. The base recess BR may be a recess designating a flow path of an adhesive member (not shown). When the first guide part 300 and the second guide recess BR are coupled to the base 100, the adhesive member (not shown) may be a bonding member applied around the first coupling protrusion 110 and the second coupling protrusion 120.

For example, the embodiment may include a first base recess 111*r* formed around the first-first coupling protrusion 111. The first base recess 111*r* may include a first portion having a shape corresponding to the first-first coupling protrusion 111 and a second portion extending from the first portion. The first portion and the second portion of the first base recess 111*r* may be connected to each other. The first portion and the second portion will be described in more detail below.

In addition, the base recess BR according to the embodiment may include a second base recess 112*r* formed around the first-second coupling protrusion 112. The second base recess 112*r* may include a first portion having a shape corresponding to the first-second coupling protrusion 112 and a second portion connected to the first portion and extending from the first portion.

In addition, the base recess BR according to the embodiment may include a third base recess 121*r* formed around the second-first coupling protrusion 121. The third base recess 121*r* may include a first portion having a shape corresponding to the second-first coupling protrusion 121 and a second portion connected to the first portion and extending from the first portion.

In addition, the base recess BR according to the embodiment may include a fourth base recess 122*r* formed around the second-second coupling protrusion 122. The fourth base recess 122*r* may include a first portion having a shape corresponding to the second-second coupling protrusion 122 and a second portion connected to the first portion and extending from the first portion.

Specifically, the fourth sidewall 100*d* of the base 100 may include a first region R1 in which the first coupling protrusion 110 and the second coupling protrusion 120 are provided, and a second region R2 other than the first region R1. In this case, the first region R1 and the second region R2 may have different heights or thicknesses. For example, the second region R2 may include a first protruding region P1 and a second protruding region P2 protruding in an optical axis direction based on the first region R1. That is, a first protruding region P1 and a second protruding region P2 may be formed in a region adjacent to the first region R1 where the coupling protrusions 110 and 120 are formed. The first region R1 and the second region R2 may be referred to as a stepped region.

In this case, the base recess BR includes a first portion BR1 formed around the coupling protrusions 110 and 120. The first portion BR1 may have a shape corresponding to the coupling protrusions 110 and 120.

Here, the base recess BR may function as a dam of the adhesive member (not shown) even when only the first portion BR1 is included. However, when the base 100 includes only the first portion BR1, it may be difficult to completely block an adhesive member (not shown) penetrating into an accommodation space inside the base 100.

Therefore, the embodiment includes an extension portion extending from the first portion BR1. For example, the base recess BR may include a second-first portion BR2 extending from the first portion BR1 and contacting the first protruding region P1. For example, the base recess BR may include a second-second portion BR3 extending from the first portion BR1 and contacting the second protruding region P2. The second-first portion BR2 and the second-second portion BR3 provide a flow path for an adhesive member (not shown) applied to the first portion BR1, and accordingly, it is possible to solve the problem that the adhesive member (not shown) overflows into the base 100.

Meanwhile, a coupling recess may be formed on an inner surface of the third sidewall 100c of the base 100. The coupling recess may include a first coupling recess 130 corresponding to the first guide part 300 and a second coupling recess 140 corresponding to the second guide part 400.

Specifically, a first coupling recess 130 may be provided on the inner surface of the third sidewall 100c of the base 100 so that the first guide protrusion 360 of the first guide part 300 is fitted. For example, the first coupling recess 130 may include a first-first coupling recess 131 corresponding to the first-first guide protrusion 361 of the first guide part 300 and a first-second coupling recess 132 corresponding to the first-second guide protrusion 362.

In addition, a second coupling recess may be provided on the inner surface of the third sidewall 100c of the base 100 so that the second guide protrusion 460 of the second guide part 300 is fitted. For example, the second coupling recess 140 may include a second-first coupling recess 141 into which the second-first guide protrusion 461 of the second guide part 400 is fitted and coupled and a second-second coupling recess 142 into which the second-second guide protrusion 462 is fitted.

Meanwhile, the camera module of the embodiment may include at least one of the previously described components and the later described components, while including the features of the base. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Driving Part>

FIGS. 19 and 20 are perspective views illustrating a driving part according to an embodiment, FIG. 21A is a perspective view of a part of a first driving part shown in FIG. 19, FIG. 21B is a detailed perspective view of a first yoke of a first driving part according to an embodiment, FIG. 21C is a bottom perspective view of a first yoke of the embodiment, FIG. 21D is a perspective view of some components of a first driving part according to a first additional embodiment, and FIG. 21E is a perspective view of some components of a first driving part according to a second additional embodiment.

Referring to FIGS. 19 to 21E, the driving part 200 may include a circuit board 210, a first driving part 220 and a second driving part 230. The first driving part 220 may include a coil, a magnet, and a yoke. Also, the second driving part 230 may include a coil, a magnet, and a yoke. In addition, each of the first and second driving parts 220 and 230 may include a position sensor for sensing a position of the magnet and the position of the second lens assembly 700 or the third lens assembly 800. Meanwhile, the positions of the coil and the magnet/yoke of the embodiment are not limited to the following description, and may be mutually changed.

The circuit board 210 may be disposed surrounding an outer surface of the base 100. For example, the circuit board 210 may be disposed surrounding the first sidewall 100a, the second sidewall 100b, and the lower part 100f of the base 100.

For example, the circuit board 210 may include a first substrate region disposed outside the first sidewall 100a of the base 100 and a second substrate region disposed outside the second sidewall 100b. Also, the circuit board 210 may include a third substrate region between the first substrate region and the second substrate region. The third substrate region may be disposed on an outer surface of the lower part 100f.

The circuit board 210 may be connected to a predetermined power supply unit (not shown) to apply power to a coil part disposed on the circuit board 210.

The circuit board 210 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The circuit board 210 as described above may have a U-shape, but is not limited thereto.

A part of the first driving part 220 and the second driving part 230 may be disposed on the circuit board 210.

For example, the first driving part 220 may include a first coil 221, a first magnet 222, a first yoke 223 and a first position sensor 224.

In addition, the first coil 221 and the first position sensor 224 constituting the first driving part 220 may be disposed on a first region of the circuit board 210.

In addition, the second driving part 230 may include a second coil 231, a second magnet 232, a second yoke 233, and a second position sensor 234.

In addition, the second coil 231 and the second position sensor 234 constituting the second driving part 230 may be disposed on a second region of the circuit board 210.

The first coil 221 of the first driving part 220 may be disposed within the accommodation space of the base 100 through the first opening OA1 of the base 100 in a state of being disposed on the first region of the circuit board 210. Accordingly, the first coil 221 of the first driving part 220 may be disposed facing the first magnet 222 disposed on the second lens assembly 700.

In addition, the second coil 231 of the second driving part 230 may be disposed within the accommodation space of the base 100 through the second opening of the base 100 in a state of being disposed on the second region of the circuit board 210. Accordingly, the second coil 231 of the second driving part 230 may be disposed facing the second magnet 232 disposed on the third lens assembly 800.

The first magnet 222 of the first driving part 220 is disposed on the second lens assembly 700. In addition, the second magnet 232 of the second driving part 230 is disposed on the third lens assembly 800.

Accordingly, when a current is applied to the first coil 221 disposed on the circuit board 210, the embodiment may allow the second lens assembly 700 to move in the optical axis direction corresponding to a direction and an intensity of the applied current by the electromagnetic force between the first coil 221 and the first magnet 222.

In addition, when a current is applied to the second coil 231 disposed on the circuit board 210, the embodiment may allow the third lens assembly 800 to move in the optical axis direction corresponding to a direction and an intensity of the applied current by the electromagnetic force between the second coil 231 and the second magnet 232.

In addition, when the second lens assembly 700 and the third lens assembly 800 are driven by the electromagnetic force between the coil and the magnet during AF or zoom implementation, the embodiment may provide a camera actuator capable of preventing magnetic field interference between magnets to which each lens assembly is mounted, and a camera module including the same.

Specifically, the embodiment includes a first yoke 223 disposed between the second lens assembly 700 and the first magnet 222. In addition, the embodiment includes a second yoke 233 disposed between the third lens assembly 800 and the second magnet 232.

In this case, the first yoke 223 and the second yoke 233 may have shapes corresponding to each other. Accordingly, only the first yoke 223 will be described in detail below.

Referring to FIG. 21A, the first yoke 223 includes a first supporting part 223a1 and a first side surface protruding 223a2 part extending in a lateral direction of the first magnet 222 from the first supporting part 223a1.

The first side surface protruding part 223a2 may be disposed on both side surfaces of the first magnet 222.

In addition, the first yoke 223 may include a first fixed protruding part 223a3 extending in a direction different from that of the first side surface protruding part 223a2, for example, in an opposite direction.

The first fixed protruding part 223a3 may be disposed at the center of the first supporting part 223a1, but is not limited thereto.

Similarly, the second yoke 233 of the embodiment may include a second supporting part, a second side surface protruding part, and a second fixed protruding part corresponding to the first yoke 223.

In the related art, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a driving part of the first lens assembly 110 or the second lens assembly 120 includes a side surface protruding part extending to a side surface of the magnet, and thus there is a special technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

FIGS. 21B and 21C, the first yoke 223 may include a first supporting part 223a1, and a first side surface protruding part 223a2 extending from the first supporting part 223a1 to the side of the first magnet 222. The first side surface protruding part 223a2 may be disposed on both side surfaces of the first magnet 222. The first yoke 223 may be formed of a ferromagnetic material, but is not limited thereto.

The first yoke 223 may include a first fixed protruding part 223a3 protruding in a direction different from that of the first side surface protruding part 223a2, for example, in an opposite direction. The first yoke 223 may include a supporting part recess 223ar between the first side surface protruding part 223a2 and the first fixed protruding part 223a3. The structures of the first side surface protruding part 223a2 and the first fixed protruding part 223a3 may be more firmly formed by the supporting part recess 223ar.

According to the embodiment, the first yoke 223 includes a first side surface protruding part 223a2 extending to the side surface of the first magnet 222, and the side surface protruding part 223a2 is disposed on both sides of the first support part 223a1, so that it can function to firmly fix the first magnet 222 and improve mechanical reliability.

Accordingly, the first yoke 223 includes a first side surface protruding part 223a2 extending to the side of the first magnet 222, so that it can prevent magnetic field interference between magnets mounted on each lens assembly and can achieve thrust improvement according to magnetic flux concentration.

In addition, the first yoke 223 includes a first fixed protruding part 223a3 extending in a direction different from that of the first side surface protruding part 223a2, for example, in an opposite direction, so that it can improve mechanical bonding. For example, the embodiment can improve mechanical reliability by fixing the first fixed protruding part 223a3 to the second lens assembly 700 while the first yoke 223 includes a first fixed protruding part 223a3 extending in the opposite direction of the first side surface protruding part 223a2.

Meanwhile, according to an additional embodiment, a second thickness T2 of the first side surface protruding part 223a2 may be formed greater than a first thickness T1 of the first supporting part 223a1. Accordingly, since the thickness of the yoke is thick in the region where the magnetic flux density is high, the efficiency of dissipation of the magnetic flux density increases, thereby improving the shielding function of the magnetic flux and concentrating the magnetic flux.

According to the first additional embodiment according to FIG. 21D, the yoke 223A may include a first supporting part 223a1, a first side surface protruding part 223a2 extending from the first supporting part 223a1 to the side surface of the first magnet 222, and a first extension protruding part 223a22 extending upward from the first side surface protruding part 223a2 to an upper surface of the first magnet 222.

Accordingly, a total thickness of the first side surface protruding part 223a2 and the second extension protrusion 223a22 may be greater than the thickness of the first magnet 222.

According to the first additional embodiment, a yoke in a driving part of a first lens assembly 700 and a second lens assembly 800 includes an extension protruding part extending more upward than an upper surface of a magnet, and thus there is a special technical effect that leakage flux may be more effectively prevented, and thrust may be significantly improved by maximizing concentration of magnetic flux in a region having a high magnetic flux density.

In addition, referring to FIG. 21E, the yoke 223A of the camera module according to the second additional embodiment may include a first supporting part 223a1, a first side surface protruding part 223a2 extending from the first support part 223a1 to a first side surface of the first magnet 222, and a second side surface protruding part 223*a*4 protruding to a second side surface of the first magnet 222.

The first side surface of the first magnet 222 and the second side surface of the first magnet 222 may not face each other.

According to the second additional embodiment, a yoke in a driving part of a second lens assembly 700 and a third lens assembly 80 includes a side surface protruding part having a structure surrounding four side surfaces of a magnet, and thus there is a technical effect that leakage flux may be more effectively prevented, and a magnetic flux density in which the leakage flux is prevented may be used to improve thrust.

Meanwhile, the camera module of the embodiment may include at least one of the previously described components and the later described components, while including the features of the driving part. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Second Camera Actuator>

FIG. 22 is a perspective view of a camera module according to an embodiment, and FIG. 23 is a perspective view of a camera module according to the embodiment in which some components are omitted.

Referring to FIGS. 22 and 23, the camera module 10 according to the embodiment may include one or a plurality of camera actuators. For example, the camera module 10 may include a first camera actuator 1000 and a second camera actuator 2000, and may include a cover case 15 protecting the first camera actuator 1000 and the second camera actuator 2000.

The first camera actuator 1000 may support a plurality of lenses and perform a zoom function or an auto focus function by moving the lenses in an optical axis direction in response to a control signal from a controller. That is, the first camera actuator 1000 may be the above-described camera actuator of FIGS. 1 to 21.

The second camera actuator 2000 may be an Optical Image Stabilizer (OIS) actuator. In this case, light incident on the camera module 10 from the outside may be firstly incident on the second camera actuator 2000. In addition, the path of the light incident on the second camera actuator 2000 may be changed to be incident on the first camera actuator 1000, and light passing through the first camera actuator 1000 may be incident to the image sensor 900.

FIG. 24 is an exploded perspective view of the second camera actuator shown in FIG. 23.

Referring to FIG. 24, the second camera actuator 2000 may include a second housing 2100, an image shaking control unit 2200 and 2300 disposed on the second housing 2100, and a prism unit 2400 disposed on the image shaking control unit 2200 and 2300.

In addition, the second camera actuator 2000 may further include a cover member (not shown). The cover member (not shown) may include an accommodation space therein and at least one side thereof may be open. For example, the cover member may be disposed surrounding an outer surface of the second housing 2100. Preferably, a part of the image shaking control unit 2200 and 2300 may be disposed on an outer surface of the second housing 2100. In addition, the cover member may be disposed to surround a part of the image shaking control unit (2200, 2300) disposed on an outer surface of the second housing 2100. Accordingly, the cover member may protect the image shaking control unit 2200 and 2300, the second housing 2100, and the prism unit 2400. The cover member may have a structure in which a plurality of side surfaces connected to each other are open. In detail, the cover member may have a structure in which a front surface through which light is incident from the outside, a lower surface corresponding to the second camera actuator 2000, and a rear surface opposite to the front surface are open, and may provide a light path of the prism unit 2400 to be described later.

The cover member may include a rigid material. For example, the cover member may include a material such as resin or metal, and may support the second housing 2100 disposed in the accommodating space. For example, the cover member may surround and support the second housing 2100, the image shaking control unit 2200 and 2300, and the prism unit 2400.

In detail, the prism unit 2400, which will be described later, may move in a first direction and/or a second direction by the image shaking control unit 2200 and 2300. In this case, the cover member may fix the second housing 2100 and the image shaking control unit 2200 and 2300 to set positions, thereby providing a more accurate light movement path. In addition, the cover member may prevent the second housing 2100 from escaping to the outside of the second camera actuator 2000 while the prism unit 2400 is stably supported to the second housing 2100 by the pressing part 2600. The cover member may be omitted depending on an arrangement of the second housing 2100, the image shaking control unit 2200 and 2300, and the prism unit 2400.

Meanwhile, the image shaking control unit 2200 and 2300 may include an OIS substrate 2200 and a third driving part 2300. The third driving part 2300 may include a coil part 2310, a magnet part 2320, a yoke part 2330, and a position sensing part 2340.

In addition, the second camera actuator 2000 may include a moving plate 2500 disposed between the second housing 2100 and the prism unit 2400. The moving plate 2500 allows the prism unit 2400 to be tilted in a first axis direction and a second axis direction perpendicular to the first axis with respect to the second housing 2100.

In addition, the second camera actuator 2000 may include a pressing part 2600. The pressing part 2600 may include a first pulling member 2610 and a second pulling member 2620. The first pulling member 2610 may be disposed on the prism unit 2400. The second pulling member 2620 may be disposed on the second housing 2100. Specifically, the second pulling member 2620 may be disposed on the OIS substrate 2200 of the image shaking control unit 2200 and 2300. The first pulling member 2610 and the second pulling member 2620 may press the prism unit 2400 against the second housing 2100. For example, an attractive force may be generated between the first pulling member 2610 and the second pulling member 2620. In addition, the prism unit 2400 may be supported while being pressed against the second housing 2100 by the attractive force.

FIGS. 25 to 37 are perspective views of each component of a second camera actuator according to an embodiment.

The second camera actuator 2000 according to the embodiment may include the second housing 2100, the image shaking control unit 2200 and 2300, the prism unit 2400, the moving plate 2500, and the pressing part 2600.

In detail, the image shaking control unit 2200 and 2300 may include an OIS substrate 2200, a coil part 2310, a magnet part 2320, a yoke part 2330, and a position sensing part 2340.

In addition, the prism unit 2400 may include a prism 2400b and a prism mover 2400a.

In addition, the pressing part 2600 may include a first pulling member 2610 and a second pulling member 2620. An attractive force may be generated between the first pulling member 2610 and the second pulling member 2620, and the prism unit 2400 is supported to the second housing 2100 while being pressed.

The embodiment includes image shaking control unit 2200 and 2300 disposed on the second housing 2100, and accordingly, there is a technical effect capable of providing an ultra-slim and subminiature camera actuator and a camera module including the same.

In addition, the embodiment arranges the image shaking control unit 2200 and 2300 below the prism unit 2400, and accordingly, there is a technical effect capable of securing a sufficient amount of light by eliminating the size limitation of the lens in the lens assembly of the optical system when implementing OIS.

In addition, the embodiment is provided with image shaking control unit 2200 and 2300 stably disposed on the second housing 2100 to control the tilting of the prism unit 2400 in the first axis or the second axis, and accordingly, there is a technical effect of producing the best optical characteristics by minimizing the occurrence of a decentration or tilt phenomenon when implementing OIS.

In addition the embodiment includes image shaking control unit 2200 and 2300, unlike conventional moving a plurality of solid lenses and implements OIS by controlling the tilting of the prism unit 2400 to the first axis or the second axis, and accordingly, there is a technical effect that enables OIS implementation with low power consumption.

Referring to the following drawings, each component of the second camera actuator 2000 will be described in detail.

<Image Shaking Control Unit>

FIG. 25 is a perspective view of a part of an image shaking control unit of a second camera actuator, FIG. 26 is a perspective view of a substrate of a second camera actuator viewed from a first direction, FIG. 27 is a perspective view of a substrate of a second camera actuator viewed from a second direction, FIG. 28 is a view for explaining a pressing part disposed on a substrate of a second camera actuator, and FIG. 29 is an exploded perspective view of a substrate and a driving part of a second camera actuator.

Referring to FIGS. 25 to 29, the image shaking control unit 2200 and 2300 may include an OIS substrate 2200 and a third driving part 2300.

In addition, the third driving part 2300 may include a coil part 2310, a magnet part 2320, a yoke part 2330, and a position sensing part 2340. A part of the third driving part 2300 may be disposed on the OIS substrate 2200. In addition, a remaining part of the third driving part 2300 may be disposed on an outer surface of the prism unit 2400 facing an inner surface of the OIS substrate 2200. For example, the coil part 2310 and the position sensing part 2340 of the third driving part 2300 may be disposed on an inner surface of the OIS substrate 2200. In addition, the magnet part 2320 and the yoke part 2330 of the third driving part 2300 may be disposed on the prism unit 2400. Specifically, the magnet part 2320 and the yoke part 2330 of the third driving part 2300 may be disposed on the prism mover 2400a of the prism unit 2400.

The OIS substrate 2200 may be connected to a predetermined power supply unit (not shown) to apply power to the coil part 2310 disposed on the OIS substrate 2200.

The OIS substrate 2200 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

For example, the OIS substrate 2200 may include a rigid region and a flexible region. For example, a gyro sensor 2270 or a driver IC 2280 may be mounted on the OIS substrate 2200. In the OIS substrate 2200, a region where the gyro sensor 2270 or the driver IC 2280 is mounted may be configured as a rigid region. In addition, the OIS substrate 2200 may include a region where the coil part 2310, the position sensing part 2340, and the second pulling member 2620 are disposed. In addition, the OIS substrate 2200 may include a flexible region where the coil part 2310, the position sensing part 2340, and the second pulling member 2620 are disposed. The flexible region of the OIS substrate 2200 can be bent to correspond to the shape or curve of the outer surface of the second housing 2100, and thus can be stably disposed on the second housing 2100.

The coil part 2310 of the third driving part 2300 may be disposed on the OIS substrate 2200. The coil part 2310 may be electrically connected to the OIS substrate 2200. The coil part 2310 may include one or a plurality of coil parts.

The coil part 2310 may include a first coil part 2311, a second coil part 2312, and a third coil part 2313.

The first to third coil parts 2311, 2312, and 2313 may be spaced apart from each other. A region in which the first to third coil parts 2311, 2312, and 2313 are disposed in an entire region of the OIS substrate 2200 may have a 'c' shape.

Specifically, the OIS substrate 2200 may include a first substrate region 2210, a second substrate region 2220, a third substrate region 2230 and a fourth substrate region 2240.

A first coil part 2311 of the plurality of coil parts 2310 may be disposed on the first substrate region 2210. The first substrate region 2210 may be a first side region of the OIS substrate 2200. For example, the first substrate region 2210 may be a left-side region of the OIS substrate 2200. The first substrate region 2210 may correspond to a first side portion 2110 of the second housing 2100 to be described later. For example, the first substrate region 2210 may be a region facing the first side portion 2110 of the second housing 2100. For example, the first substrate region 2210 may be a region disposed outside the first side portion 2110 of the second housing 2100.

A second coil part 2312 of the plurality of coil parts 2310 may be disposed on the second substrate region 2220. The first substrate region 2210 may be a second side region of the OIS substrate 2200. For example, the second substrate region 2220 may be a right-side region of the OIS substrate 2200. The second substrate region 2220 may correspond to a second side portion 2120 of the second housing 2100 to be described later. For example, the second substrate region 2220 may be a region facing the second side portion 2120 of the second housing 2100. For example, the second substrate region 2220 may be a region disposed outside the second side portion 2120 of the second housing 2100.

The second pulling member 2620 of the pressing part 2600 may be disposed on the third substrate region 2230. The third substrate region 2230 may be a third side region of the OIS substrate 2200. For example, the third substrate region 2230 may be a rear-side region of the OIS substrate 2200. The third substrate region 2230 may correspond to a third side portion 2130 of the second housing 2100 to be described later. For example, the third substrate region 2230 may be a region facing the third side portion 2130 of the second housing 2100. For example, the third substrate region 2230 may be a region disposed outside the third side portion 2130 of the second housing 2100. In this case, the OIS substrate 2200 in the camera actuator of the comparative example includes only the first substrate region 2210, the second substrate region 2220, and the fourth substrate region 2240.

In this case, the OIS substrate 2200 of the camera actuator 1000 of the embodiment may further include the third substrate region 2230 connecting the first substrate region 2210 and the second substrate region 2220. The third substrate region 2230 is not directly connected to the first substrate region 2210 and the second substrate region 2220. That is, the OIS substrate 2200 of the embodiment may include the first substrate region 2210, the second substrate region 2220, and the fourth substrate region 2240 having structures separated from each other based on the fourth substrate region 2240. For example, the OIS substrate 2200 includes a first substrate region 2210 extending upward from the first side end of the fourth substrate region 2240 constituting a bottom portion. In addition, the OIS substrate 2200 includes a second substrate region 2220 extending upward from the second side end of the fourth substrate region 2240 facing the first side end. In addition, the OIS substrate 2200 includes a third substrate region 2230 extending upward from a third side end of the fourth substrate region 2240 between the first side end and the second side end. The third substrate region 2230 may be spaced apart from the first substrate region 2210 and the second substrate region 2220. That is, the first substrate region 2210, the second substrate region 2220, and the third substrate region 2230 may be connected to each other through the fourth substrate region 2240, but are not directly connected to each other.

A third coil part 2313 of the plurality of coil parts 2310 may be disposed on the fourth substrate region 2240. The fourth substrate region 2240 may be a lower region of the OIS substrate 2200. For example, the fourth substrate region 2240 may be a bottom portion of the OIS substrate 2200. The fourth substrate region 2240 may be a region facing a fourth side portion 2140 of the second housing 2100 to be described later. For example, the fourth substrate region 2240 may be a region disposed outside the fourth side portion 2140 of the second housing 2100.

Meanwhile, the first substrate region 2210, the third substrate region 2230, and the fourth substrate region 2240 of the OIS substrate 2200 may be flexible regions. In addition, the second substrate region 2220 of the OIS substrate 2200 may be a rigid region.

Accordingly, the gyro sensor 2270 and the driver IC 2280 may be disposed on the second substrate region 2220 of the OIS substrate 2200. The driver IC 2280 may receive sensing information acquired from the gyro sensor 2270 and recognize a hand shake state using the received sensing information. In addition, the driver IC 2280 may control the intensity of current or voltage applied to the coil part 2310 based on the recognized hand shake state.

The gyro sensor 2270 may be disposed on an outer surface of the second substrate region 2220. Accordingly, the gyro sensor 2270 may be exposed to the outside from the second camera actuator 2000. The driver IC 2280 may be disposed on an inner surface of the second substrate region 2220. The outer and inner surfaces of the second substrate region 2220 may mean surfaces of the second substrate region 2220 that face each other. In addition, a second electronic component 2260 may be disposed on the second substrate region 2220. The second electronic component 2260 may be a capacitor, but is not limited thereto. For example, the second electronic component 2260 may be a memory storing control information for controlling the intensity of current or voltage supplied to the coil part 2310 based on a hand shake state. In addition, a terminal 2250 may be disposed on the second substrate region 2220 of the OIS substrate 2200. The terminal 2250 may be a terminal for electrically connecting a main board (not shown) of the camera module and the OIS substrate 2200 of the second camera actuator 2000 to each other.

Meanwhile, in the embodiment, the gyro sensor 2270 and the driver IC 2280 are disposed on the second substrate region 2220 of the OIS substrate 2200, but it is not limited thereto. For example, the gyro sensor 2270 and the driver IC 2280 may be disposed on the first substrate region 2210 facing the second substrate region 2220.

Also, the first coil part 2311 and the second coil part 2312 may be disposed on the first substrate region 2210 and the second substrate region 2220 of the OIS substrate 2200 facing each other. In addition, the third coil part 2313 may be disposed on a fourth substrate region 2240 that is a connection region connecting the first substrate region 2210 and the second substrate region 2220 of the OIS substrate 2200.

In addition, the third driving part 2300 may include a magnet part 2320 opposite to the coil part 2310. The magnet part 2320 may include a first magnet 2321, a second magnet 2322, and a third magnet 2323 disposed on regions corresponding to the plurality of coil parts 2310. Such a magnet part 2320 may be disposed to correspond to the coil part 2310. Specifically, the magnet part 2320 may be disposed on a side portion of the prism mover 2400a of the prism unit 2400, in a region corresponding to each coil part.

For example, the prism mover 2400a may include a first side portion 410 corresponding to the first coil part 2311. Also, the first magnet 2321 may be disposed on the first side portion 2410 of the prism mover 2400a. The prism mover 2400a may include a second side portion 2420 corresponding to the second coil part 2312. Also, the second magnet 2322 may be disposed on the second side portion 2420 of the prism mover 2400a. The prism mover 2400a may include a fourth side portion 2440 corresponding to the third coil part 2313. Also, the third magnet 2323 may be disposed on the fourth side portion 2440 of the prism mover 2400a.

Also, the third driving part 2300 according to the embodiment may include a yoke part 2330. The yoke part 2330 may stably fix the magnet part 2320. The yoke part 2330 may be disposed to correspond to the magnet part 2320. For example, a plurality of yoke parts 2330 may be formed in a 1:1 correspondence to the magnet part 2320.

For example, the yoke part 2330 may include a first yoke 2331 disposed to correspond to the first magnet 2321 on the first side portion 2410 of the prism mover 2400a. For example, the yoke part 2330 may include a second yoke 2332 disposed to correspond to the second magnet 2322 on the second side portion 2420 of the prism mover 2400a. For example, the yoke part 2330 may include a third yoke 2333 disposed to correspond to the third magnet 2323 on the fourth side portion 2440 of the prism mover 2400a.

Also, the third driving part 2300 may include a position sensing part 2340. The position sensing part 2340 may be disposed on an inner region of the coil part 2310.

The position sensing part 2340 may be connected to the driver IC 2280 and transmit position sensing information to the driver IC 2280. The position sensing part 2340 may be a magnetic sensor capable of detecting a change in magnetic force. The position sensing part 2340 may detect a change in magnetic force according to the tilt of the prism unit 2400. The position sensing part 2340 may obtain position information of the prism unit 2400 by sensing a change in magnetic flux according to the movement of the magnet part 2320.

The position sensing part 2340 may be, for example, a hall sensor, but is not limited thereto.

The position sensing part 2340 may be disposed on each OIS substrate 2200. Preferably, the position sensing part 2340 may be disposed adjacent to the coil part 2310 on the OIS substrate 2200. A plurality of position sensing parts 2340 may be provided.

The position sensing part 2340 may include a first position sensor 2341 disposed adjacent to the first coil part 2311 in the first substrate region 2210 of the OIS substrate 2200. In addition, the position sensing part 2340 may include a second position sensor 2342 disposed adjacent to the second coil part 2312 in the second substrate region 2220 of the OIS substrate 2200. In addition, the position sensing part 2340 includes a third position sensor 2343 and a fourth position sensor 2344 disposed adjacent to the third coil part 2313 in the fourth substrate region 2240 of the OIS substrate 2200.

Meanwhile, the OIS substrate 2200 includes a third substrate region 2230. The third substrate region 2230 of the OIS substrate 2200 may be a region disposed on an outer surface of the third side portion 2130 of the second housing 2100. That is, the third substrate region 2230 of the OIS substrate 2200 may correspond to the third side portion 2130 of the second housing 2100. A part of the pressing part 2600 may be disposed on the third substrate region 2230 of the OIS substrate 2200. For example, a second pulling member 2620 may be disposed on the third substrate region 2230 of the OIS substrate 2200. In this case, the second pulling member 2620 may be electrically connected to the OIS substrate 2200. The second pulling member 2620 may be an electronic component. Specifically, the second pulling member 2620 may be an electronic component having magnetism electrically connected to the OIS substrate 2200. For example, the second pulling member 2620 may be a capacitor. A plurality of capacitors corresponding to the second pulling member 2620 may be disposed at a predetermined distance from each other in the third substrate region 2230 of the OIS substrate 2200.

Preferably, the first pulling member 2610 of the pressing part 2600 may be disposed on the prism unit 2400. As will be described later, the first pulling member 2610 of the pressing part 2600 may be disposed on a third side portion 2530 of the prism mover 2400a. The third side portion 2530 of the prism mover 2400a may correspond to the third side portion 2130 of the second housing 2100. Also, the third side portion 2530 of the prism mover 2400a may correspond to the third substrate region 2230 of the OIS substrate 2200. Accordingly, the first pulling member 2610 and the second pulling member 2620 of the pressing part 2600 may be disposed to correspond to each other on the prism mover 2400a and the third substrate region 2230 of the OIS substrate 2200. That is, the first pulling member 2610 and the second pulling member 2620 may be on the prism mover 2400a and the third substrate region 2230 and facing each other with the third side portion 2130 of the second housing 2100 and the moving plate 2500 to be described later interposed therebetween. In the prism mover 2400a and the third substrate area 2230, This will be described in further detail below.

Meanwhile, a hole may be formed in each substrate region of the OIS substrate 2200.

Specifically, a plurality of first-first holes 2211 may be formed in the first substrate region 2210 of the OIS substrate 2200. In addition, a plurality of first-second holes 2221 may be formed in the second substrate region 2220 of the OIS substrate 2200. In addition, a plurality of first-third holes 2231 may be formed in the third substrate region 2230 of the OIS substrate 2200. In addition, a plurality of first-fourth holes 2241 may be formed in the fourth substrate region 2240 of the OIS substrate 2200. The first-first hole 2211, the first-second hole 2221, the first-third hole 2231, and the first-fourth hole 2241 may be a coupling hole for coupling the OIS substrate 2200 onto the second housing 2100. For example, protrusions (to be described later) corresponding to the plurality of holes may be formed on the second housing 2100. In addition, the first-first hole 2211, the first-second hole 2221, the first-third hole 2231, and the first-fourth hole 2241 of the OIS substrate 2200 may be inserted into the protrusions provided in the second housing 2100. Accordingly, the position of the OIS substrate 2200 may be fixed on the second housing 2100.

Meanwhile, the image shaking control unit 2200 and 2300 may further include a lower plate 2200a. The lower plate 2200a may be a lower cover of a camera actuator. The lower plate 2200a may function to secure the rigidity of the OIS substrate 2200. The lower plate 2200a is not an essential component and may be selectively omitted.

Meanwhile, the camera module of the embodiment may include at least one of the previously described components and the later described components, while including the features of the image shaking control unit. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Second Housing>

FIGS. 30 to 32 are perspective views of a second housing of a second camera actuator according to an embodiment.

Referring to FIGS. 30 to 32, the second housing 2100 may include an accommodation space for accommodating the prism unit 2400. The second housing 2100 may include a plurality of side portions. For example, the second housing 2100 includes a first side portion 2110 corresponding to the first substrate region 2210 of the OIS substrate 2200, a second side portion 2120 corresponding to the second substrate region 2220 of the OIS substrate 2200, a third side portion 2130 corresponding to the third substrate region 2230 of the OIS substrate 2200 and a fourth side portion 2140 corresponding to the fourth substrate region 2240 of the OIS substrate 2200.

In detail, the second housing 2100 includes a first side portion 2110 corresponding to the first coil part 2311, a second side portion 2120 corresponding to the second coil part 2312, a third side portion 2130 corresponding to the second pulling member 2620 and a fourth side portion 2140 corresponding to the third coil part 2313. The second housing 2100 may have a hexahedral shape, but is not limited thereto. However, the second housing 2100 may have a plurality of side portions, and at least two open regions (not shown) may be formed between the plurality of side portions. One of the two open regions may be a region corresponding to a light inlet that supplies light to the prism unit 2400. Also, the other one of the two open regions may be a region corresponding to a light emitting unit that provides light reflected by the prism unit 2400 to a lens part (to be described later) of the second camera actuator.

The second housing 2100 may include a plurality of housing holes. The housing hole may be a through hole passing through inner and outer surfaces of each side portion of the second housing 2100. The plurality of housing holes may include first to fourth housing holes.

The second housing 2100 may include a first housing hole 2111. The first housing hole 2111 may be a hole passing through the inner and outer surfaces of the first side portion 2110 of the second housing 2100.

The second housing 2100 may include a second housing hole 2121 and 2122. The second housing hole 2121 and 2122 may be a hole passing through inner and outer surfaces of the second side portion 2120 of the second housing 2100. The second housing hole may include a second-first housing hole 2121 and a second-second housing hole 2122 spaced apart from each other.

The second housing 2100 may include a third housing hole 2134. The third housing hole 2134 may be a hole passing through inner and outer surfaces of the third side portion 2130 of the second housing 2100.

The second housing 2100 may include a fourth housing hole 2141. The fourth housing hole 2141 may be a hole passing through inner and outer surfaces of the fourth side portion 2140 of the second housing 2100.

A part of the plurality of housing holes may be formed in a region corresponding to the coil part 2310. In addition, another part of the plurality of housing holes may be formed in a region corresponding to the driver IC 2280. In addition, the remaining part of the plurality of housing holes may be formed in a region corresponding to the second pulling member 2620 of the pressing part 2600.

The first housing hole 2111 may be formed in a region corresponding to the first coil part 2311. The first housing hole 2111 may have a size and shape corresponding to that of the first coil part 2311. Accordingly, the first coil part 2311 may be partially or entirely inserted into the first housing hole 2111 and disposed.

The second-first housing hole 2121 may be formed in a region corresponding to the second coil part 2312. The second-first housing hole 2121 may have a size and shape corresponding to that of the second coil part 2312. Accordingly, the second coil part 2312 may be partially or entirely inserted into the second-first housing hole 2121 and disposed.

The second-second housing hole 2122 may be formed in a region corresponding to the driver IC 2280. The second-second housing hole 2122 may have a size and shape corresponding to that of the driver IC 2280. Accordingly, the driver IC 2280 may be partially or entirely inserted into the second-second housing hole 2122 and disposed.

The third housing hole 2134 may be formed in a region corresponding to the second pulling member 2620. The third housing hole 2134 may have a size and shape corresponding to that of the second pulling member 2620. Accordingly, the second pulling member 2620 may be partially or entirely inserted into the third housing hole 2134 and disposed.

The fourth housing hole 2141 may be formed in a region corresponding to the third coil part 2313. The fourth housing hole 2141 may have a size and shape corresponding to that of the third coil part 2313. Accordingly, the third coil part 2313 may be partially or entirely inserted into the fourth housing hole 2141 and disposed.

The second housing 2100 may include a seating recess 2135.

The seating recess 2135 may be formed in a region corresponding to the third substrate region 2230 of the OIS substrate 2200. That is, the seating recess 2135 may be formed on an outer surface of the third side portion 2130 of the second housing 2100. The seating recess 2135 may be a seating portion on which the third substrate region 2230 is seated. The seating recess 2135 reduces a separation distance between the first pulling member 2610 and the second pulling member 2620 constituting the pressing part 2600, and as a result, it is possible to increase the mutually generated attractive force.

That is, each side portion of the second housing 2100 has a certain thickness. In this case, the second housing 2100 may be formed by injection molding. In addition, each of the side portions may have the same thickness as each other for ease of injection.

In this case, the second pulling member 2620 is an electronic component electrically connected to the OIS substrate 2200. For example, the second pulling member 2620 is a capacitor electrically connected to the OIS substrate 2200. In this case, the capacitor has a specification according to the product, and has a certain height accordingly. Here, when a magnetic material such as a general yoke is used as the second pulling member, a thickness of the yoke may be manufactured to match the thickness of the second housing 2100 and used. Alternatively, the second pulling member 2620 of the embodiment is an electronic component such as a capacitor, and accordingly, it is difficult to design its thickness or height to match the thickness of the side portion of the second housing 2100. Accordingly, in the embodiment, the seating recess 2135 in which the third substrate region 2230 of the OIS substrate 2200 is disposed is formed on the outer surface of the third side portion 2130 of the second housing 2100 where the second pulling member 2620 is disposed. Accordingly, the embodiment can reduce the distance between the first pulling member 2610 and the second pulling member 2620 by the depth of the seating recess 2135, and it is possible to increase the attractive force corresponding to this.

Meanwhile, a plurality of protrusions may be formed on an outer surface of each side portion of the second housing 2100. The plurality of protrusions may correspond to holes formed in respective substrate regions of the OIS substrate 2200.

That is, a first protrusion (not shown) may be formed on an outer surface of the first side portion 2110 of the second housing 2100. The first protrusion may correspond to a plurality of first-first holes 2211 formed in the first substrate region 2210 of the OIS substrate 2200.

In addition, a second protrusion 2123 may be formed on an outer surface of the second side portion 2120 of the second housing 2100. The second protrusion 2123 may correspond to a plurality of first-second holes 2221 formed in the second substrate region 2220 of the OIS substrate 2200.

In addition, a third protrusion 2136 may be formed on an outer surface of the third side portion 2130 of the second housing 2100. The third protrusion 2136 may be formed on an outer surface of the seating recess 2135 among outer surfaces of the third side portion 2130. The third protrusion 2136 may correspond to a plurality of first-third holes 2231 formed in the third substrate region 2230 of the OIS substrate 2200.

In addition, a fourth protrusion (not shown) may be formed on an outer surface of the fourth side portion 2140 of the second housing 2100. The fourth protrusion may correspond to a plurality of first-fourth holes 2241 formed in the fourth substrate region 2240 of the OIS substrate 2200.

The first to fourth protrusions may be coupling protrusions for stably coupling the OIS substrate 2200 to the outer surface of the second housing 2100. When the OIS substrate 2200 is coupled to the second housing 2100, the first to fourth protrusions may be inserted into holes formed in respective substrate regions of the OIS substrate 2200.

The second housing 2100 may include at least one recess.

For example, a first recess 2131 may be formed on at least one inner surface of the second housing 2100. The first recess 2131 may be formed on an inner surface of the third side portion 2130 of the second housing 2100. Preferably, the first recess 2131 may be formed in a region corresponding to the third substrate region 2230 where the first pulling member 2610 and the second pulling member 2620 are disposed and the third side portion 2430 of the prism mover 2400*a*.

The third side portion 2430 of the prism mover 2400*a* may be a region where a moving plate 2500 corresponding to a rotation axis for tilting the prism unit 2400 in the first and second axis directions is disposed.

The first recess 2131 may have a concave recess shape in a direction from an inner surface to an outer surface of the third side portion 2130 of the second housing 2100. The first recess 2131 may have a concave shape from an inner surface of the third side portion 2130 of the second housing 2100 to an outer surface direction (z-axis direction) of the third side portion 2130.

The first recess 2131 may be a seating portion on which the moving plate 2500 is seated. The first recess 2131 may provide a space in which a second moving protrusion (to be described later) disposed on a second surface of the moving plate 2500 is seated or inserted.

The first recess 2131 may be spaced apart from each other in a first direction (x-axis direction) based on a center of the inner surface of the third side portion 2130. That is, the first recess 2131 may include a first sub-first recess 2132 spaced apart in a −x axis with respect to the center of the inner surface of the third side portion 2130 and a second sub-first recess 2133 spaced apart in a +x axis. In this case, a center of the third housing hole 2134 may be positioned on an imaginary straight line connecting the centers of the first sub-first recess 2132 and the second sub-first recess 2133.

That is, the first recess 2131 may include a plurality of sub-recesses spaced apart from each other in the first direction based on a center region of the third side portion 2130 of the second housing 2100. Here, the third housing hole 2134 may be formed in a center region of the third side portion 2130. Accordingly, the first recess 2131 may be spaced apart from the third housing hole 2134 in a first direction.

Meanwhile, the second substrate region 2220 of the OIS substrate 2200 may include a second-first region 2220*a* facing the second side portion 2120 of the second housing 2100 and a second-second region 2220*b* other than the second-first region 2220*a*.

In addition, the second electronic component 2260 may be disposed on the second substrate region 2220 of the OIS substrate 2200 as described above. In this case, the second electronic component 2260 may be a memory as described above, but may also be a capacitor.

That is, the first actuator of the embodiment may include a plurality of capacitors for OIS operation. In this case, a part of the capacitor is used as the second pulling member 2620 constituting the pressing part 2600 of the embodiment. In addition, it may be difficult to use all of the plurality of capacitors provided for the OIS operation as the second pulling member 2620. That is, the space in which the second pulling member 2620 is disposed is limited, and thus it may be difficult to place all of the plurality of capacitors in the limited space. Accordingly, the capacitor of the electronic component of the embodiment can be divided into a first electronic component used as the second pulling member 2620 and a second electronic component 2260 other than the second pulling member 2620.

In addition, the second electronic component 2260 may be disposed on the second-second region 2220*b* of the second substrate region 2220. That is, when the second electronic component 2260 is a capacitor, the capacitor has magnetism, and accordingly, it may generate an external force between the magnet part 2320 and the first pulling member 2610 of the pressing part 2600. Accordingly, the embodiment arranges the second electronic component 2260 in the second-second region 2220*b* of the second substrate region 2220 of the OIS substrate 2200 as described above, so that it can remove external force that may occur between the magnet part 2320 as described above and the first pulling member 2610 constituting the pressing part 2600.

In addition, a center of the hole 2530 of the moving plate 2500 may be provided in a region connecting a center of a plurality of first moving protruding parts 2511 disposed in a first direction on a first surface 2510 and a center of a second moving protruding part 2521 disposed on the second surface 2520 in a second direction perpendicular to the first direction.

Specifically, an imaginary first straight line connecting the centers of the plurality of first moving protruding parts 2511 to each other may be orthogonal to an imaginary second straight-line connecting centers of the plurality of second moving protruding parts 2521 to each other.

Also, the first straight line and the second straight line may cross each other. Also, the center of the hole 2530 of the moving plate 2500 may be positioned in a region where the first straight line and the second straight line cross each other.

Meanwhile, coupling protrusions 2151 and 2152 may be formed on front surfaces 2150 of the first side portion 2110 and the second side portion 2120 of the second housing 2100.

Specifically, a first coupling protrusion 2151 corresponding to the first coupling recess 615 and a second coupling protrusion 2152 corresponding to the second coupling recess 616 may be formed on the first side portion 2110 and the second side portion 2120 of the second housing 2100. The first coupling protrusion 2151 and the second coupling protrusion 2152 may have different shapes or sizes. For example, the first coupling protrusion 2151 may have a shape or size corresponding to that of the first coupling recess 615. In addition, the second coupling protrusion 2152 may have a shape or size corresponding to the second coupling recess 616.

Meanwhile, the camera module of the embodiment may include at least one of the previously described components and the later described components, while including the features of the housing. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Prism Unit>

FIGS. 33 to 35 are views of a prism unit of a second camera actuator.

Referring to FIGS. 33 to 35, the prism unit 2400 may be disposed in the second housing 2100. In detail, the prism unit 2400 may be disposed in the accommodation space of the second housing 2100.

The prism unit 2400 may include a prism 2400b and a prism mover 2400a disposed on the prism 2400b.

The prism 2400b may be a right-angle prism. The prism 2400b may reflect a direction of light incident from an outside. That is, the prism 2400b may change a path of light incident to the second camera actuator 2000 from the outside to the first camera actuator 1000.

The prism mover 2400a may be disposed on the prism 2400b. The prism mover 2400a may be disposed surrounding the prism 2400b. At least one side portion of the prism mover 2400a may be open and may include an accommodation space therein. In detail, the prism mover 2400a may have a structure in which a plurality of side portions connected to each other are open. For example, the prism mover 2400a may have a structure in which a side portion corresponding to the prism 2400b is open, and may include an accommodation space defined as a first space 2450 therein.

The prism mover 2400a may include an inner surface 2451. The inner surface 2451 may be an inner surface constituting the first space 2450. The first space 2450 may have a shape corresponding to that of the prism 2400b. An inner surface 2451 of the first space 2450 may directly contact the prism 2400b.

The prism mover 2400a may include a step 2452. The step 2452 may be disposed within the first space 2450. The step 2452 may serve as a guide and/or a seating part for the prism 2400b. In detail, a protruding part corresponding to the step 2452 may be formed on the outside of the prism 2400b, but is not limited thereto.

The protruding part or one end of the prism 2400b may be guided to the step 2452 of the prism mover 2400a and disposed in the first space 2450. Accordingly, the prism mover 2400a can effectively support the prism 2400b. In addition, the prism 2400b may be seated at a set position and may have improved alignment characteristics within the prism mover 2400a.

The prism unit 2400 may include a plurality of side portions. For example, the prism mover 2400a of the prism unit 2400 may include a plurality of side portions. The prism mover 2400a may include a first side portion 2410 corresponding to the first side portion 2110 of the second housing 2100. In addition, the prism mover 2400a may include a second side portion 2420 corresponding to the second side portion 2120 of the second housing 2100. In addition, the prism mover 2400a may include a third side portion 2430 corresponding to the third side portion 2130 of the second housing 2100. In addition, the prism mover 2400a may include a fourth side portion 2440 corresponding to the fourth side portion 2140 of the second housing 2100.

Front surfaces of the first side portion 2110 and the second side portion 2420 of the prism mover 2400a may be spaced apart from the step 2452. For example, the front surfaces of the first side portion 2110 and the second side portion art 2420 of the prism mover 2400a may be positioned closer to the first camera actuator compared to the step 2452 in a state in which the first camera actuator and the second camera actuator are coupled. In addition, the step 2452 or the prism 2400b coupled to the prism mover 2400a based on the step 2452 may be positioned further away from the first camera actuator compared to the front surfaces of the first side portion 2110 and the second side portion 2420. The front surfaces of the first side portion 2110 and the second side portion 2420 of the prism mover 2400a may correspond to the first stopper 660. For example, the front surfaces of the first side portion 2110 and the second side portion 2420 of the prism mover 2400a may be disposed facing the first stopper 660 in a state in which the first camera actuator 1000 and the second camera actuator 2000 are coupled. In addition, the prism 2400b may be disposed facing the first lens group 620 in a state in which the first camera actuator 1000 and the second camera actuator 2000 are coupled. In this case, when the prism mover 2400a is detached from the second housing 2100, the front surfaces of the first side portion 2110 and the second side portion 2420 of the prism mover 2400a contact the first stopper 660 before the prism 2400b contacts the first lens group 620, and accordingly, it allows the first lens group 620 to be protected.

The prism mover 2400a may include a plurality of recesses.

Preferably, the prism mover 2400a may include a second recess 2434 and a third recess 2431.

The second recess 2434 may be formed on the third side portion 2430 of the prism mover 2400a. Preferably, the second recess 2434 may be formed on an outer surface of the third side portion 2430 of the prism mover 2400a. The second recess 2434 may have a shape concave inward from an outer surface of the third side portion 2430 of the prism mover 2400a. The second recess 2434 may be formed in a center region of an outer surface of the third side portion 2430 of the prism mover 2400a. Preferably, the second recess 2434 may be aligned with the third housing hole 2134 formed in the second housing 2100 in the z-axis direction. The second recess 2434 may be formed to face the third housing hole 2134 formed on the second housing 2100. Preferably, the center of the second recess 2434 may be formed in a region overlapping the center of the third housing hole 2134 of the second housing 2100 in the z-axis direction. The second recess 2434 may provide a space in which one component of the pressing part 2600 is disposed. Preferably, the first pulling member 2610, which is one component of the pressing part 2600, may be disposed in the second recess 2434. The first pulling member 2610 may be a magnet.

Accordingly, the second recess 2434 may be disposed facing the third housing hole 2134 disposed on the second housing 2100. That is, the second recess 2434 may overlap the third housing hole 2134 in the z-axis direction.

In this case, an adhesive member (not shown) may be applied in the second recess 2434. Also, the first pulling member 2610 may be fixed and disposed in the second recess 2434 by the adhesive member.

A plurality of third recesses 2431 may be formed on an outer surface of a side portion of the prism mover 2400a. For example, a plurality of third recesses 2431 may be formed on an outer surface of the third side portion 2430 of the prism unit 2400. Preferably, the third recess 2431 may be provided in the same size as the first recess 2131, or may be provided in a different size. The third recess 2431 may be spaced apart from the second recess 434 at a position adjacent to the second recess 2434. Preferably, the third recess 2431 may be spaced apart from the second recess 2434. In this case, a depth of the third recess 2431 may be different from a depth of the second recess 2434. Also, the depth of the third recess 2431 may be the same as that of the second recess 2434.

The third recess 2431 may be spaced apart from the second recess 2434 in the second direction.

For example, the third recess 2431 may include a first sub-third recess 2432 and a second sub-third recess 2433 spaced apart from the second recess 2434 in a second direction (y-axis direction). In this case, a center of the second recess 2434 may be positioned on an imaginary straight line connecting the centers of the first sub-third recess 2432 and the second sub-third recess 2433 to each other.

The third recess 2431 may provide a space in which a plurality of first moving protruding parts of the moving plate 2500 disposed on one surface of the moving plate 2500 are inserted into or/or seated therein. In this case, the third recess 2431 may not overlap with the first recess 2131 of the housing in the z-axis direction.

The prism mover 2400a may further include a plurality of recesses. The recess may be a recess having a concave shape toward the first space 2450 on an outer surface of the side portion of the prism mover 2400a.

The plurality of recesses may include a fourth recess 2411, a fifth recess 2421, and a sixth recess 2441.

For example, the fourth recess 2411 may be formed on an outer surface of the first side portion 2410 of the prism mover 2400a. The fourth recess 2411 may be formed in a region corresponding to the first housing hole 2111 of the second housing 2100. The fourth recess 2411 may be formed in a region corresponding to the first coil part 2311.

The fifth recess 2421 may be formed on an outer surface of the second side portion 2420 of the prism mover 2400a. The fifth recess 2421 may be formed in a region corresponding to the second-first housing hole 2121 of the second housing 2100. The fifth recess 2421 may be formed in a region corresponding to the second coil part 2312.

The sixth recess 2441 may be formed on an outer surface of the fourth side portion 2440 of the prism mover 2400a. The sixth recess 2441 may be formed in a region corresponding to the fourth housing hole 2141 of the second housing 2100. The sixth recess 2441 may be formed in a region corresponding to the third coil part 2313.

The fourth recess 2411, the fifth recess 2421, and the sixth recess 2441 may be seating parts on which the magnet part 2320 is seated. The fourth recess 2411, the fifth recess 2421, and the sixth recess 2441 may be seating parts on which the yoke part 2330 is seated.

For example, the first yoke 2331 and the first magnet 2321 may be disposed in the fourth recess 2411 from an inside. In addition, a second yoke 2332 and a second magnet 2322 may be disposed in the fifth recess 2421 from the inside. In addition, a third yoke 2333 and a third magnet 2323 may be disposed in the sixth recess 2441 from the inside. And they can be spaced apart from each other.

As described above, the prism mover 2400a may include a second recess 2434 in which the first pulling member 2610 is disposed on the outer surface and a plurality of third recesses 2431 spaced apart from the second recess 2434 in the y-axis direction.

Meanwhile, the camera module of the embodiment may include at least one of the previously described components and the later described components, while including the features of the prism unit. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

<Moving Plate>

FIG. 36 is a front perspective view of a moving plate constituting the second camera actuator, and FIG. 37 is a rear perspective view of the moving plate constituting the second camera actuator.

Referring to FIGS. 36 and 37, a moving plate 2500 may include a first surface 2510 and a second surface 2520.

A plurality of moving protruding parts may be provided on one surface of the moving plate 2500 to provide a rotational axis for rotating or tilting the prism unit 2400 in a first direction (eg, left-right direction or x-axis direction). A plurality of moving protruding parts may be provided on the other surface of the moving plate 2500 to provide a rotational axis for rotating or tilting the prism unit 2400 in a second direction (eg, a vertical direction or a y-axis direction).

According to the above embodiment, a rotation of the prism unit 2400 in the first direction is performed by a plurality of moving protruding parts disposed on one surface of the moving plate 2500, and a rotation in the second direction is performed by a plurality of moving protruding parts disposed on the other surface of the moving plate 2500.

In this case, the moving plate 2500 may be disposed between the second housing 2100 and the prism unit 2400.

The moving plate 2500 is disposed between the second housing 2100 and the prism unit 2400, and may be pressed and supported to the second housing 2100 together with the prism unit 2400 by being pressed by the pressing part 2600.

Here, the moving plate 2500 includes a plurality of protruding parts provided on both surfaces.

In this case, the moving plate 2500 may provide a rotational axis for the movement direction of the prism unit 2400 moved by an external driving force, for example, the coil part 2310 and the magnet part 2320.

The moving plate 2500 may include a first surface 2510. The first surface 2510 may be a surface facing the third side portion 2430 of the prism mover 2400a.

A first moving protruding part 2511 and a first moving recess 2514 may be disposed on the first surface 2510 of the moving plate 2500. The first moving protruding part 2511 functions as a rotational axis rotating the prism unit 2400 in a first direction. The first moving recess 2514 may be a concave recess formed on the first surface 2510 of the moving plate 2500 as the second moving protruding part 2521 is formed on the second surface 2520 of the moving plate 2500.

That is, the moving plate 2500 may be a flat plate-shaped member, and first and second moving protruding parts 2511 and 2521 are formed on both surfaces of the moving plate 2500, respectively. In addition, the first and second moving recesses 2514 and 2524 may be formed correspondingly on opposite surfaces of the surfaces on which the first and second moving protruding parts 2511 and 2521 are formed.

The first moving protruding part 2511 may be spaced apart from each other in a second direction (y-axis direction) based on a center region of the first surface 2510 of the moving plate 2500. Here, the center region of the first surface 2510 may be a region facing the first pulling member 2610 fixed to the prism unit 2400. Preferably, the center region of the first surface 2510 may overlap with the first pulling member 2610 fixed to the prism unit 2400 in the z-axis direction. Accordingly, a hole 2530 may be formed in a center region of the moving plate 2500. The hole 2530 of the moving plate 2500 may be a hole passing through the first surface 2510 and the second surface 2520 of the moving plate 2500 in a center region of the moving plate 2500. The hole 2530 may be formed in a region corresponding to the second recess 2434 formed in the prism mover 2400a. Also, the hole 2530 may be formed in a region corresponding to the third housing hole 2134 of the second housing 2100. Preferably, the hole 2530 of the moving plate 2500 may overlap the second recess 2434 and the third housing hole 2134 in the z-axis direction. Accordingly, the first pulling member 2610 disposed in the second recess 2434 and the second pulling member 2620 disposed in the third housing hole 2134 may be disposed facing each other directly through the hole 2530 of the moving plate 2500.

Also, the first moving protruding part 2511 is spaced apart from the center region in the y-axis direction. That is, the first moving protruding part 2511 may include a first sub-first moving protruding part 2512 spaced apart from the center region in the +y-axis direction and a second sub-first moving protruding part 2513 spaced apart from the center region in the −y-axis direction.

The first sub first moving protruding part 2512 may correspond to the first sub third recess 2432. That is, at least a part of the first sub first moving protruding part 2512 may be disposed in the first sub third recess 2432. That is, at least a part of the first sub first moving protruding part 2512 may be inserted in the first sub third recess 2432. In this case, a height of the first sub first moving protruding part 2512 may be greater than a depth of the first sub third recess 2432. Accordingly, the first surface 2510 of the moving plate 2500 may be spaced apart from an outer surface of the third side portion 2430 of the prism mover 2400a in a state in which at least a part of the first sub first moving protruding part 2512 is inserted in the first sub third recess 2432.

The second sub first moving protruding part 2513 may correspond to the second sub third recess 2433. That is, at least a part of the second sub first moving protruding part 2513 may be disposed in the second sub third recess 2433. That is, at least a part of the second sub first moving protruding part 2513 may be inserted in the second sub third recess 2433. In this case, a height of the second sub first moving protruding part 2513 may be greater than a depth of the second sub third recess 2433. Accordingly, a part of the second sub first moving protruding part 2513 may be only inserted into the second sub third recess 2433. Accordingly, the first surface 2510 of the moving plate 2500 may be spaced apart from an outer surface of the third side portion 2430 of the prism mover 2400a in a state in which at least a part of the second sub first moving protruding part 2513 is inserted in the second sub third recess 2433.

In addition, the first sub first moving protruding part 2512 and the second sub first moving protruding part 2513 are arranged in the y-axis direction based on the center of the moving plate 2500, and thus it provides a rotational axis for the prism unit 2400 to rotate in the first direction (x-axis direction). That is, the prism unit 2400 may be provided to enable rotational movement in the first direction (left and right direction) with an imaginary first line formed by the first sub first moving protruding part 2512 and the second sub first moving protruding part 2513 as a reference axis.

The first moving recess 2514 may be spaced apart in a first direction (x-axis direction) based on a center region of the first surface 2510 of the moving plate 2500.

In addition, the first moving recess 2514 is spaced apart from the center region in the x-axis direction. That is, the first moving recess 2514 may include a first sub-first moving recess 2515 spaced apart from the center region in the −x-axis direction and a second sub-first moving recess 2516 spaced apart from the center region in the +x-axis direction.

The first sub first moving recess 2515 and the second sub first moving recess 2516 may correspond to the second moving protruding part 2521 formed on the second surface 2520 of the moving plate 2500.

In addition, the moving plate 2500 may include a second surface 2520.

The second surface 2520 may be a surface facing the inner surface of the third side portion 2130 of the second housing 2100.

A second moving protruding part 2521 and a second moving recess 2524 may be disposed on the second surface 2520 of the moving plate 2500. The second moving protruding part 2521 functions as a rotational axis for rotating the prism unit 2400 in a second direction.

The second moving protruding part 2521 may be spaced apart from the center region of the second surface 2520 of the moving plate 2500 in a first direction (x-axis direction). Here, the center region of the second surface 2520 may be a region where the hole 2530 is formed.

In addition, the second moving protruding part 2521 is spaced apart from the center region in the x-axis direction. That is, the second moving protruding part 2521 may include a first sub-second moving protruding part 2522 spaced apart from the center region in the −x-axis direction and a second sub-second moving protruding part 2523 spaced apart from the center region in the +x-axis direction.

The first sub second moving protruding part 2522 and the second sub second moving protruding part 2523 may correspond to the first sub-first recess 2132 and the second sub-first recess 2133 of the second housing 2100.

That is, the first sub second moving protruding part 2522 and the second sub second moving protruding part 2523 may be inserted in the first sub first recess 2132 and the second sub first recess 2133.

In addition, the first sub second moving protruding part 2522 and the second sub second moving protruding part 2523 are arranged in the x-axis direction based on the center of the moving plate 2500, and thus it provides a rotational axis for the prism unit 2400 to rotate in the second direction. That is, the prism unit 2400 may be provided to enable rotational movement in the second direction (up and down direction) with an imaginary second line formed by the first sub second moving protruding part 2522 and the second sub second moving protruding part 2523 as a reference axis.

The second moving recesses 2524 may be spaced apart from the center region of the second surface 2520 of the moving plate 2500 in a second direction (y-axis direction).

In addition, the second moving recesses 2524 are spaced apart from the center region in the y-axis direction. That is, the second moving recess 2524 may include a first sub second moving recess 2525 spaced apart from the center region in the +y-axis direction and a second sub second moving recess 2526 spaced apart from the center region in the −y-axis direction.

Meanwhile, the camera module of the embodiment may include at least one of the previously described components and the later described components, while including the features of the moving plate. For example, an embodiment of the present application may include a plurality of embodiments for each component constituting a camera module, and the plurality of embodiments may cross-implement with each other. The meaning that the cross-implement is possible may mean that a combination of at least two of the plurality of embodiments is possible.

FIGS. 38 to 40 are views of a coupling relationship among a housing, a prism unit, a pressing part, and a moving plate in a second camera actuator.

Referring to FIGS. 38 to 40, the second camera actuator according to the embodiment may include a moving plate 2500. In addition, a pressing part 2600 generating an attractive force may be disposed on surfaces facing each other between the second housing 2100 and the prism unit 2400. That is, a first pulling member 2610 may be disposed on one surface of the prism unit 2400 (more specifically, a prism mover). In addition, a second pulling member 2620 may be disposed on one surface of the second housing 2100 facing the one surface of the prism unit 2400. In this case, the first pulling member 2610 may be a magnet. In addition, the second pulling member 2620 may be an electronic component. For example, the second pulling member 2620 may be an electronic component having magnetism. For example, the second pulling member 2620 may be an electronic component electrically connected to the OIS substrate 2200. For example, the second pulling member 2620 may be a capacitor disposed on the OIS substrate 2200.

The prism unit 2400 may be pressed against the second housing 2100 by the pressing part 2600 in a state where the moving plate 2500 is inserted between the prism unit 2400 and the second housing 2100. Accordingly, the prism unit 2400 and the moving plate 2500 may be supported to the second housing 2100.

Centers of the first pulling member 2610, the moving plate 2500, and the second pulling member 2620 may overlap each other in the z-axis direction.

In this case, the first moving protruding part 2511 of the moving plate 2500 may be inserted into the third recess 2431 of the prism unit 2400.

The first sub first moving protruding part 2512 may be inserted into the first sub third recess 2432, and the second sub first moving protruding part 2513 may be inserted into the second sub third recess 2433.

In addition, the first sub second moving protruding part 2522 and the second sub second moving protruding part 2523 may be inserted into the first sub first recess 2132 and the second sub first recess 2133 of the second housing 2100.

In addition, the first sub second moving protruding part 2522 and the second sub second moving protruding part 2523 are arranged in the x-axis direction based on the center of the moving plate 2500, and thus it provides a rotational axis for the prism unit 2400 to rotate in the second direction. That is, the prism unit 2400 may be provided to enable rotational movement in the second direction (up and down direction) with an imaginary second line formed by the first sub second moving protruding part 2522 and the second sub second moving protruding part 2523 as a reference axis.

Accordingly, the first moving protruding parts disposed on one surface of the moving plate 2500 serve as a rotational axis for rotating the prism unit 2400 in a first direction corresponding to the x-axis, and the second moving protruding parts disposed on the other surface of the moving plate 2500 serve as a rotational axis for rotating the prism unit 2400 in a second direction corresponding to the y-axis.

In addition, the embodiment allows the prism unit 2400 to be tilted in the first axis or the second axis by the electromagnetic force between the first to third magnets 2321, 2322, and 2323 disposed on the prism mover 2400a and the first to third coil parts 2311, 2312, and 2313, and accordingly, there is a technical effect of producing the best optical characteristics by minimizing the occurrence of a decent or tilt phenomenon when implementing OIS.

For example, the embodiment controls the tilting of the prism unit 2400 in the first axis or the second axis by the driving force of the image shaking control unit 2200 and 2300 in a state where the moving plate 2500 is disposed between the second housing 2100 and the prism unit 2400, and accordingly, it is possible to produce the best optical characteristics by minimizing the occurrence of a decent or tilt phenomenon when implementing OIS, and has a technical effect of realizing an ultra-slim and subminiature camera actuator.

In addition, the embodiment uses an electronic component disposed on the OIS substrate 2200 as a component of the pressing part 2600 for pressing the prism unit 2400 to the second housing 2100. Specifically, the embodiment uses a magnetic electronic component disposed on the OIS substrate 2200 as the second pulling member 2620 constituting the pressing part 2600. Specifically, the embodiment uses a magnetic capacitor disposed on the OIS substrate 2200 as the second pulling member 2620 constituting the pressing part 2600. According to this, the embodiment can omit a separate magnet or yoke constituting the second pulling member 2620, and accordingly, the manufacturing cost may be reduced. In addition, when the capacitor disposed on the OIS substrate 2200 is not used as a pressing part, an external force is generated due to the attractive force generated between the capacitor and the magnet constituting the pressing part 2600, and a problem may occur in reliability of OIS operation. Alternatively, the embodiment can remove the external force generated in the capacitor by using the capacitor as a pulling member, thereby improving OIS operation reliability.

FIGS. 41 and 42 are exemplary views of operation of a second camera actuator according to an embodiment.

Referring to FIGS. 41 and 42, the prism unit 2400 according to the embodiment may be tilted in a first axis or a second axis by the driving force of the image shaking control unit 2200 and 2300.

First, referring to FIG. 41, the prism unit 2400 may be provided to enable rotational movement in the first direction with an imaginary first line formed by the first moving protruding part 2511 of the moving plate 2500 as a reference axis. In detail, the image shaking control unit 2200 and 2300 may rotate the prism unit 2400 in the left and right directions.

For example, a repulsive force may be generated between a first coil portion of the first coil 2311 adjacent to the moving plate 2500 and a corresponding first magnet portion of the first magnet 2321. An attractive force may be generated between a second coil portion of the first coil 2311 far from the moving plate 2500 and a corresponding second magnet portion of the first magnet 2321.

In addition, an attractive force may be generated between a third coil portion of the second coil 2312 adjacent to the moving plate 2500 and a corresponding third magnet portion of the second magnet 2322. A repulsive force may be generated between a fourth coil portion of the second coil 2312 far from the moving plate 2500 and a corresponding fourth magnet portion of the second magnet 2322.

Accordingly, the prism unit 2400 may be tilted in the left and right directions with the first line L1 as a reference axis. That is, the prism unit 2400 may be tilted at a predetermined angle in the left and right directions with respect to the first line L1. Accordingly, the movement path of the light incident on the prism unit 2400 can be controlled.

In addition, referring to FIG. 42, the prism unit 2400 may be provided to enable rotational movement in the second direction with an imaginary second line formed by the second moving protruding part 2521 of the moving plate 2500 as a reference axis. In detail, the image shaking control unit 2200 and 2300 may rotate the prism unit 2400 in the left and right directions.

For example, a repulsive force may occur between a fifth coil portion of the third coil 2313 adjacent to the moving plate 2500 and a fifth magnet portion of the third magnet 2323 adjacent to the moving plate 2500. In addition, an attractive force may be generated between a sixth coil portion of the third coil 2313 far from the moving plate 2500 and a sixth magnet portion of the third magnet 2323 far from the moving plate 2500.

Accordingly, the prism unit 2400 may be tilted downward with respect to the second line L2 as a reference axis. That is, the prism unit 2400 may be tilted at a predetermined angle in the vertical direction with respect to the second line L2. Accordingly, the movement path of the light incident on the prism unit 2400 can be controlled.

FIGS. 43 and 44 are coupling views of a first camera actuator and a second camera actuator according to an embodiment.

Referring to FIG. 43, the second housing 2100, the prism mover 2400*a*, and the prism 2400*b* of the second camera actuator 2000 may be disposed facing the first lens assembly 600 in a state in which the first camera actuator and the second camera actuator are normally coupled.

Specifically, the first coupling protrusion 2151 and the second coupling protrusion 2152 of the second housing 2100 may be inserted within the first coupling recess 615 and the second coupling recess 616 of the first lens barrel 610. In addition, the front surface of the prism mover 2400*a* may be disposed facing each other while being spaced apart from the first stopper 660 coupled to the first lens barrel 610 by a first distance D1. In addition, the prism 2400*b* may be disposed to face each other while being spaced apart from the first lens group 620 mounted on the first lens barrel 610 by a second distance D2. In this case, the first distance D1 is smaller than the second distance D2.

Referring to FIG. 44, a situation in which the prism mover 2400*a* is detached from the second housing 2100 may occur due to various factors in a camera module use environment. In this case, when the prism mover 2400*a* is detached, the front surface of the prism mover 2400*a* and the first stopper 660 may contact each other. In this case, as described above, the first distance D1 is smaller than the second distance D2. Accordingly, the prism 2400*b* and the first lens group 620 may be separated by a third distance in a state in which the front surface of the prism mover 2400*a* and the first stopper 660 are in contact. For example, when the front surface of the prism mover 2400*a* and the first stopper 660 come into contact, the prism 2400*b* and the first lens group 620 may be separated by a third distance corresponding to a difference between the first distance D1 and the second distance D2. Accordingly, the first lens assembly 600 and further the first lens group 620 can be safely protected in a situation in which the prism mover 2400*a* or the prism 2400*b* is detached, and accordingly, reliability can be improved.

FIG. 45 is a perspective view of a mobile terminal to which a camera module according to an embodiment is applied.

Referring to FIG. 29, the mobile terminal 3 according to the embodiment may include a camera module 10, an autofocus device 31 and a flash module 33 provided on a back surface.

The camera module 10 may include an image capturing function and an autofocus function. For example, the camera module 10 may include an autofocus function using an image.

The camera module 10 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 10 may include a first camera module 10A and a second camera module 10B. In this case, at least one of the first camera module and the second camera module 10B may include the above-described camera module, for example, the camera module 10 according to FIGS. 1 to 44. Accordingly, the camera module 10 may implement an OIS function together with a zoom function and an autofocus function.

The autofocus device 31 may include an autofocus function using a laser. The autofocus device 31 may be mainly used in a condition in which an autofocus function using an image of the camera module 10 is deteriorated, for example, in a close environment of 10 m or less or a dark environment. The autofocus device 31 may include a light-emitting unit including a vertical cavity surface emitting laser (VCSEL) semiconductor device, and a light receiving unit that converts light energy into electric energy such as a photodiode.

The flash module 33 may include a light-emitting device that emits light therein. The flash module 33 may be operated by a camera operation of a mobile terminal or by user control.

Next, FIG. 46 is a perspective view of a vehicle 5 to which a camera module according to an embodiment is applied. For example, FIG. 46 is an appearance view of a vehicle having a vehicle driving assistance device to which a camera module 10 according to the embodiment is applied.

Referring to FIG. 46, the vehicle 5 according to the embodiment may include wheels 53FL and 53FR that rotate by a power source, and a predetermined sensor. The sensor may be a camera sensor 51, but the embodiment is not limited thereto.

The camera 51 may be a camera sensor to which the camera module 10 according to the embodiment is applied.

The vehicle 5 according to the embodiment may acquire image information through the camera sensor 51 that photographs a front image or a surrounding image, and may determine an unidentified situation of a lane by using the image information and generate a virtual lane in the unidentified situation.

For example, the camera sensor 51 may acquire the front image by photographing a front of the vehicle 5, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 51, the processor detects such an object to include in the image information.

In this case, the processor may acquire distance information with the object detected through the camera sensor 51 to further complement the image information. The image information may be information about an object captured in the image.

Such a camera sensor 51 may include an image sensor and an image processing module. The camera sensor 51 may process a still image or moving image obtained by the image sensor (e.g., CMOS or CCD). The image processing module may process the still image or moving image acquired through the image sensor to extract necessary information, and may transmit the extracted information to the processor.

In this case, the camera sensor 51 may include a stereo camera so as to improve the measurement accuracy of the object and to secure more information such as a distance between the vehicle 5 and the object, but the embodiment is not limited thereto.

The invention claimed is:

1. A camera actuator comprising:
a base;
a rail guide part coupled to the base;

a first lens assembly coupled to the base; and
second and third lens assemblies disposed in the base and configured to move along the rail guide part,
wherein the base includes a coupling protrusion,
wherein the rail guide part includes a coupling hole corresponding to the coupling protrusion of the base,
wherein the coupling hole includes a first hole and a second hole provided in the rail guide part and spaced apart in a first direction, and
wherein the rail guide part includes an extension recess spaced apart from the first hole and the second hole in a second direction perpendicular to the first direction and extending along the first direction.

2. The camera actuator of claim 1, wherein the base includes a stepped region, and
wherein the stepped region includes:
a first region in which the coupling protrusion is formed, and
a second region protruding from the first region.

3. The camera actuator of claim 2, wherein the base further includes:
a base recess including a first recess part provided along a circumference of the coupling protrusion; and
a second recess part extending from the first recess part,
wherein the first recess part is provided along the circumference of the coupling protrusion in the first region, and
wherein the second recess part extends from the first recess part toward the second region of the base and is connected to the second region of the base.

4. The camera actuator of claim 1, wherein the base further includes:
a first sidewall; and
a second sidewall opposite to the first sidewall,
wherein the rail guide part further includes:
a first guide part disposed adjacent to the first sidewall of the base and including a first rail; and
a second guide part disposed adjacent to the second sidewall of the base and including a second rail;
wherein the second lens assembly is configured to move along the first rail of the first guide part, and
wherein the third lens assembly is configured to move along the second rail of the second guide part.

5. The camera actuator of claim 4, wherein the base further includes:
a first base recess provided at the first coupling protrusion; and
a second base recess provided at the second coupling protrusion,
wherein the first base recess is disposed to face the first guide part, and
wherein the second base recess is disposed to face the second guide part.

6. The camera actuator of claim 1, wherein the rail guide part further includes:
a first guide part; and
a second guide part, and
wherein the coupling protrusion includes:
a first coupling protrusion to which the first guide part is coupled; and
a second coupling protrusion to which the second guide part is coupled.

7. The camera actuator of claim 6, wherein the coupling hole further includes a first coupling hole provided in the first guide part and corresponding to the first coupling protrusion.

8. The camera actuator of claim 7, wherein the coupling hole further includes a second coupling hole provided in the second guide part and corresponding to the second coupling protrusion.

9. The camera actuator of claim 8, wherein each of the first coupling protrusion and the second coupling protrusion includes a plurality of protrusions, and
wherein each of the first coupling hole and the second coupling hole includes the first hole and the second hole to correspond to the plurality of protrusions of the first coupling protrusion and the second coupling protrusion, respectively.

10. The camera actuator of claim 9, wherein the extension recess includes a first extension recess provided in the first guide part.

11. The camera actuator of claim 10, wherein the first extension recess overlaps each of the first hole and the second hole of the first coupling hole the second direction.

12. The camera actuator of claim 9, wherein the extension recess includes a second extension recess provided in the second guide part.

13. The camera actuator of claim 12, wherein the second extension recess overlaps each of the first hole and the second hole of the second coupling hole in the second direction.

14. The camera actuator of claim 9, wherein the first hole and the second hole of the first coupling hole have different shapes or different sizes, and
wherein the first hole and the second hole of the second coupling hole have different shapes or different sizes.

15. The camera actuator of claim 1, wherein the first lens assembly includes:
a first lens barrel having an opening and including a first surface and a second surface opposite to the first surface and facing the second lens assembly; and
a first lens group disposed in the opening of the first lens barrel,
wherein the first lens barrel includes:
a first rib formed on the first surface; and
a first stopper inserted in the first rib.

16. The camera actuator of claim 15, wherein the first rib includes:
a first-first rib disposed on a first side of the opening among the first surfaces of the first lens barrel; and
a first-second rib disposed on a second side of the first surface of the first lens barrel opposite to the first side of the opening, and
wherein the first stopper includes:
a first-first stopper inserted in the first-first rib; and
a first-second stopper inserted in the first-second rib.

17. The camera actuator of claim 16, wherein the first lens barrel includes:
a second rib formed on the second surface; and
a second stopper is-inserted in the second rib and limiting the movement of the second lens assembly.

18. A camera module comprising:
a first camera actuator; and
a second camera actuator coupled to the first camera actuator;
wherein the first camera actuator comprises:
a base;
a rail guide part coupled to the base;
a first lens assembly coupled to the base;
second and third lens assemblies disposed in the base and moving along the rail guide part,
wherein the base includes a coupling protrusion, wherein the rail guide part includes a coupling hole corresponding to the coupling protrusion of the base, wherein the coupling hole includes a first hole and a second hole provided in the rail guide part and spaced apart in a first direction, and wherein the guide part includes an extension recess spaced apart from the first hole and the second hole in a second direction perpendicular to the first direction and extending along the first direction.

19. The camera module of claim 18, wherein the rail guide part includes a first guide part including a first rail, wherein the second lens assembly is configured to move along the first rail of the first guide part, wherein the coupling hole includes a first coupling hole provided in the first guide part and including the first hole and the second hole, wherein the extension recess includes a first extension recess provided in the first guide part, and wherein the first extension recess overlaps each of the first hole and the second hole of the first coupling hole in the second direction.

20. The camera module of claim 19, wherein the rail guide part includes a second guide part including a second rail, wherein the third lens assembly is configured to move along the second rail of the second guide part, wherein the coupling hole includes a second coupling hole provided in the second guide part and including the first hole and the second hole, wherein the extension recess includes a second extension recess provided in the second guide part, and wherein the second extension recess overlaps each of the first hole and the second hole of the second coupling hole in the second direction.

* * * * *